(12) United States Patent
Matsuzaki et al.

(10) Patent No.: US 9,762,407 B2
(45) Date of Patent: Sep. 12, 2017

(54) INFORMATION NOTIFICATION METHOD

(71) Applicant: Panasonic Intellectual Property Corporation of America, Torrance, CA (US)

(72) Inventors: Natsume Matsuzaki, Osaka (JP); Yuichi Futa, Ishikawa (JP); Motoji Ohmori, Osaka (JP); Manabu Maeda, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 204 days.

(21) Appl. No.: 14/441,974

(22) PCT Filed: Sep. 11, 2014

(86) PCT No.: PCT/JP2014/004698
§ 371 (c)(1),
(2) Date: May 11, 2015

(87) PCT Pub. No.: WO2015/037239
PCT Pub. Date: Mar. 19, 2015

(65) Prior Publication Data
US 2016/0006576 A1  Jan. 7, 2016

(30) Foreign Application Priority Data
Sep. 12, 2013 (JP) .................. 2013-189267

(51) Int. Cl.
*H04L 12/28* (2006.01)
*G06F 13/00* (2006.01)
(Continued)

(52) U.S. Cl.
CPC .......... *H04L 12/2825* (2013.01); *G06F 13/00* (2013.01); *G06Q 10/00* (2013.01);
(Continued)

(58) Field of Classification Search
CPC .. H04Q 2209/40; H04Q 2209/86; H04Q 9/00; G06Q 10/00; H04L 43/065; H04L 12/2825; G06F 13/00
See application file for complete search history.

(56) References Cited

U.S. PATENT DOCUMENTS 8,504,180 B2 * 8/2013 Imes .................... F24F 11/0012
455/418
2002/0128728 A1 * 9/2002 Murakami ......... G05B 23/0245
700/10
(Continued)

FOREIGN PATENT DOCUMENTS

JP         4703784      6/2011
JP      2011-254441   12/2011
(Continued)

OTHER PUBLICATIONS

Extended European Search Report issued Aug. 16, 2016 in European Application No. 14844249.4.
(Continued)

*Primary Examiner* — Chris Parry
*Assistant Examiner* — Stephen Houlihan
(74) *Attorney, Agent, or Firm* — Wenderoth, Lind & Ponack, L.L.P.

(57) ABSTRACT

When it is determined that a position of the display terminal is within a range of a prescribed distance from the house and when it is determined that the log information and the information indicating the operational state of the one electric home appliance are not consistent with each other, the server provides the display terminal with information on a possibility of a malfunction of the one electric home appliance while the position of the display terminal is still within the range of the prescribed distance from the house.

21 Claims, 44 Drawing Sheets

(51) Int. Cl.
*G06Q 10/00* (2012.01)
*H04Q 9/00* (2006.01)
*H04L 12/26* (2006.01)

(52) U.S. Cl.
CPC ............. *H04L 43/065* (2013.01); *H04Q 9/00* (2013.01); *H04Q 2209/40* (2013.01); *H04Q 2209/86* (2013.01)

(56) References Cited

U.S. PATENT DOCUMENTS

| | | | | |
|---|---|---|---|---|
| 2003/0197595 | A1* | 10/2003 | Olson | G08C 17/02 340/5.61 |
| 2004/0267443 | A1* | 12/2004 | Watanabe | G01C 21/36 701/533 |
| 2005/0161517 | A1* | 7/2005 | Helt | G05D 23/1905 236/1 C |
| 2007/0255796 | A1* | 11/2007 | Lee | H04L 12/2602 709/208 |
| 2009/0076816 | A1* | 3/2009 | Bradford | G10L 21/06 704/235 |
| 2011/0037455 | A1* | 2/2011 | Oren | G01D 4/004 324/103 R |
| 2011/0138202 | A1 | 6/2011 | Inoue et al. | |
| 2013/0196633 | A1 | 8/2013 | Wesby van-Swaay | |
| 2013/0324093 | A1* | 12/2013 | Santamaria | H04M 1/72519 455/414.1 |
| 2015/0039224 | A1* | 2/2015 | Tuukkanen | G01C 21/12 701/500 |

FOREIGN PATENT DOCUMENTS

| | | |
|---|---|---|
| JP | 2012-48350 | 3/2012 |
| JP | 2012-196016 | 10/2012 |

OTHER PUBLICATIONS

International Search Report issued Oct. 7, 2014 in International (PCT) Application No. PCT/JP2014/004698.

* cited by examiner

| | MONITORING LOG (1) | MONITORING LOG (2) | ELECTRIC HOME APPLIANCE LOG | DETERMINATION IN S107 |
|---|---|---|---|---|
| CASE (1) | ON | ON | ON | NO INCONSISTENCY ON |
| CASE (2) | ON | OFF | ON | INCONSISTENT |
| CASE (3) | ON | OFF | OFF | INCONSISTENT |
| CASE (4) | ON | ON | OFF | INCONSISTENT |
| CASE (5) | OFF | ON | ON | INCONSISTENT |
| CASE (6) | OFF | OFF | ON | INCONSISTENT |
| CASE (7) | OFF | OFF | OFF | NO INCONSISTENCY OFF |
| CASE (8) | ON | ON | OFF | INCONSISTENT |

| AIR CONDITIONER (1) | 2013.4.10 7:00 | ON | 22 DEGREES, 40 %, HEATER, AUTOMATIC | 21 DEGREES, 33% |
|---|---|---|---|---|
| DEVICE ID | TIME | ON/OFF | SET VALUE | CURRENT STATE |

D132

| VCR (2) | 2013.4.10 7:00 | OFF | 4.10 19:00 4ch |
|---|---|---|---|
| DEVICE ID | TIME | ON/OFF | SET VALUE |

D133

| POWER METER | 2013.4.10 7:00 | 1kW |
|---|---|---|
| DEVICE ID | TIME | CURRENT STATE |

REGISTER DEVICE FOR
MONITORING OPERATIONAL
STATE OF AIR CONDITIONER.

C16 — ☑ POWER METER

MONITORING WILL BE MADE BASED ON
POWER VALUE ITSELF OR POWER CHANGE.

☑ THERMOMETER

MONITORING WILL BE MADE BASED ON
TEMPERATURE ITSELF
OR TEMPERATURE CHANGE.
CONFIRMATION WILL TAKE SOME TIME.

☐ SOUND SENSOR

MONITORING WILL BE MADE BASED ON
OPERATING NOISE OF AIR CONDITIONER.

| ELECTRIC HOME APPLIANCE | MONITORING DEVICE | VALUE WHEN ON |
|---|---|---|
| AIR CONDITIONER (101) | POWER METER (103) | 1 kW OR MORE |
| AIR CONDITIONER (101) | THERMOMETER (104) | TEMPERATURE NEAR AIR CONDITIONER OR INSIDE ROOM<br><br>(JUNE TO AUGUST) 25 DEGREES OR LOWER<br><br>(DECEMBER TO FEBRUARY) 15 DEGREES OR LOWER |
| AUTOMATIC CLEANER (102) | SOUND SENSOR (105) | 60 dB OR HIGHER |

A FAILURE MAY HAVE OCCURRED IN THE NETWORK UNIT
OF THE AIR CONDITIONER.

WHILE THE AIR CONDITIONER NOTIFIES AN OFF-STATE,
AN ON-STATE OF THE AIR CONDITIONER HAS BEEN MONITORED
BY THE POWER METER AND THE THERMOMETER.

THIS NOTICE HAS BEEN SENT BY MONITORING THE STATE
OF THE HOUSE BEFORE YOU BOARD THE BUS.

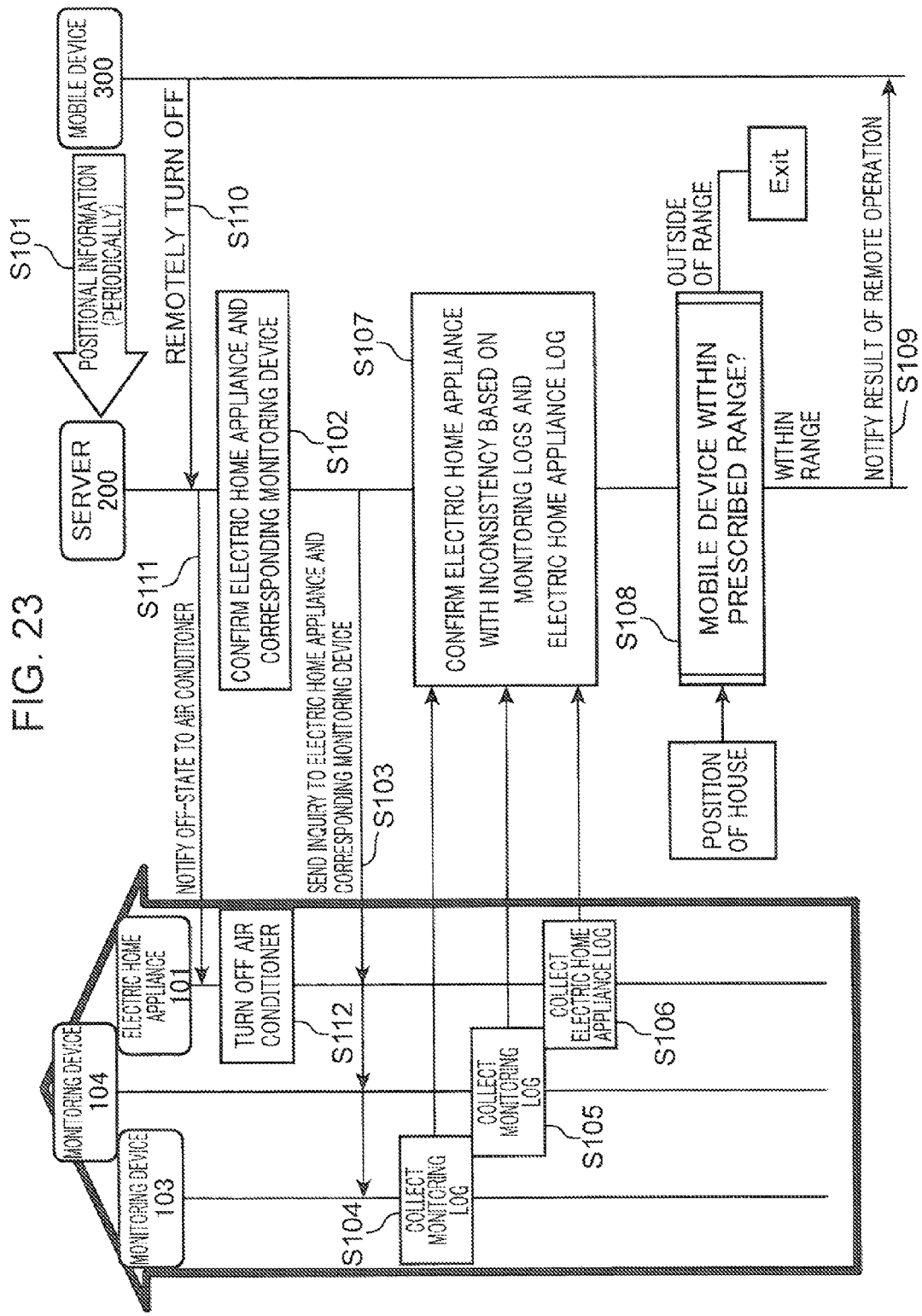

| | MONITORING LOG (1) | MONITORING LOG (2) | ELECTRIC HOME APPLIANCE LOG | REMOTE OPERATION CONTENTS | DETERMINATION IN S107 |
|---|---|---|---|---|---|
| CASE (1) | ON | ON | ON | ON | REMOTE OPERATION SUCCESSFUL |
| CASE (2) | ON | OFF | ON | ON | POSSIBILITY OF FAILURE |
| CASE (3) | ON | OFF | OFF | ON | POSSIBILITY OF FAILURE |
| CASE (4) | ON | ON | OFF | ON | POSSIBILITY OF FAILURE |
| CASE (5) | OFF | ON | ON | ON | POSSIBILITY OF FAILURE |
| CASE (6) | OFF | OFF | ON | ON | POSSIBILITY OF FAILURE |
| CASE (7) | OFF | OFF | OFF | ON | REMOTE OPERATION FAILED |
| CASE (8) | OFF | ON | OFF | ON | POSSIBILITY OF FAILURE |
| CASE (9) | ON | ON | ON | OFF | REMOTE OPERATION FAILED |
| CASE (10) | ON | OFF | ON | OFF | POSSIBILITY OF FAILURE |
| CASE (11) | ON | OFF | OFF | OFF | POSSIBILITY OF FAILURE |
| CASE (12) | ON | ON | OFF | OFF | POSSIBILITY OF FAILURE |
| CASE (13) | OFF | ON | ON | OFF | POSSIBILITY OF FAILURE |
| CASE (14) | OFF | OFF | ON | OFF | POSSIBILITY OF FAILURE |
| CASE (15) | OFF | OFF | OFF | OFF | REMOTE OPERATION SUCCESSFUL |
| CASE (16) | OFF | ON | OFF | OFF | POSSIBILITY OF FAILURE |

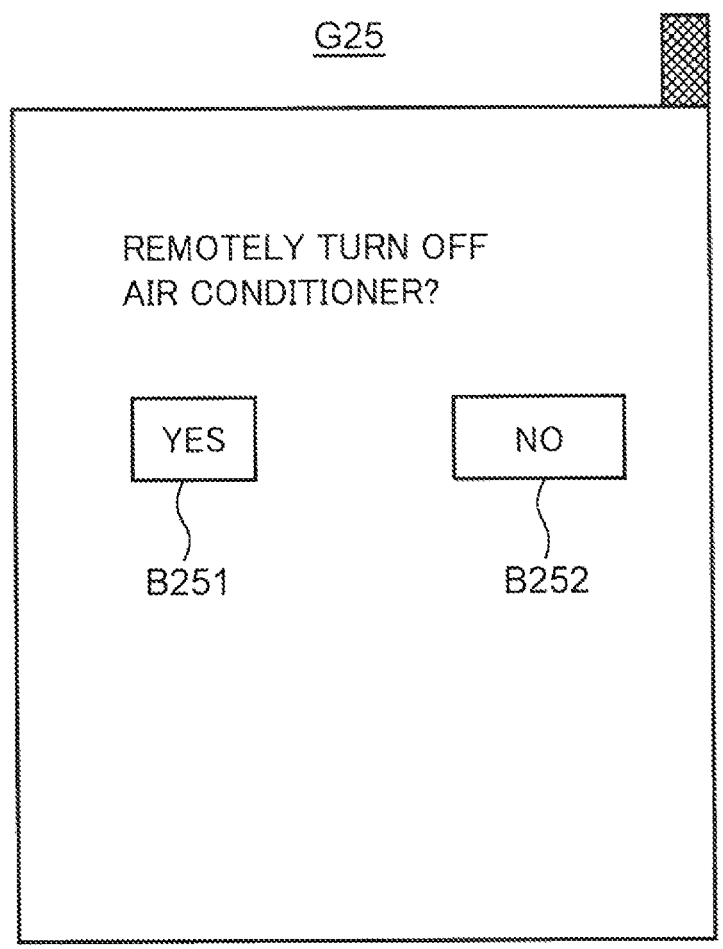

THE AIR CONDITIONER COULD NOT BE REMOTELY
TURNED OFF DUE TO A FAILURE IN COMMUNICATION
OR IN THE AIR CONDITIONER. THE POWER METER
AND THE THERMOMETER ALSO CONFIRM THAT
THE AIR CONDITIONER HAS NOT BEEN TURNED OFF.

DO YOU WISH TO RETRY TURNING OFF?

B261 — YES          NO — B262

THIS NOTICE HAS BEEN SENT BY
CONFIRMING THE STATE OF THE
HOUSE BEFORE YOU BOARD THE BUS.

G27

IT IS CONFIRMED THAT
THE AIR CONDITIONER HAS CHANGED
TO AN OFF-STATE.

THIS NOTICE HAS BEEN SENT BY
CONFIRMING THE STATE OF THE
HOUSE BEFORE YOU BOARD THE BUS.

A FAILURE MAY HAVE OCCURRED
IN THE NETWORK UNIT
OF THE AIR CONDITIONER.

WHILE THE AIR CONDITIONER NOTIFIES
AN OFF-STATE, AN ON-STATE OF
THE AIR CONDITIONER HAS BEEN
CONFIRMED BY THE POWER METER
AND THE THERMOMETER.

IT SHOULD TAKE YOU ABOUT
5 MINUTES TO RETURN TO THE HOUSE.
THIS NOTICE HAS BEEN SENT BY
CONFIRMING THE STATE OF THE
HOUSE BEFORE YOU BOARD THE BUS.

G36

A FAILURE MAY HAVE OCCURRED
IN THE NETWORK UNIT
OF THE AIR CONDITIONER.

WHILE THE AIR CONDITIONER NOTIFIES
AN OFF-STATE, AN ON-STATE OF
THE AIR CONDITIONER HAS BEEN
CONFIRMED BY THE POWER METER
AND THE THERMOMETER.

THIS NOTICE HAS BEEN SENT
BY CONFIRMING
THE STATE OF THE HOUSE
BEFORE YOUR TRAVEL DISTANCE
FROM HOME REACHES 500 m.

INFORMATION NOTIFICATION METHOD

TECHNICAL FIELD

The present disclosure relates to notification of a state of an electric home appliance inside a household such as forgetting to turn off the electric home appliance when going out.

BACKGROUND ART

Recently, an increasing number of electric home appliances or AV devices in households provide connectability to networks. Accordingly, collection of various types of log information including an operation history of electrical home appliances or AV devices via the network by a cloud provider is being studied. Systems are expected which control electric home appliances or AV devices using the collected log information.

However, these systems are under study and require further improvements to be practically viable.

CITATION LIST

Patent Literature

Patent Literature 1: Japanese Patent No. 4703784

SUMMARY OF INVENTION

In order to solve the problem described above, an aspect of an information notification method in an information management system is an information notification method in an information management system which manages information indicating a state of one or more electric home appliances in a house, the information notification method including:

receiving log information including an operational state of one electric home appliance among the one or more electric home appliances, from the one electric home appliance via a first network;

receiving information indicating an operational state of the one electric home appliance from another electric home appliance via the first network, the other electric home appliance being capable of monitoring the operational state of the one electric home appliance;

receiving positional information of a display terminal of a user of the electric home appliance from the display terminal; and when it is determined that a position of the display terminal is within a range of a prescribed distance from the house as a result of a comparison between positional information of the house and the positional information of the display terminal and when it is determined that the log information received from the one electric home appliance and the information indicating the operational state of the one electric home appliance that is received from the other electric home appliance are not consistent with each other, providing the display terminal with information on a possibility of a malfunction of the one electric home appliance via a second network while the position of the display terminal is still within the range of the prescribed distance from the house.

According to the aspect described above, further improvements are achieved.

BRIEF DESCRIPTION OF DRAWINGS

FIG. 7 shows an example of a determination table used by a log determining unit 216 of the information notification system 11 according to the first embodiment of the present disclosure.

FIG. 15 is a diagram showing an example of a data configuration of an electric home appliance log of the information notification system 11 according to the first embodiment of the present disclosure.

FIG. 16 is a diagram showing an example of a registration screen G16 of the information notification system 11 according to the first embodiment of the present disclosure.

FIG. 17 is a diagram showing a correspondence table H17 of the information notification system 11 according to the first embodiment of the present disclosure.

FIG. 19 is a diagram showing an example of a notification screen G19 of the information notification system 11 according to the first embodiment of the present disclosure.

FIG. 23 is a sequence diagram showing operations of the information notification system 11 according to the second embodiment of the present disclosure.

FIG. 24 is a diagram showing an example of a determination table used by the log determining unit 216 of the information notification system 11 according to the second embodiment of the present disclosure.

FIG. 25 is a diagram showing an example of an operation screen G25 of the information notification system 11 according to the second embodiment of the present disclosure.

FIG. 26 is a diagram showing an example of a notification screen G26 of the information notification system 11 according to the second embodiment of the present disclosure.

FIG. 33 is a diagram showing an example of a notification screen G33 of the information notification system 11 according to the third embodiment of the present disclosure.

Figure 1:
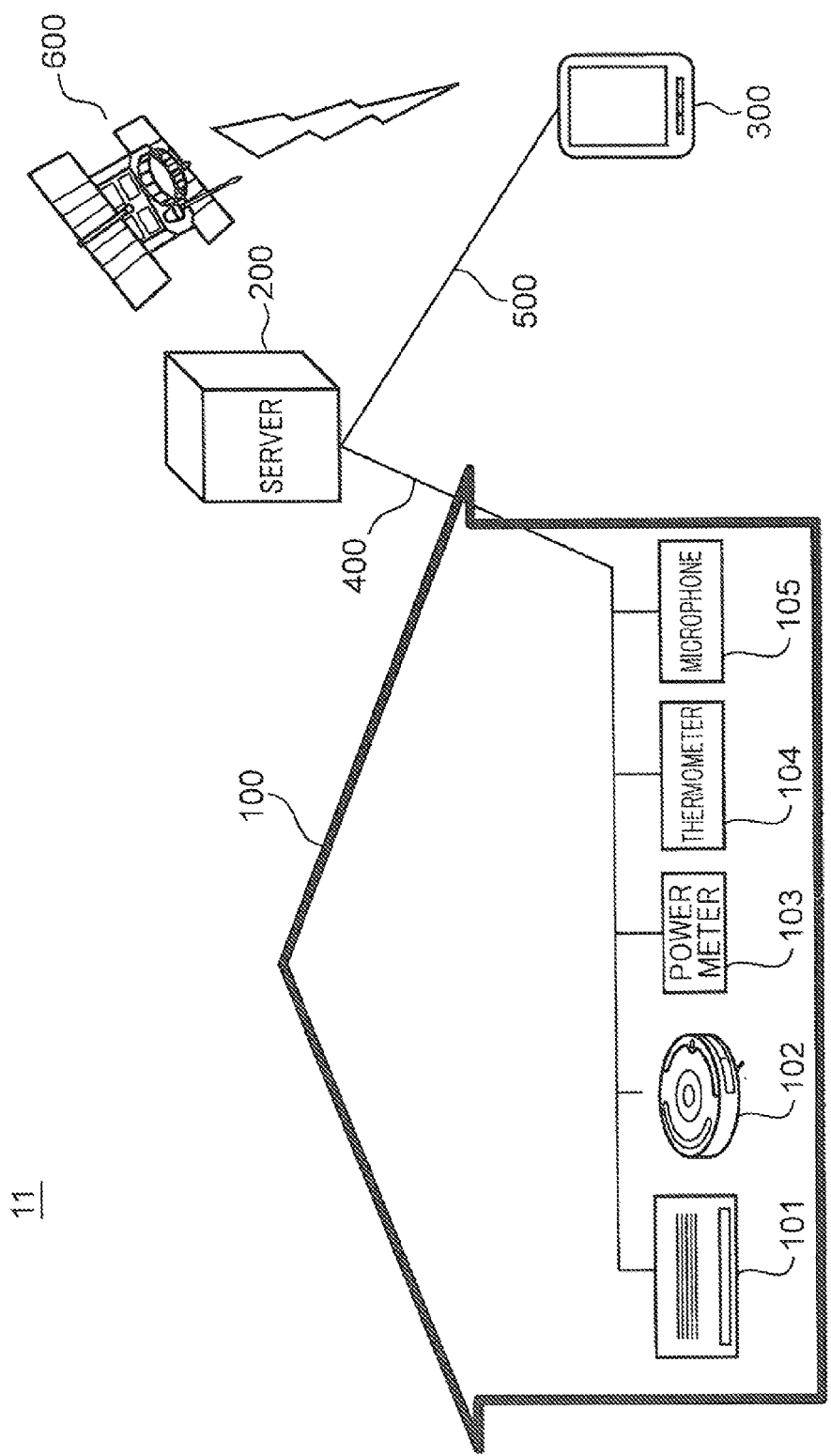
FIG. 1 is an overall configuration diagram of an information notification system 11 according to a first embodiment of the present disclosure.

DESCRIPTION OF EMBODIMENTS (Findings on which the Present Disclosure is Based)

Among systems that notify an operational status of a device, there are systems that issue a notification with respect to a slave device which is not independently operated but is operated in conjunction with a master device among a plurality of electrical appliances when the slave device is running in a state where the master device is not. (Patent Literature 1<Japanese Patent No. 4703784>)

However, with the technique disclosed in Patent Literature 1, when power consumption as measured by a power consumption measuring apparatus (1001) which is attached to each electrical appliance (1005) exceeds a threshold, it is determined that each electrical appliance (1005) is running. Therefore, no consideration is given for determining an operational status of an electrical appliance that is not provided with a dedicated measurement device for measuring power consumption for each device as in the case of, for example, an electric home appliance and an AV device.

In addition, with the technique according to Patent Literature 1, there is a problem in that, for example, when power consumption is calculated erroneously by a power consumption measuring apparatus due to a failure in the power consumption measuring apparatus or when information indicating power consumption is not correctly transmitted between an electrical appliance and the power consumption measuring apparatus due to deterioration of a path that connects the electrical appliance to the power consumption measuring apparatus, a user is unable to recognize a failure of an electrical appliance even if an operational status of the electrical appliance is erroneously determined and does not notice the error in the determination.

In consideration thereof, the following improvement measures have been examined for the purpose of improving functions of information notification systems.

The aspect described above is, for example, an information notification method in an information management system which manages information indicating a state of one or more electric home appliances in a house, the information notification method including:

receiving log information including an operational state of one electric home appliance among the one or more electric home appliances, from the one electric home appliance via a first network;

receiving information indicating an operational state of the one electric home appliance from another electric home appliance via the first network, the other electric home appliance being capable of monitoring the operational state of the one electric home appliance;

receiving positional information of a display terminal of a user of the electric home appliance from the display terminal; and when it is determined that a position of the display terminal is within a range of a prescribed distance from the house as a result of a comparison between positional information of the house and the positional information of the display terminal and when it is determined that the log information received from the one electric home appliance and the information indicating the operational state of the one electric home appliance that is received from the other electric home appliance are not consistent with each other, providing the display terminal with information on a possibility of a malfunction of the one electric home appliance via a second network while the position of the display terminal is still within the range of the prescribed distance from the house.

According to the aspect described above, when it is determined that a position of a display terminal of a user of the electric home appliance is within a range of the prescribed distance from the house based on positional information of the display terminal and when log information including an operational state of the one electric home appliance among the one or more electric home appliances which is received from the one electric home appliance and information indicating the operational state of the one electric home appliance that is received from another electric home appliance capable of monitoring the operational state of the one electric home appliance are not consistent with each other, information on a possibility of a malfunction of the one electric home appliance is provided to the display terminal.

Accordingly, since a malfunction of the one electric home appliance is determined using log information including an operational state of the one electric home appliance which is received from the one electric home appliance, a malfunction of the one electric home appliance can be accurately determined even if the one electric home appliance is not provided with a dedicated measurement device.

In addition, when log information including an operational state of the one electric home appliance and information indicating the operational state of the one electric home appliance that is received from another electric home appliance capable of monitoring the operational state of the one electric home appliance are not consistent with each other, information on a possibility of a malfunction of the one electric home appliance is provided to the display terminal of the user. Therefore, for example, even when an operational state of the one electric home appliance that is indicated by the log information turns out to be erroneous due to, for example, a failure of the one electric home appliance or deterioration of a transmission path that receives the log information from the one electric home appliance, the user can recognize that there is a possibility of a malfunction of the one electric home appliance. Accordingly, the user can take appropriate action such as inspecting or repairing the one electric home appliance and the transmission path.

Furthermore, since information on an electric home appliance performing an operation that differs from an operational state indicated by another electric home appliance is notified, the display terminal can be prevented from receiving state notifications of all electric home appliances managed by the information notification system. Accordingly, since a communication amount can be prevented from increasing excessively, an increase in network traffic due to an increase in the communication amount can be prevented. In addition, the prevention of excessive communication enables an increase in communication cost to be suppressed without troubling the user.

In the aspect described above, for example, the first network and the second network may be the same network.

In the aspect described above, for example, the first network and the second network may be different networks.

In the aspect described above, for example, local map information of a locality that includes a position indicated by the positional information of the display terminal may be acquired using a database that manages map information, positional information of the display terminal that is periodically received may be managed together with reception times, a travel speed of the display terminal may be calculated based on a change in the positional information of the display terminal over time, and whether or not the position of the display terminal is within the range of the prescribed distance from the house may be determined using the calculated travel speed of the display terminal and the local map information.

In this case, since the travel speed of the display terminal is calculated and local map information is acquired, a position of the display terminal at a timing when information on a possibility of a malfunction is notified to the display terminal can be predicted. Therefore, even if accurate positional information of the display terminal at the timing of the notification is unknown, whether or not the display terminal is within a range of a prescribed distance at the timing of the notification can be determined.

In the aspect described above, for example, correspondence information indicating the other one or more electric home appliances that corresponds to the one electric home appliance may be managed, and the other one or more electric home appliances associated with the one electric home appliance may be selected based on the correspondence information.

In this case, since correspondence information is managed, an electric home appliance that is the other electric home appliance which monitors the one electric home appliance can be readily identified.

In the aspect described above, for example, when the position of the display terminal is not consistent with a position of the house and is still within the range of the prescribed distance, information on a possibility of a malfunction of the one electric home appliance may be provided to the display terminal via the second network.

Accordingly, when the positional information of the display terminal of the user of the electric home appliance indicates that the display terminal is away from the house and is still within the range of the prescribed distance from the house, information on a possibility of a malfunction of the one electric home appliance is notified to the display terminal. Therefore, in an appropriate period of time in which the user of the display terminal has gone out but the user is not too far from the house, the determination result can be notified to the display terminal of the user.

Information on a possibility of a malfunction can be notified to the user when the user can still relatively easily return to the house such as when the user has gone out but is still within several tens of meters from the house or prior to the user using public transportation. Issuing the notification to the user at this timing makes it easier for the user to select an action of returning to the house to change the operational state of the electric home appliance. Therefore, wasting of power due to, for example, the user going out while leaving electric home appliances such as an air conditioner and a television set in on-states can be prevented.

In the aspect described above, for example, when the position of the display terminal is coincidence a position of the house and is still within the range of the prescribed distance, information on a possibility of a malfunction of the one electric home appliance may be provided to the display terminal via the second network.

Accordingly, when the positional information of the display terminal of the user of the electric home appliance is coincidence the house and the display terminal is still within the range of the prescribed distance from the house, information on a possibility of a malfunction is notified to the display terminal. Therefore, information on a possibility of a malfunction of the one electric home appliance may be notified to the display terminal of the user while the user of the display terminal is still inside the house.

In the aspect described above, for example, local map information that includes a position indicated by the positional information of the display terminal may be acquired using a database that manages map information, a change in the positional information of the display terminal that is received from the display terminal may be tracked on the local map information, a route to the house on the local map information and a travel speed of the display terminal may be determined based on the tracked change in the positional information of the display terminal, a time required by the user of the display terminal to return to the house may be calculated using the determined route and travel speed when providing the information on a possibility of a malfunction of the one electric home appliance to the display terminal, and information indicating the time required by the user of the display terminal to return to the house may be provided based on the calculated time together with the information on a possibility of a malfunction of the one electric home appliance.

In the aspect described above, for example, an elapsed time from when the display terminal leaves a region corresponding to the house may be measured, the measured time may be acquired when providing the information on a possibility of a malfunction of the one electric home appliance to the display terminal, and information indicating a time required by the user of the display terminal to return to the house may be provided based on the acquired time together with the information on a possibility of a malfunction of the one electric home appliance.

In this case, since the time required by the user to return to the house is also displayed when displaying the information on a possibility of a malfunction on the display terminal, the user can be provided with information for making a determination on whether or not to return to the house.

In the aspect described above, for example, the positional information of the display terminal may be periodically received from the display terminal.

In this case, since positional information is periodically notified, a travel speed of the display terminal can be readily calculated from a plurality of pieces of positional information and a route traveled by the user can be traced using map information.

In the aspect described above, for example, the other electric home appliance may be a power meter which is connected to the information management system via the first network and which detects power consumption in the house, and the information indicating the operational state of the one electric home appliance that is received from the other electric home appliance may be information indicating the power consumption received from the power meter via the first network.

In this case, an operational state of the one electric home appliance can be accurately determined using power consumption detected by the power meter.

In the aspect described above, for example, the other electric home appliance may include a sound pickup apparatus which is connected to the information management system via the first network and which collects an operating noise of the one electric home appliance, and the information indicating the operational state of the one electric home appliance that is received from the other electric home appliance may be information indicating the operating noise of the one electric home appliance that is received from the other electric home appliance via the first network.

In this case, since an operating noise detected by the sound pickup apparatus is notified, an operational state of the one electric home appliance can be accurately determined based on the operating noise.

In the aspect described above, for example, the other electric home appliance may include an electronic thermometer which is connected to the information management system via the first network and which measures temperature inside the house, and the information indicating the operational state of the one electric home appliance that is received from the other electric home appliance may be information indicating the temperature inside the house that is received from the other electric home appliance via the first network.

In this case, since temperature detected by the electronic thermometer is notified, an operational state of the one electric home appliance can be accurately determined based on the temperature.

In addition, another aspect of the present invention is an information notification method in an information management system which manages information indicating a state of one or more electric home appliances in a house, the information notification method including:

receiving log information including an operational state of the one electric home appliance from the one electric home appliance via a first network;

receiving information indicating the operational state of the one electric home appliance from another electric home appliance via the first network, the other electric home appliance being capable of monitoring the operational state of the one electric home appliance;

receiving positional information of a display terminal of a user of the electric home appliance from the display terminal;

acquiring local map information that includes a position indicated by the positional information of the display terminal, using a database that manages map information;

tracking a change in the positional information of the display terminal that is received from the display terminal, on the local map information;

calculating a travel distance that is traveled by the display terminal from the house on the local map information based on the tracked change in the positional information of the display terminal, and when it is determined that the log information received from the one electric home appliance and the information indicating the operational state of the one electric home appliance that is received from the other electric home appliance are not consistent with each other, providing the display terminal with information on a possibility of a malfunction of the one electric home appliance via a second network until the travel distance of the display terminal from the house exceeds a prescribed distance.

According to the aspect described above, a travel distance that is traveled by the display terminal of the user of the electric home appliance from the house is calculated using a change in the positional information of the display terminal. In addition, when it is determined that the travel distance of the display terminal is within a range of the prescribed distance and when log information including an operational state of the one electric home appliance among the one or more electric home appliances which is received from the one electric home appliance and information indicating the operational state of the one electric home appliance that is received from another electric home appliance capable of monitoring the operational state of the one electric home appliance are not consistent with each other, information on a possibility of a malfunction of the one electric home appliance is provided to the display terminal.

Accordingly, even if the one electric home appliance is not provided with a dedicated measurement device, an operational state of the one electric home appliance can be accurately determined and, at the same time, information on a possibility of a malfunction can be conveyed to the display terminal of the user in an appropriate period of time in which the user of the display terminal has gone out but the user is not too far from the house in consideration of a distance that is actually traveled by the user.

Let us assume that the user leaves the house and proceeds to a point at a linear distance of 1 kilometer from the house, at which point the user discovers that road construction is underway and makes a detour or the user finds that roads are complicated. In such cases, a distance actually traveled by the user may be, for example, 1.5 kilometers. In other words, the travel distance is conceivably longer than the linear distance from the house. In the aspect described above, since a deadline of notification to the user is determined based on a distance that is actually traveled from the house, information on a possibility of a malfunction can be notified to the user while a distance that the user must travel in order to return to the house is relatively short. By notifying the information to the user at this timing, the user can more readily select an action of returning to the house in order to take appropriate action such as inspecting or repairing the one electric home appliance and the transmission path.

In addition, since information on an electric home appliance performing an operation that differs from an operational state indicated by another electric home appliance is notified, the display terminal can be prevented from receiving state notifications of all electric home appliances managed by the information notification system. Accordingly, since a communication amount can be prevented from increasing excessively, an increase in network traffic due to an increase in the communication amount can be prevented. Furthermore, the prevention of excessive communication enables an increase in communication cost to be suppressed without troubling the user.

Furthermore, another aspect of the present invention is an information notification method in an information management system which manages information indicating a state of one or more electric home appliances in a house, the information notification method including:

managing information specifying one electric home appliance among the one or more electric home appliances;

receiving log information including an operational state of the one electric home appliance from the one electric home appliance via a first network;

receiving information indicating the operational state of the one electric home appliance from another electric home appliance via the first network, the other electric home appliance being capable of monitoring the operational state of the one electric home appliance;

determining whether or not the log information received from the one electric home appliance and the information indicating the operational state of the one electric home appliance that is received from the other electric home appliance are consistent with each other;

receiving positional information of a display terminal of a user of the electric home appliance from the display terminal; and when it is determined that a position of the display terminal is within a range of a prescribed distance from the house as a result of a comparison between positional information of the house and the positional information of the display terminal, providing information indicating a result of the comparison between the log information received from the one electric home appliance and the information indicating the operational state of the one electric home appliance that is received from the other electric home appliance, to the display terminal via a second network while the position of the display terminal is still within the range of the prescribed distance from the house.

According to the aspect described above, information specifying one electric home appliance among the one or more electric home appliances is managed, and when a position of the display terminal is within a range of a prescribed distance from the house, a result of a comparison between log information including an operational state of the one electric home appliance that is received from the one electric home appliance and the information indicating the operational state of the one electric home appliance that is received from another electric home appliance capable of monitoring the operational state of the one electric home appliance is provided to the display terminal.

Accordingly, for example, the user can specify one desired electric home appliance among a prescribed number or more of electric home appliances inside the house after going out and before exiting a range of a prescribed distance and can acquire, via a display terminal, a result of a comparison between log information including an operational state of the one electric home appliance and information indicating an operational state of the one electric home appliance that is received from another electric home appliance that monitors the one electric home appliance. As a result, the user can confirm whether or not a malfunction of the one electric home appliance has occurred based on the comparison result.

In addition, since a malfunction of the one electric home appliance is determined using log information including an operational state of the one electric home appliance which is received from the one electric home appliance, a malfunction of the one electric home appliance can be accurately determined even if the one electric home appliance is not provided with a dedicated measurement device.

Furthermore, a result of a comparison between log information including an operational state of the one electric home appliance and information indicating the operational state of the one electric home appliance that is received from another electric home appliance capable of monitoring the operational state of the one electric home appliance is provided to the display terminal of the user. Therefore, for example, even when an operational state of the one electric home appliance that is indicated by the log information turns out to be erroneous due to, for example, a failure of the one electric home appliance or deterioration of a transmission path that receives the log information from the one electric home appliance, the user can recognize that there is a possibility of a malfunction of the one electric home appliance. Accordingly, the user can take appropriate action such as inspecting or repairing the one electric home appliance and the transmission path.

In addition, since a only a comparison result with respect to the one electric home appliance that is specified in advance is transmitted to the display terminal of the user, the display terminal can be prevented from receiving state notifications with respect to all electric home appliances that is managed by the information notification system. Accordingly, since a communication amount can be prevented from increasing excessively, an increase in network traffic due to an increase in the communication amount can be prevented. Furthermore, the prevention of excessive communication enables an increase in communication cost to be suppressed without troubling the user.

In the aspect described above, for example, correspondence information indicating the other one or more electric home appliances that corresponds to the one electric home appliance may be managed, and the other one or more electric home appliances associated with the one electric home appliance may be selected based on the correspondence information.

In this case, since correspondence information is managed, an electric home appliance that is the other electric home appliance which monitors the one electric home appliance can be readily identified.

In the aspect described above, for example, local map information that includes a position indicated by the positional information of the display terminal may be acquired using a database that manages map information, a change in the positional information of the display terminal that is received from the display terminal may be tracked on the local map information, a route to the house on the local map information and a travel speed of the display terminal may be determined based on the tracked change in the positional information of the display terminal, a time required by the user of the display terminal to return to the house may be calculated using the determined route and travel speed when providing information indicating the comparison result to the display terminal, and information indicating the time required by the user of the display terminal to return to the house may be provided based on the calculated time together with the information indicating the comparison result.

In the aspect described above, for example, an elapsed time from when the display terminal leaves a region corresponding to the house may be measured, the measured time may be acquired when providing the information on a possibility of a malfunction of the one electric home appliance to the display terminal, and information indicating a time required by the user of the display terminal to return to the house may be provided based on the acquired time together with information indicating a result of a comparison between the log information received from the one electric home appliance and the information indicating the operational state of the one electric home appliance that is received from the other electric home appliance.

In this case, since the time required by the user to return to the house is also displayed when displaying the information indicating the comparison result on the display terminal, the user can be provided with information for making a determination on whether or not to return to the house.

In the aspect described above, for example, the other electric home appliance may be a power meter which is connected to the information management system via the first network and which detects power consumption in the house, and the information indicating the operational state of the one electric home appliance that is received from the other electric home appliance may be information indicating the power consumption received from the power meter via the first network.

In this case, an operational state of the one electric home appliance can be accurately determined using power consumption detected by the power meter.

Furthermore, another aspect of the present invention is an information notification method in an information management system which manages information indicating a state of one or more electric home appliances in a house, the information notification method including:

receiving an operation instruction for operating one electric home appliance among the one or more electric home appliances;

receiving log information including an operational state of the one electric home appliance from the one electric home appliance via a first network;

receiving information indicating the operational state of the one electric home appliance from another electric home appliance via the first network, the other electric home appliance being capable of monitoring the operational state of the one electric home appliance;

collating the operation instruction for operating the one electric home appliance, the log information received from the one electric home appliance, and the information indicating the operational state of the one electric home appliance that is received from the other electric home appliance, and receiving positional information of a display terminal of a user of the electric home appliance from the display terminal; and when it is determined that a position of the display terminal is within a range of a prescribed distance from the house as a result of a comparison between positional information of the house and the positional information of the display terminal, providing the display terminal with information indicating whether or not the operation instruction to the one electric home appliance is successful based on a result of the collation while the position of the display terminal is still within the range of the prescribed distance from the house.

According to the aspect described above, for example, when an operation instruction is input by the user to one electric home appliance after going out and before exiting a prescribed distance range, log information of the one electric home appliance is collated with information indicating an operational state of the one electric home appliance that is received from another electric home appliance. Subsequently, the information indicating whether or not the operation instruction to the one electric home appliance is successful is provided to a display terminal based on a result of the collation before the user exits the prescribed distance range. Therefore, when the user inputs an operation instruction with respect to one electric home appliance from an outing destination, the user can recognize whether or not the operation instruction is successful.

In addition, since information indicating whether or not the operation instruction is successful is notified when the user is within a prescribed distance range from the house, the user having received the notification can return to the house to set the one electric home appliance to a desired operational state and go out once again. Accordingly, the user can go out without any anxiety.

In the aspect described above, for example,
the information indicating whether or not the operation instruction to the one electric home appliance is successful may include information indicating a possibility of a failure of the one electric home appliance.

In this case, the user can readily recognize whether or not a failure of the one electric home appliance having issued the operation instruction has occurred.

All of the embodiments described below represent specific examples of the present disclosure. Numerical values, shapes, components, steps, and orders of steps described in the following embodiments simply represent examples and are not intended to limit the present disclosure in any way. In addition, components not described in independent claims representing highest concepts among the components of the following embodiments are to be described as arbitrary components. Furthermore, respective contents of all embodiments can be combined with one another.

(Overview of Service to be Provided)

First, an overview of a service that is provided by an information management system according to the present embodiment will be described.

Figure 39A:
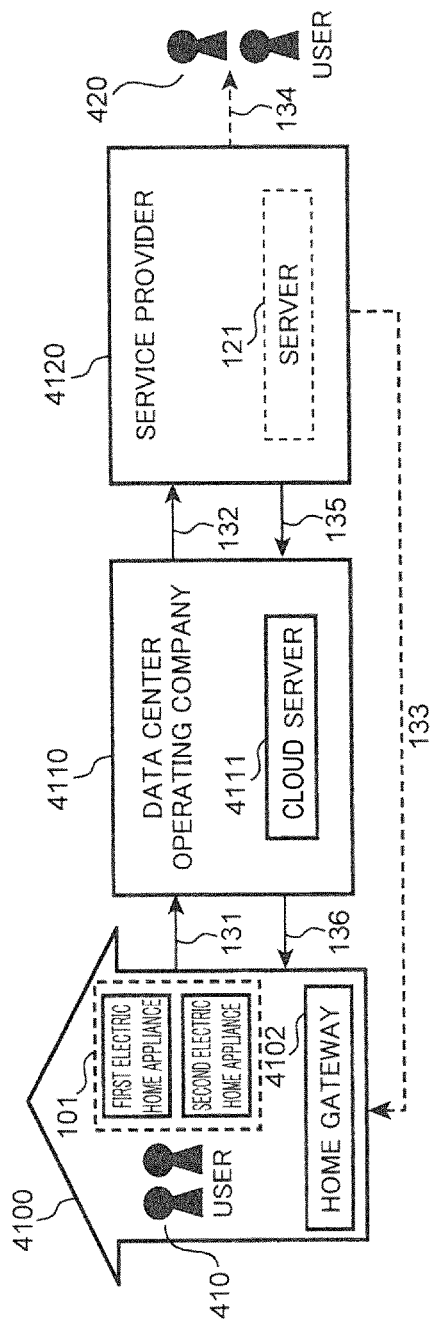
FIG. 39A is a diagram showing an overview of a service provided by an information management system according to a present embodiment.

FIG. 39A is a diagram showing an overview of a service provided by the information management system according to the present embodiment. The information management system includes a group 4100, a data center operating company 4110, and a service provider 4120.

The group 4100 is, for example, a corporation, an organization, and a home and may be of any size. The group 4100 includes a plurality of electric home appliances 101 including a first device and a second device and a home gateway 4102. The plurality of electric home appliances 101 include devices capable of connecting to the Internet (for example, a smartphone, a personal computer (PC), and a television set) as well as devices incapable of connecting to the Internet by themselves (for example, a lighting fixture, a washing machine, and a refrigerator). The plurality of electric home appliances 101 may include devices that become capable of connecting to the Internet via the home gateway 4102 even though the devices are incapable of connecting to the Internet by themselves. In addition, a user 410 uses the plurality of electric home appliances 101 in the group 4100.

The data center operating company 4110 includes a cloud server 4111. The cloud server 4111 is a virtual server that links with various devices via the Internet. The cloud server 4111 mainly manages huge data (big data) and the like which are difficult to handle using general database management tools or the like. The data center operating company 4110 manages data, manages the cloud server 4111, and operates a data center that performs such management. Details of services provided by the data center operating company 4110 will be described later.

Figure 39B:
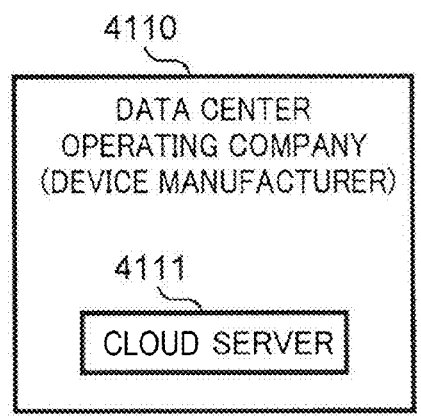
FIG. 39B is a diagram showing an example in which a device manufacturer corresponds to a data center operating company.
Figure 39C:
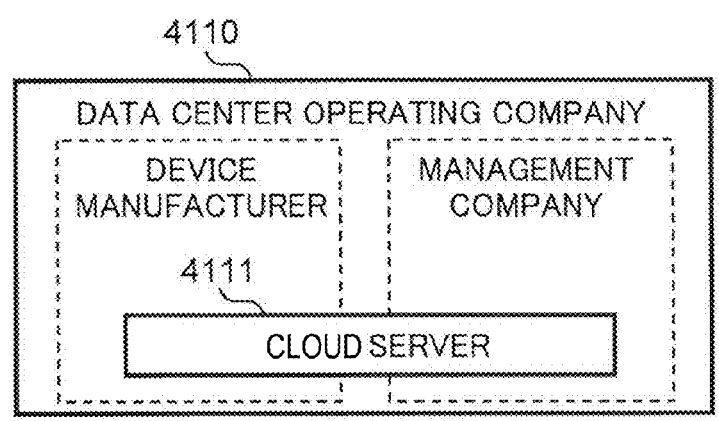
FIG. 39C is a diagram showing an example in which both of or one of a device manufacturer and a management company corresponds to a data center operating company.

In this case, the data center operating company 4110 is not limited to companies that only manage data or only manage the cloud server 4111. For example, as shown in FIG. 39B, when a device manufacturer responsible for developing or manufacturing one device among the plurality of electric home appliances 101 also manages data or manages the cloud server 4111, the device manufacturer corresponds to the data center operating company 4110. In addition, the data center operating company 4110 is not limited to one company. For example, as shown in FIG. 39C, when a device manufacturer and a management company manage data or manage the cloud server 4111 in cooperation or in a shared manner, both of or one of the device manufacturer and the management company correspond to the data center operating company 4110.

The service provider 4120 includes a server 121. The server 121 as referred to herein may be of any scale and includes, for example, a memory in a personal PC. In addition, there may be cases where the service provider 4120 does not include the server 121.

Moreover, in the information management system described above, the home gateway 4102 is not essential. For example, the home gateway 4102 is unnecessary in a case where the cloud server 4111 performs all data management. In addition, there may be cases where there are no devices that are incapable of connecting to the Internet by themselves such as when all devices in a household are connected to the Internet.

Next, a flow of information in the information management system will be described.

First, the first device or the second device in the group 4100 transmits respective pieces of log information to the cloud server 4111 of the data center operating company 4110. The cloud server 4111 accumulates log information of the first device or the second device (an arrow 131 in FIG. 39A). In this case, log information refers to information indicating an operation state, an operation date/time, or the like of the plurality of electric home appliances 101. For example, while log information includes a viewing history of a television set, video recording reservation information of a recorder, an operation date/time of a washing machine, an amount of laundry, an opening/closing time/date of a refrigerator, the number of times a refrigerator had been opened/closed, or the like, log information is not limited to these types of information and may include various types of information that can be acquired from various types of devices. Moreover, the log information may be directly provided by the plurality of electric home appliances 101 themselves to the cloud server 4111 via the Internet. In addition, the log information may be temporarily accumulated in the home gateway 4102 from the plurality of electric home appliances 101 and provided to the cloud server 4111 by the home gateway 4102.

Next, the cloud server 4111 of the data center operating company 4110 provides the accumulated log information to the service provider 4120 in fixed units. In this case, the fixed unit may be a unit that can be provided by the data center operating company 4110 to the service provider 4120 by organizing accumulated information or may be a unit that is requested by the service provider 4120. In addition, while log information is to be provided in fixed units as described above, the log information need not necessarily be provided in fixed units and an amount of information to be provided may vary according to circumstances. When necessary, the log information is stored in a server 121 owned by the service provider 4120 (an arrow 132 in FIG. 39A).

Subsequently, the service provider 4120 organizes the log information into information matching a service to be provided to the user and provides the organized information to the user. The user to which the information is provided may be the user 410 who uses the plurality of electric home appliances 101 or an outside user 420. As for a method of providing information to the users 410 and 420, for example, the information may be directly provided to the users 410 and 420 by the service provider 4120 (arrows 133 and 134 in FIG. 39A). In addition, as for a method of providing information to the user 410, for example, the information may be provided to the user 410 once again via the cloud server 4111 of the data center operating company 4110 (arrows 135 and 136 in FIG. 39A). Furthermore, the cloud server 4111 of the data center operating company 4110 may organize the log information into information matching the service to be provided to the user and provide the organized information to the service provider 4120.

Moreover, the user 410 may differ from the user 420 or may be the same as the user 420.

1. First Embodiment

An information management system related to the present disclosure (an example of an information management system) will now be described with reference to the drawings as an embodiment of the present disclosure.

1.1 Overall Configuration of Information Management System

FIG. 1 is a diagram showing an overall configuration of an information notification system 11 according to a first embodiment of the present disclosure. The information notification system 11 includes a house 100, an electric home appliance 101, an electric home appliance 102, a monitoring device 103, a monitoring device 104, and a monitoring device 105 which are respectively inside the house 100, a server 200, a mobile device 300, a network 400 that connects the house 100 to the server 200 (an example of a first network), a network 500 that connects the server 200 to the mobile device 300 (an example of a second network), and a GPS (Global Positioning System) satellite 600 for measuring positions of the house 100 and the mobile device 300. Moreover, the mobile device 300 is an example of a display terminal.

While only the electric home appliances 101 and 102 and the monitoring devices 103, 104, and 105 are illustrated in the house 100 in FIG. 1, the present disclosure is not limited thereto. The house 100 may include arbitrary numbers of electric home appliances and monitoring devices. In addition, as an expected mode of connection, a mode can be used in which the electric home appliances 101 and 102 are connected to each other inside the house 100 via a router (not shown) installed in the house 100 and are connected to the network 400 outside of the house 100 via the router. Furthermore, while the networks 400 and 500 are respectively assumed to be, for example, a wired Internet line and a wireless 4G communication path, these configurations are not restrictive. Both networks may similarly be wireless communication paths.

The description of embodiments of the present disclosure will be given on the assumption of, for example, the following scenario.

A user has left the house 100 while holding the mobile device 300 and is moving away from the house 100. In this case, for example, it is assumed that the electric home appliance 101 is an air conditioner. In addition, although the air conditioner is supposed to be set to an off-state upon going out, it is assumed that the user has gone out while forgetting to set the air conditioner to the off-state. Furthermore, it is assumed that a failure has occurred in the air conditioner or in a network unit for connecting the air conditioner to the network 400 and that the air conditioner has notified the server 200 that the air conditioner's own operational state is the off-state despite actually being in an on-state. Meanwhile, a power meter and a thermometer which are associated as monitoring devices for monitoring the on-state or the off-state (on/off state) of the air conditioner report monitoring logs indicating that the air conditioner is in the on-state to the server 200. The server 200 compares an operational state indicated by an electric home appliance log notified from the air conditioner with an operational state indicated by the monitoring logs notified from the monitoring devices, and when determining that both operational states are inconsistent, recognizes that a failure has occurred in the air conditioner or in the network unit of the air conditioner. Subsequently, the server 200 notifies information on a possibility of a malfunction of the air conditioner to the mobile device 300 while the user (in other words, the mobile device 300) is still within a prescribed range.

The prescribed range refers to a range in which the user can easily return to the house 100. For example, a range until the user boards a bus or a train, a range of a prescribed distance such as a distance of 100 meters from the house 100, and a range including points from which it takes 5 minutes or less to return to the house 100 correspond to the prescribed range. The user having received the notification returns to the house 100 in order to confirm the operational state of the air conditioner, sets the air conditioner to the off-state, and once again goes out from the house 100. Accordingly, the user can confirm an operational state of electric home appliances and go out without any anxiety.

1.2 Electric Home Appliance 101

Figure 2:
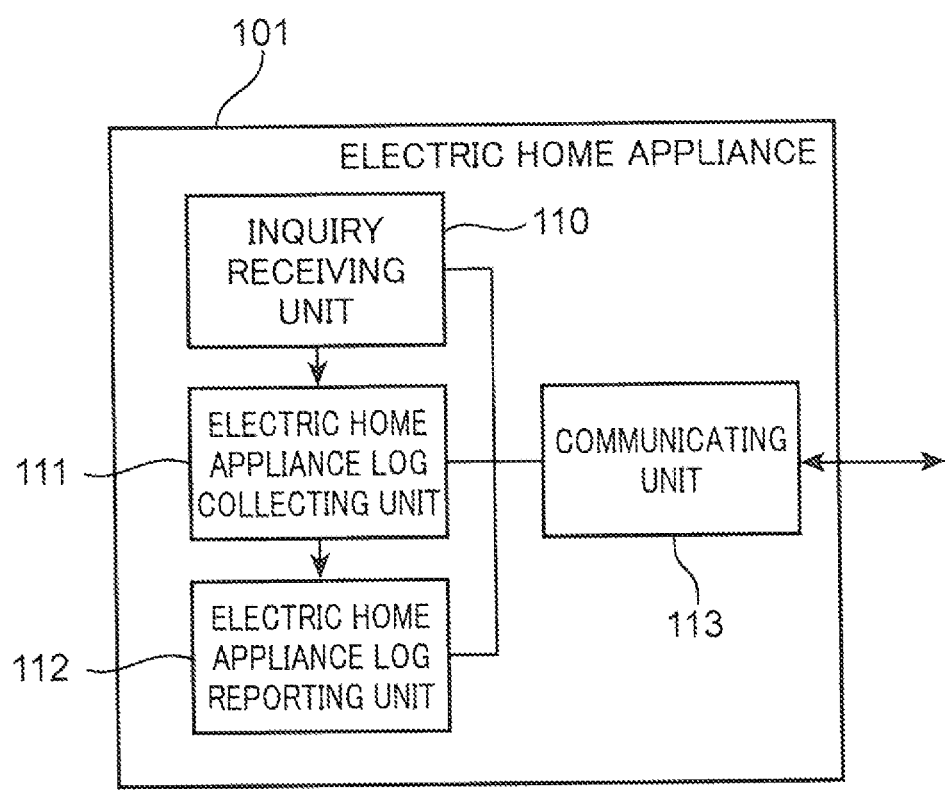
FIG. 2 is a block diagram of an electric home appliance 101 of the information notification system 11 according to the first embodiment of the present disclosure.

FIG. 2 is a block diagram showing a configuration of the electric home appliance 101 inside the house 100. Since the electric home appliance 102 shares the same configuration as the electric home appliance 101, a description thereof will be omitted. The electric home appliance 101 includes an inquiry receiving unit 110, an electric home appliance log collecting unit 111, an electric home appliance log reporting unit 112, and a communicating unit 113.

1.2.1 Inquiry Receiving Unit 110

The inquiry receiving unit 110 receives an inquiry from the server 200. An inquiry includes an ID (identifier) of the server 200 that is an inquiry source, an ID of the electric home appliance 101 that is an inquiry destination, and a command for causing an electric home appliance log of the electric home appliance to be reported to the server 200. In this case, the electric home appliance log includes an operational state of an electric home appliance (whether the electric home appliance is in an on-state or an off-state).

1.2.2 Electric Home Appliance Log Collecting Unit 111

When the inquiry receiving unit 110 receives an inquiry from the server 200, the electric home appliance log collecting unit 111 collects an electric home appliance log of the electric home appliance 101 including whether or not the electric home appliance 101 is currently running (whether the electric home appliance 101 is in an on-state or an off-state) from inside the electric home appliance 101 and organizes the electric home appliance log into an appropriate format. The electric home appliance log may include a time of collection and operational states of other electric home appliances 101. For example, when the electric home appliance 101 is an air conditioner, the electric home appliance log may include information such as information indicating whether a current set mode is a cooler mode or a heater mode, a set temperature, an air flow, current room temperature, and outside temperature.

An upper part of FIG. 15 represents a diagram showing an example of a data configuration of an electric home appliance log D131 of an air conditioner. The electric home appliance log D131 includes items of a "device ID", "time", "on/off", a "set value", and a "current state". The "device ID" item stores an ID for uniquely identifying an electric home appliance. The "time" item stores a time of collection of the electric home appliance log D131. The "on/off" item stores information indicating whether the electric home appliance is currently in an on-state or an off-state. The "set value" item stores a current set value of the electric home appliance. The "current state" item stores a state of a room in which an air conditioner that is the electric home appliance is detected.

In this example, an operational state of an air conditioner (1) at a time point of 7:00 on Apr. 10, 2013 is shown. Therefore, "air conditioner (1)" is stored in the "device ID" item and "2013.4.10 7:00" is stored in the "time" item. In addition, since the air conditioner (1) is in the on-state at this time point, "on" is stored in the "on/off" item. Furthermore, since set values of the air conditioner (1) at this time point include temperature set to 22 degrees, humidity set to 40%, a heater mode as the current set mode, and an operation mode set to automatic setting (for example, an operation mode in which the set mode is automatically switched to the cooler mode or the heater mode), "22 degrees, 40%, heater, automatic" are stored in the "set value" item. Moreover, since the room temperature and humidity detected by the air conditioner (1) at this time point are respectively 21 degrees and 33%, "21 degrees, 33%" are stored in the "current state" item.

A middle part of FIG. 15 represents a diagram showing an example of a data configuration of an electric home appliance log D132 of a VCR (2). Since the VCR (2) does not detect temperature and humidity in a room, the "current state" item has been omitted from the electric home appliance log D132. Otherwise, the data configuration of the electric home appliance log D132 is the same as that of the electric home appliance log D131. In this example, since an operational state of the VCR (2) at a time point of 7:00 on Apr. 10, 2013 is shown, "VCR (2)" and "2013.4.10 7:00" are respectively stored in the "device ID" item and the "time" item. In addition, since the VCR (2) is stopped (in the off-state) at this time point, "off" is stored in the "on/off" item. Furthermore, since a recording reservation on Channel 4 for 19:00 on the same day is set to the VCR (2) at this time point, "4.10 19:00 4ch" is stored in the "set value" item.

A lower part of FIG. 15 represents a diagram showing an example of a data configuration of an electric home appliance log D133 of a power meter. Since the power meter does not have set values, the "set value" item has been omitted from the electric home appliance log D133. Otherwise, the data configuration of the electric home appliance log D133 is the same as that of the electric home appliance log D131.

In this example, since a state of the power meter at a time point of 7:00 on Apr. 10, 2013 is shown, "power meter" is stored in the "device ID" item and "2013.4.10 7:00" is stored in the "time" item. In addition, since the power meter has measured that current power consumption is 1 kW, "1 kW" is stored in the "current state" item.

1.2.3 Electric Home Appliance Log Reporting Unit 112

Returning now to FIG. 2, the electric home appliance log reporting unit 112 converts an electric home appliance log organized into a prescribed format by the electric home appliance log collecting unit 111 into an appropriate format that can be decoded by the server 200 in order to report the electric home appliance log to the server 200. This format includes the ID of the electric home appliance 101 that is a report source, the ID of the server 200 that is a report destination, and an electric home appliance log (for example, the electric home appliance log D131 shown in FIG. 15).

1.2.4 Communicating Unit 113

The communicating unit 113 connects the electric home appliance 101 to a router (not shown) in a wired manner or via a wireless LAN (Local Area Network) inside the house 100. As the communicating unit 113, for example, a communication module that supports an IEEE 802.11 series wireless LAN or an IEEE 802.3 series wired LAN can be adopted.

1.3 Monitoring Device 103

Figure 3:
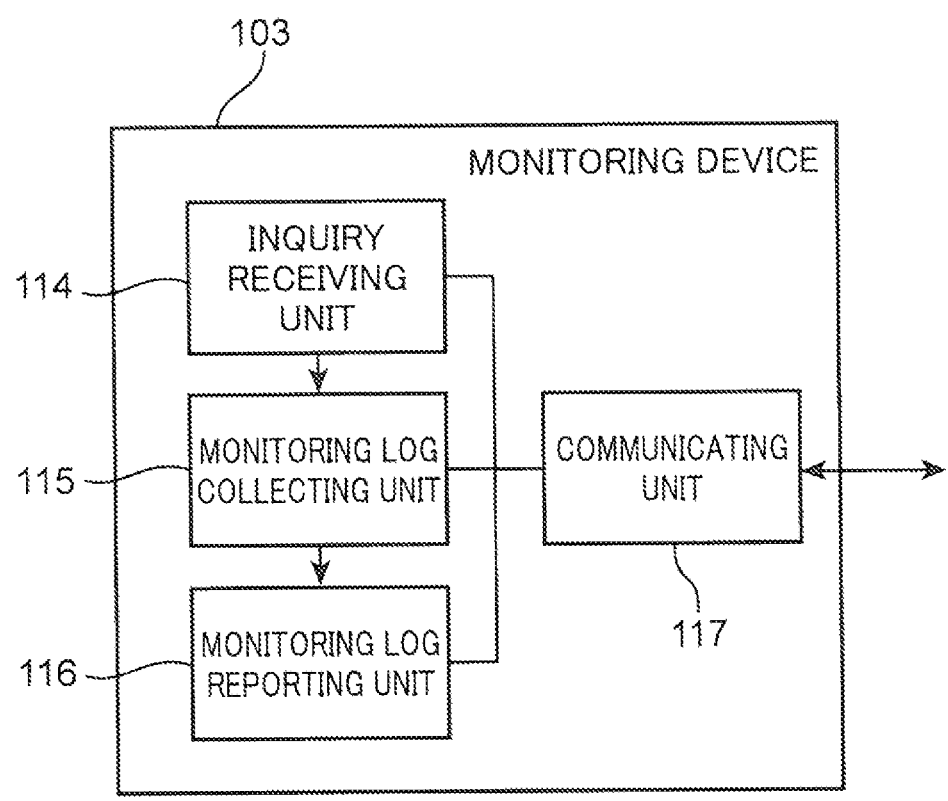
FIG. 3 is a block diagram of a monitoring device 103 of the information notification system 11 according to the first embodiment of the present disclosure.

FIG. 3 shows a configuration of the monitoring device 103 (in this example, a power meter). The monitoring device 103 includes an inquiry receiving unit 114, a monitoring log collecting unit 115, a monitoring log reporting unit 116, and a communicating unit 117. Since the inquiry receiving unit 114 and the communicating unit 117 are respectively the same as the inquiry receiving unit 110 and the communicating unit 113 in the electric home appliance 101, a description thereof will be omitted.

Moreover, since the monitoring devices 104 and 105 basically share the same configuration as the monitoring device 103, a description thereof will be omitted.

1.3.1 Monitoring Log Collecting Unit 115

The monitoring log collecting unit 115 collects prescribed information related to an electric home appliance determined to be monitored in advance as a monitoring log. For example, when the monitoring device 103 (power meter) sets the electric home appliance 101 (air conditioner) as a monitoring object, the monitoring log collecting unit 115 of the power meter collects a value of power supplied to a power supply of the air conditioner as a monitoring log. In addition, an operational state (including an on/off state) of the air conditioner is obtained based on the power value. For example, when the monitoring device 104 (thermometer) sets the electric home appliance 101 (air conditioner) as a monitoring object, the monitoring log collecting unit 115 of the thermometer collects a temperature near the air conditioner or a temperature of a room in which the air conditioner is installed as a monitoring log. In addition, an operational state (including an on/off state) of the air conditioner is obtained based on the temperature measured by the thermometer. For example, when the monitoring device 104 (sound sensor) sets the electric home appliance 102 (automatic cleaner) as a monitoring object, the monitoring log collecting unit 115 of the sound sensor collects an operating noise of the electric home appliance 102 (automatic cleaner) as a monitoring log. In addition, an operational state (including an on/off state) of the cleaner is obtained based on the operating noise. Subsequently, the monitoring log collecting unit 115 converts the collected monitoring log into a prescribed format that can be decoded by the monitoring log reporting unit 116 and outputs the converted monitoring log to the monitoring log reporting unit 116. An example of a format of a monitoring log is shown in the lower part of FIG. 15.

1.3.2 Monitoring Log Reporting Unit 116

The monitoring log reporting unit 116 converts the monitoring log organized into a prescribed format and output by the monitoring log collecting unit 115 into a format for reporting to the server 200 and transmits the converted monitoring log to the server 200 via the communicating unit 117. In this case, the format for reporting to the server 200 includes the ID of the monitoring device 103 that is a report source, the ID of the server 200 that is a report destination, and the monitoring log collected by the monitoring device 103 (for example, a power value in the case of a power meter).

1.4 Server 200

Figure 4:
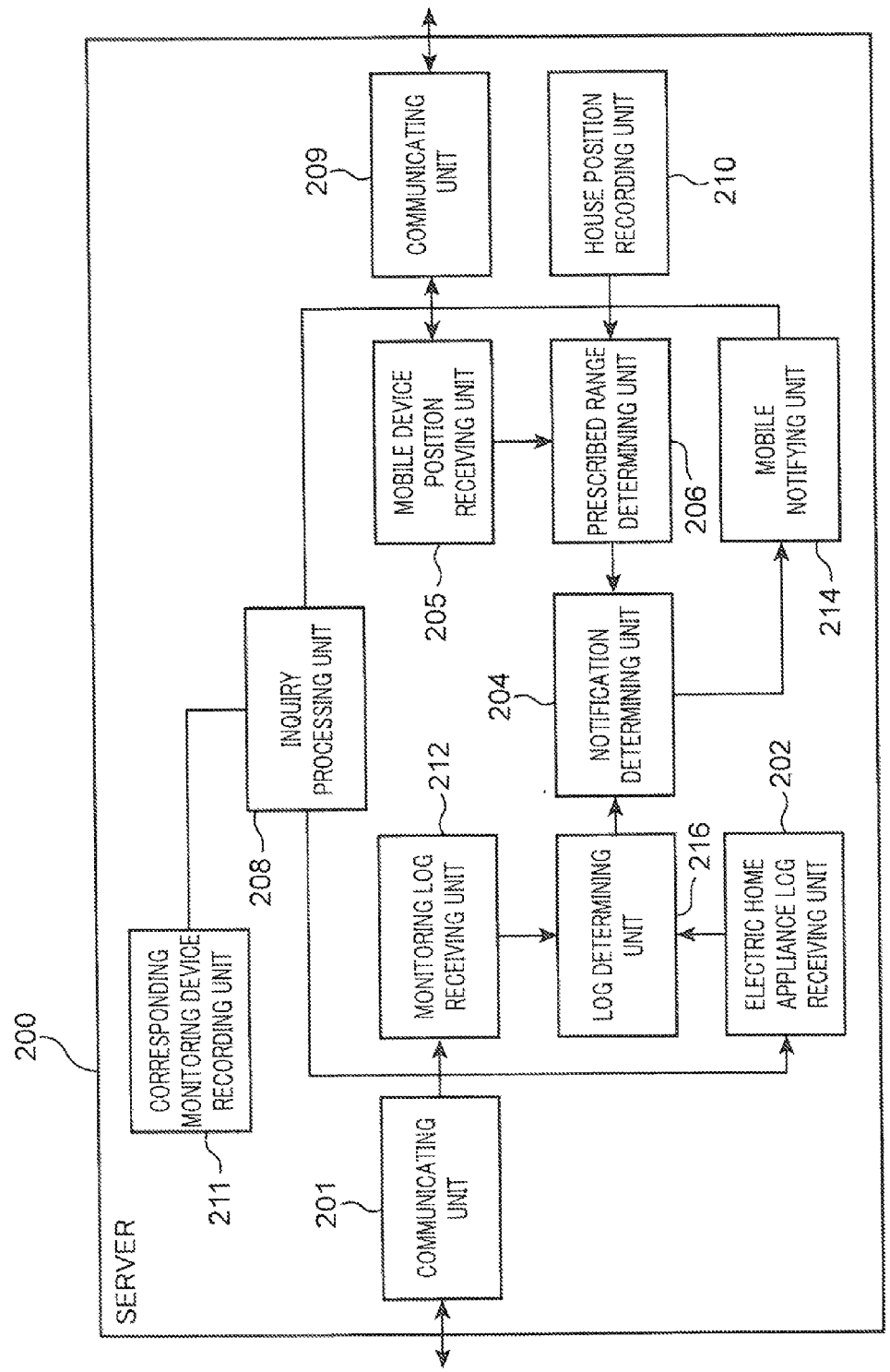
FIG. 4 is a block diagram of a server 200 of the information notification system 11 according to the first embodiment of the present disclosure.

FIG. 4 is a block diagram of a server 200 in the information notification system 11. The server 200 includes a communicating unit 201, an electric home appliance log receiving unit 202, a monitoring log receiving unit 212, a log determining unit 216, a corresponding monitoring device recording unit 211, a notification determining unit 204, a mobile device position receiving unit 205, a prescribed range determining unit 206, an inquiry processing unit 208, a communicating unit 209, a house position recording unit 210, and a mobile notifying unit 214.

1.4.1 Communicating Unit 201

The communicating unit 201 connects an electric home appliance inside the house 100 and the server 200 to each other via the network 400. In this case, the network 400 is assumed to be an Internet network for wired communication. Alternatively, the communicating unit 201 may connect the server 200 to the electric home appliance via a wireless communication network. As the communicating unit, a communication module such as a modem can be adopted.

1.4.2 Electric Home Appliance Log Receiving Unit 202

The electric home appliance log receiving unit 202 receives an electric home appliance log from an electric home appliance that has responded to an inquiry from the server 200.

1.4.3 Notification Determining Unit 204

When the prescribed range determining unit 206 determines that the mobile device 300 is within a prescribed range and, at the same time, the log determining unit 216 determines that an operational state of one electric home appliance indicated by an electric home appliance log collected from the electric home appliance and an operational state of the electric home appliance that is indicated by a monitoring log collected from a monitoring device corresponding to the electric home appliance are not consistent with each other, the notification determining unit 204 determines that information on a possibility of a malfunction of the electric home appliance (hereinafter, referred to as malfunction information) is to be notified to the mobile device 300. Hereinafter, inconsistency between an operational state indicated by an electric home appliance log and an operational state indicated by a monitoring log will be simply described as inconsistency between an electric home appliance log and a monitoring log.

1.4.4 Mobile Device Position Receiving Unit 205

The mobile device position receiving unit 205 receives positional information (latitude and longitude) of the mobile device 300 from the mobile device 300 via the communicating unit 209.

1.4.5 Prescribed Range Determining Unit 206

The prescribed range determining unit 206 determines whether or not the mobile device 300 is present within a prescribed range. Examples of a prescribed range will be described in detail in 1.6.4 to 1.6.6.

Figure 12:
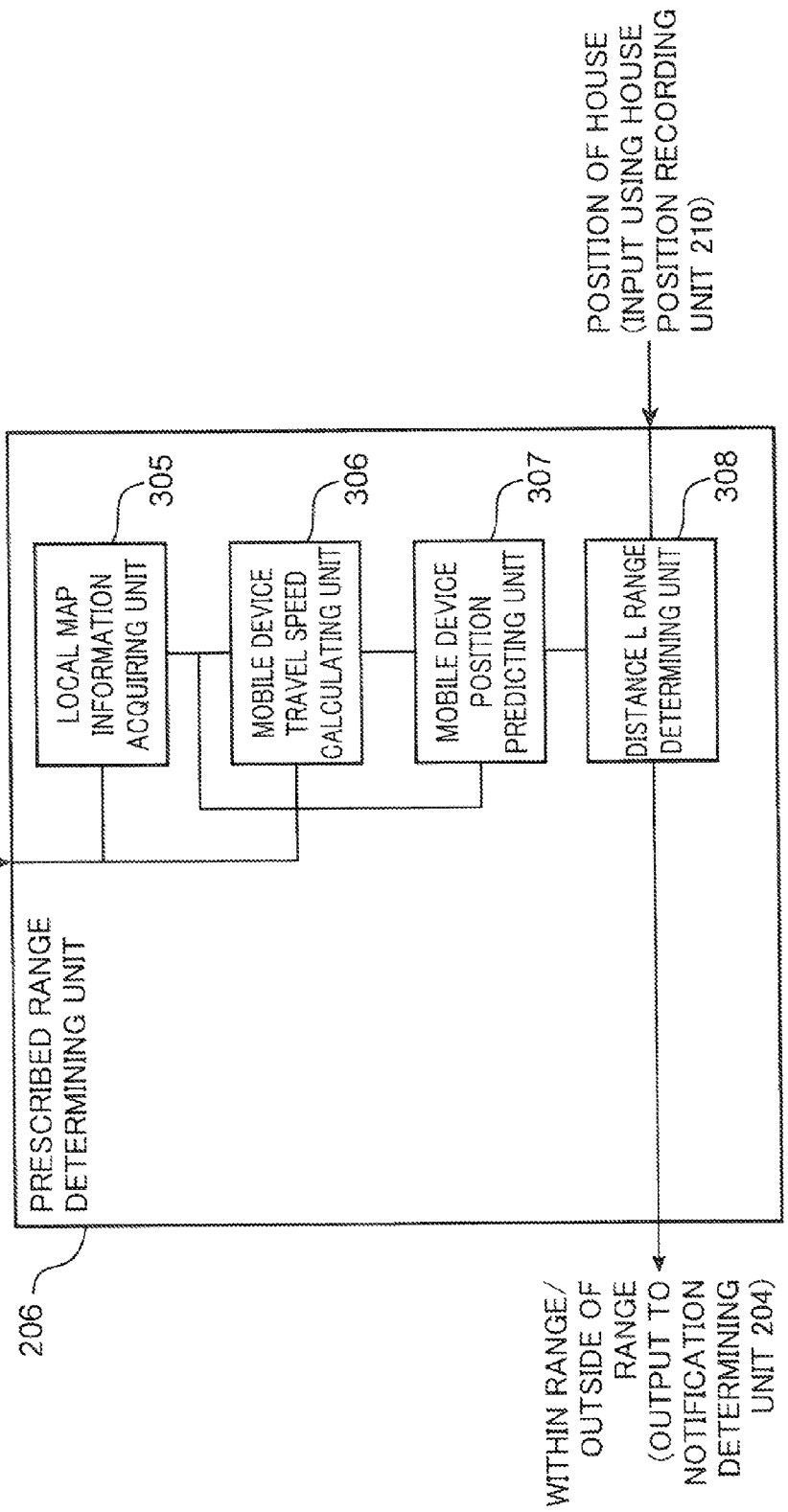
FIG. 12 is a block diagram of a third example of the prescribed range determining unit 206 of the information notification system 11 according to the first embodiment of the present disclosure.

FIG. 12 is a block diagram showing a detailed configuration of the prescribed range determining unit 206 including map information to be described in 1.6.6. The prescribed range determining unit 206 includes a local map information acquiring unit 305, a mobile device travel speed calculating unit 306, a mobile device position predicting unit 307, and a distance L range determining unit 308.

The local map information acquiring unit 305 acquires local map information of a locality that includes a current position of the mobile device 300 from a database (not shown) that manages map information. The local map information that is acquired at this point at least includes the prescribed range.

The mobile device travel speed calculating unit 306 calculates a travel speed of the mobile device 300 using periodically reported positional information of the mobile device 300.

The mobile device position predicting unit 307 predicts a position of the mobile device 300 when notifying an electric home appliance log using the local map information and the travel speed of the mobile device 300.

The distance L range determining unit 308 determines whether or not the position of the mobile device 300 as predicted by the mobile device position predicting unit 307 is present within a prescribed range that is defined by a radius of a distance L and the house 100 as a center.

1.4.6 Inquiry Processing Unit 208

Returning now to FIG. 4, the inquiry processing unit 208 transmits an inquiry instruction for causing each electric home appliance inside the house 100 to report an electric home appliance log to each electric home appliance via the communicating unit 201. In addition, the inquiry processing unit 208 transmits an inquiry instruction for causing each monitoring device inside the house 100 to report a monitoring log to each monitoring device via the communicating unit 201.

1.4.7 Communicating Unit 209

The communicating unit 209 connects the server 200 to the mobile device 300 via the network 500. In this case, the network 500 is assumed to be a wireless 4G communication network. Therefore, as the communicating unit 209, for example, a communication module that connects the server 200 to the wireless 4G communication network can be adopted.

1.4.8 House Position Recording Unit 210

The house position recording unit 210 records, in advance, positional information (latitude and longitude) of the house 100 to which a service by the information notification system 11 is to be applied. Since the server 200 manages one or more houses 100, the house position recording unit 210 records positional information of all houses 100 to be management objects.

1.4.9 Corresponding Monitoring Device Recording Unit 211

The corresponding monitoring device recording unit 211 records a correspondence table H17 showing a correspondence relationship between an electric home appliance and a monitoring device that monitors the electric home appliance. FIG. 17 is a diagram showing an example of a data configuration of the correspondence table H17. In this example, it is recorded that the monitoring device 103 and the monitoring device 104 of the electric home appliance 101 (air conditioner) are, respectively, a power meter and a thermometer and that the monitoring device 105 of the electric home appliance 102 (automatic cleaner) is a sound sensor (microphone). Moreover, a plurality of monitoring devices may be registered with respect to one electric home appliance or one monitoring device may monitor a plurality of electric home appliances.

1.4.10 Monitoring Log Receiving Unit 212

The monitoring log receiving unit 212 receives, via the communicating unit 201, a monitoring log transmitted from a monitoring device as a response to an inquiry made by the inquiry processing unit 208 to the monitoring device.

1.4.11 Mobile Notifying Unit 214

When the notification determining unit 204 determines it necessary to notify malfunction information due to the presence of an electric home appliance whose monitoring log and electric home appliance log are inconsistent and the presence of the mobile device 300 within the prescribed range, the mobile notifying unit 214 notifies the malfunction information to the mobile device 300. In this case, a format of the notification includes the ID of the server 200 that is a notification source, the ID of the mobile device 300 that is a notification destination, and the ID of an electric home appliance for which a possibility of a malfunction has been determined. When there are a plurality of electric home appliances with a possibility of a malfunction, the number and IDs thereof are sequentially listed up. Moreover, the format of the notification may include time information and an ID and a name of a monitoring device.

1.4.12 Log Determining Unit 216

The log determining unit 216 determines an operational state (including an on/off state) of the electric home appliance using the electric home appliance log received by the electric home appliance log receiving unit 202. In addition, the log determining unit 216 determines what kind of operational state the corresponding electric home appliance is in using the monitoring log received by the monitoring log receiving unit 212. Furthermore, the log determining unit 216 compares the operational state determined based on the electric home appliance log and the operational state determined based on the monitoring log with each other using, for example, an operation state determination table T7 shown in FIG. 7 and determines whether or not the operational states are consistent. Moreover, in the example shown in FIG. 7, an on-state and an off-state are adopted as operational states.

FIG. 7 is a diagram showing an example of a data configuration of the operation state determination table T7. The operation state determination table T7 includes items of a "monitoring log (1)", a "monitoring log (2)", an "electric home appliance log", and "determination in S107".

"Monitoring log (1)" represents an on/off state of a given electric home appliance as indicated by a monitoring log (1) collected from a monitoring device (1) associated with the electric home appliance.

"Monitoring log (2)" represents an on/off state of a given electric home appliance as indicated by a monitoring log (2) collected from a monitoring device (2) associated with the electric home appliance.

"Electric home appliance log" represents an on/off state of a given electric home appliance as indicated by an electric home appliance log collected from the electric home appliance.

Determination results in S107 corresponding to cases (1) to (8) which represent combination patterns of respective on-states and off-states of the "monitoring log (1)", the "monitoring log (2)", and the "electric home appliance log" are registered in "determination in S107". In this case, S107 refers to a process step shown in FIG. 6 to be described later.

In case (1), since the monitoring log (1), the monitoring log (2), and the electric home appliance log are all determined to be in the on-state, the operational states indicated by the monitoring logs and the operational state indicated by the electric home appliance log are consistent. Therefore, in case (1), "no inconsistency on" is registered as the "determination in S107" and a determination is made that operational states of the electric home appliance are consistent in the on-state.

In addition, in cases (2) to (6) and (8), since on-states and off-states coexist for the monitoring log (1), the monitoring log (2), and the electric home appliance log, the operational states indicated by the monitoring logs and the operational state indicated by the electric home appliance log are not consistent. Therefore, for each of cases (2) to (6) and (8), "inconsistent" is registered as the "determination in S107" and a determination is made that operational states of the electric home appliance are inconsistent.

In addition, in case (7), since all of the monitoring log (1), the monitoring log (2), and the electric home appliance log indicate the off-state, the operational states indicated by the monitoring logs and the operational state indicated by the electric home appliance log are consistent. Therefore, in case (7), "no inconsistency off" is registered as the "determination in S107" and a determination is made that operational states of the electric home appliance are consistent in the off-state.

In other words, when the operational state indicated by the electric home appliance log and the operational states indicated by the monitoring logs are all the on-state, the log determining unit 216 determines that the electric home appliance log and the monitoring logs are consistent with respect to the corresponding electric home appliance. On the other hand, when a corresponding monitoring device is notifying a monitoring log which indicates that the electric home appliance is in the on-state despite the electric home appliance notifying an electric home appliance log of an off-state, the log determining unit 216 determines that the electric home appliance log and the monitoring logs are inconsistent with respect to the corresponding electric home appliance.

1.5 Mobile Device 300

Figure 5:
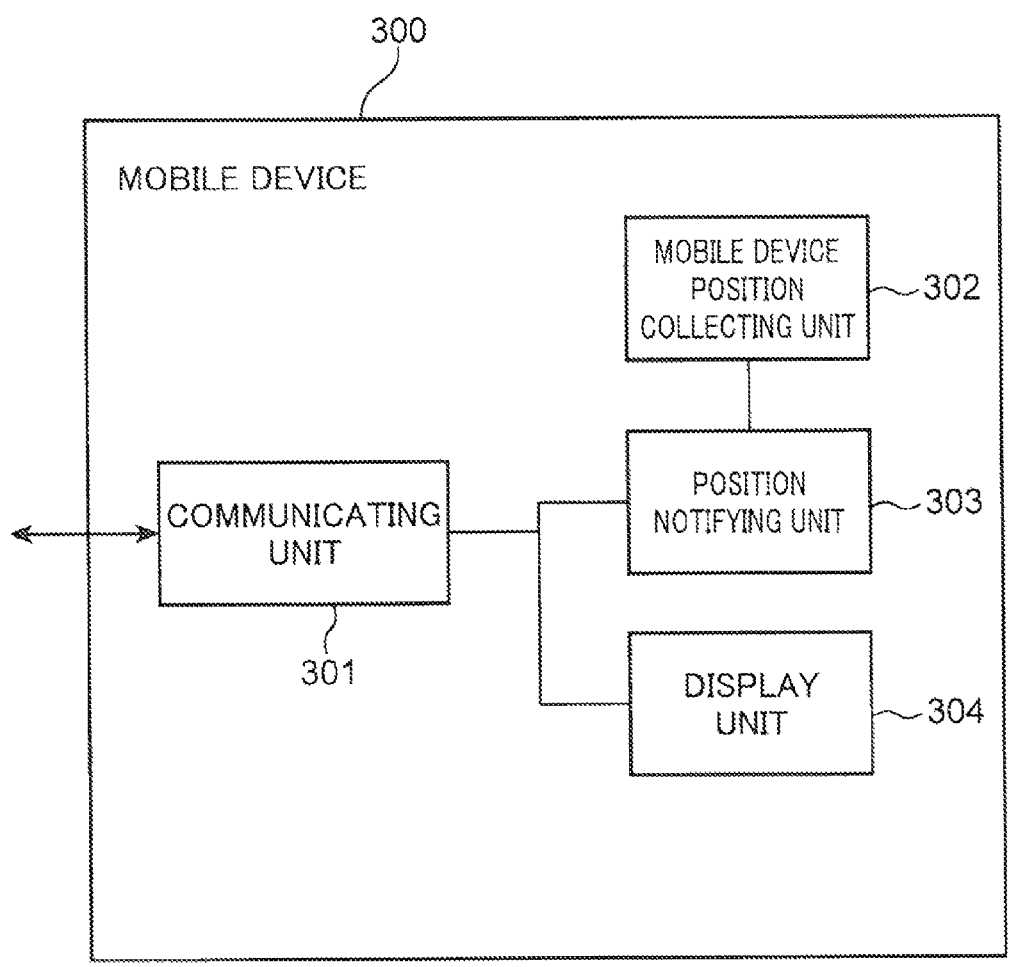
FIG. 5 is a block diagram of a mobile device 300 of the information notification system 11 according to the first embodiment of the present disclosure.

FIG. 5 is a block diagram showing a configuration of the mobile device 300 in the information notification system 11. The mobile device 300 includes a communicating unit 301, a mobile device position collecting unit 302, a position notifying unit 303, and a display unit 304.

1.5.1 Communicating Unit 301

The communicating unit 301 connects the mobile device 300 to the server 200 via the network 500.

1.5.2 Mobile Device Position Collecting Unit 302

The mobile device position collecting unit 302 receives radio waves from the GPS satellite 600 (originally, radio waves for time tones from three or more satellites are used) and calculates current positional information (latitude and longitude).

1.5.3 Position Notifying Unit 303

The position notifying unit 303 converts positional information of the mobile device 300 into a prescribed format that can be decoded by the server 200 and periodically notifies the positional information to the server 200. The format includes the ID of the mobile device 300 that is a notification source, the ID of the server 200 that is a notification destination, and positional information of the mobile device 300. Moreover, the format may include time information (for example, notification time).

1.5.4 Display Unit 304

The display unit 304 displays a notification screen that shows a notification from the server. FIG. 19 is a diagram showing an example of a notification screen G19 for notifying malfunction information of an air conditioner to the user. The example shown in FIG. 19 shows the notification screen G19 of a case where an electric home appliance log of the air conditioner indicates an on-state but a monitoring log of a monitoring device indicates an off-state. Moreover, the notification screen G19 may be output to the display unit 304 as a popup by an application (service application) installed in the mobile device 300 for receiving a service from the information notification system 11. In addition, the mobile device 300 may display the notification screen G19 when receiving a notification by e-mail from the server 200.

1.6 Operations of Information Management System 11

Figure 6:
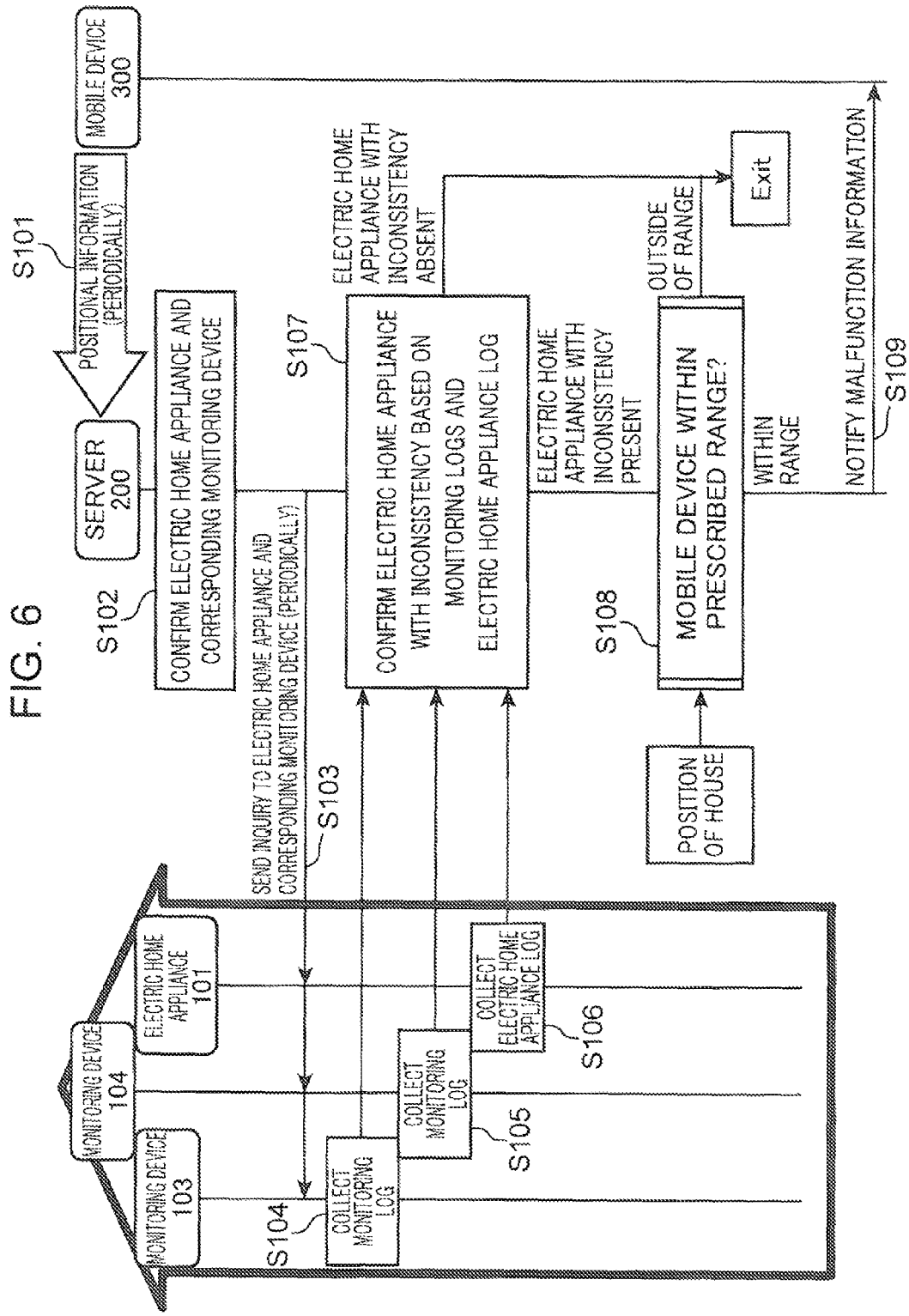
FIG. 6 is a sequence diagram showing operations of the information notification system 11 according to the first embodiment of the present disclosure.

FIG. 6 is a sequence diagram showing an example of operations of the information notification system 11. Operations of the information notification system 11 are divided into: 1) a registration phase of registering a monitoring device corresponding to an electric home appliance; and 2) notification phase of confirming an operational state of each electric home appliance based on a monitoring log transmitted from the monitoring device and notifying malfunction information to the mobile device 300. Hereinafter, operations of each phase will be described.

1.6.1 Monitoring Device Registration Phase

FIG. 16 is a diagram showing a registration screen G16 for registering a monitoring device of, for example, an air conditioner. The registration screen G16 is displayed on the mobile device 300. On the registration screen G16, candidates of monitoring device capable of monitoring an operational state of the air conditioner among monitoring devices installed in the house 100 are displayed as a list. In the example shown in FIG. 16, a power meter, a thermometer, and a sound sensor (microphone) are listed as candidates. Moreover, the monitoring devices exemplified here need not necessarily be an independent power meter, an independent thermometer, or an independent sound sensor. For example, when there is an electric home appliance that includes a function of a power meter, a thermometer, a sound sensor, or the like, the electric home appliance may be displayed in a list on the registration screen G16 as a monitoring device. For example, a washing machine including a sound sensor or the like may be a monitoring device candidate.

In this case, monitoring devices registered in the server 200 in advance are adopted as the monitoring devices to be displayed as a list on the registration screen G16. The server 200 may extract, in advance for each electric home appliance, electric home appliances that may potentially become monitoring device candidates from electric home appliances installed in the house 100 and may display the extracted electric home appliances in a list on the registration screen G16.

When a washing machine or the like that includes a sound sensor is present in the house 100 as a monitoring device, there may be cases where the washing machine is installed at a location that is separated from an installation location of an air conditioner that is a monitoring object and is therefore unable to detect an operating noise of the air conditioner. In such a case, the washing machine may be omitted from the registration screen G16 shown in FIG. 16. In this case, the server 200 may manage positional information of each electric home appliance installed in the house 100 and determine whether or not a given electric home appliance is applicable as a monitoring device of one electric home appliance based on the positional information. When the server 200 manages a floor plan of the house 100, coordinates on a floor plan that represent an installation location of each electric home appliance may be adopted as positional information of each electric home appliance. In addition, the server 200 may use the coordinates to determine that, since a given electric home appliance is installed far from the one electric home appliance, the given electric home appliance is not appropriate as a monitoring device.

A description of characteristics when each monitoring device monitors an operational state of the air conditioner is provided on the registration screen G16. For example, methods of determining an operational state of the air conditioner (whether the air conditioner is in an on-state or an off-state) based on a monitoring log from the power meter include a method using a power value itself (absolute value) and a method using a power change. When only the air conditioner is connected to a system to which the power meter is connected, the server 200 may determine an operational state of the air conditioner with accuracy using a power value measured by the power meter. On the other hand, when an electric home appliance with high power consumption other than the air conditioner is connected to a system to which the power meter is connected, it is possible that the server 200 is unable to determine an operational state of the air conditioner with accuracy using a power value measured by the power meter. In this case, the server 200 may determine an operational state of the air conditioner based on a power change.

Therefore, in the example shown in FIG. 16, a description of "Monitoring will be made based on power value itself or a power change." is given in a "power meter" display field as a characteristic of monitoring when using a power meter. At this point, whether a determination method based on a power value itself or a determination method based on a power change is to be adopted may be specified by the user or may be determined by the server 200. In the latter case, the server 200 may manage, in advance, information indicating to which outlet (system) in the house 100 each electric home appliance is connected, and select the determination method described above based on this information.

When an operational state of the air conditioner is to be determined based on a temperature measured by a thermometer, the server 200 may determine an on-state or an off-state of the air conditioner based on an absolute value of the temperature measured by the thermometer. Alternatively, the server 200 may calculate a transition over time of temperature based on measurement values of temperature obtained through a plurality of measurements performed by the thermometer and determine an on-state or an off-state of the air conditioner based on the transition over time. In this case, since several measurement values of temperature are necessary, determining an operational state of the air conditioner requires a certain amount of time.

Therefore, in the example shown in FIG. 16, a description of "Monitoring will be made based on temperature itself or a temperature change. Monitoring will take some time." is given in a "thermometer" display field as a characteristic of monitoring when using a thermometer.

When an operational state of the air conditioner is to be determined based on sound measured by a sound sensor, an on-state or an off-state of the air conditioner is determined based on an air blowing noise of the air conditioner Therefore, in the example shown in FIG. 16, a description of "Monitoring will be made based on operating noise of air conditioner." is given in a "sound sensor" display field.

The user selects a monitoring device from the candidates listed on the registration screen G16. At this point, the user may select a plurality of monitoring devices.

A check box C16 for selecting each of the monitoring devices that are displayed in a list is provided on the registration screen G16. Since a power meter, a thermometer, and a sound sensor are displayed in a list in the example shown in FIG. 16, three check boxes C16 corresponding to these three monitoring devices are displayed. The user selects a monitoring device by operating the mobile device 300 to enter a check mark in a check box C16. In the example shown in FIG. 16, check marks are entered in the check boxes C16 of the power meter and the thermometer and, consequently, the power meter and the thermometer are selected as the monitoring devices of the air conditioner.

When a monitoring device is selected by the user, the corresponding monitoring device recording unit 211 records the ID of the selected monitoring device in association with the ID of the electric home appliance to be monitored by the monitoring device in the correspondence table H17. In the example shown in FIG. 17, the power meter and the thermometer are recorded as monitoring devices that determine an operational state of the air conditioner.

In addition, a determination condition that is applied when determining that an electric home appliance is in an on-state is also recorded in the correspondence table H17. In the example shown in FIG. 17, "1 kW or more" is registered as a "value when on" for the "power meter". This means that, when power consumption as detected by the power meter indicates a value of 1 kW or more, the power meter determines that the air conditioner is in an on-state.

Furthermore, in the example shown in FIG. 17, "temperature near air conditioner or in room is 25 degrees or lower (June to August) or 15 degrees or higher (December to February)" is recorded as a "value when on" for the "thermometer". This means that the air conditioner is determined to be in an on-state when the temperature near the air conditioner or in the room in which the air conditioner is installed is 25 degrees or lower in summer (June to August) and 15 degrees or higher in winter (December to February). This is because it is assumed that a cooler operation is to be performed in summer and a heater operation is to be performed in winter.

In addition, in the example shown in FIG. 17, a "sound sensor" is recorded in association with an "automatic cleaner". Furthermore, in the example shown in FIG. 17, "60 dB or higher" is registered as a "value when on" for the "automatic cleaner". This means that, when an operating noise of 60 dB or higher of the automatic cleaner is detected by the sound sensor, the sound sensor determines that the automatic cleaner is in an on-state.

Moreover, whether or not the operating noise detected by the sound sensor is an operating noise of the automatic cleaner may be determined by, for example, performing a frequency analysis on the operating noise detected by the sound sensor. For example, a determination that an operating noise of the automatic cleaner has been detected by the sound sensor may be made when the operating noise is Fourier-transformed to extract a feature quantity of the operating noise and a similarity between the extracted feature quantity and a feature quantity determined in advance as the operating noise of the automatic cleaner is equal to or higher than a certain level.

While an example in which determination criteria are changed according to the season has been described above as determination criteria for determining an on-state of the air conditioner based on temperature acquired by a thermometer, the same determination criteria may be adopted throughout the year. For example, it is conceivable that an air conditioner hardly ever performs heater operations in regions at low latitudes and that an air conditioner hardly ever performs cooler operations in regions at high latitudes. In such a case, as determination criteria, the same determination criteria may be adopted throughout the year.

In addition to the settings of determination criteria described above, determination criteria may be flexibly set based on meteorological characteristics of each region or the like.

1.6.2 Information Notification Phase

FIG. 6 is a sequence diagram showing operations in a notification phase of the information notification system 11.

(S101)

The mobile device 300 periodically notifies its own positional information to the server 200.

(S102)

The inquiry processing unit 208 of the server 200 confirms an electric home appliance to be an inquiry object and a monitoring device corresponding to the electric home appliance. At this point, the inquiry processing unit 208 may confirm a monitoring device by referring to the correspondence table H17 recorded in the corresponding monitoring device recording unit 211 and acquiring an ID of a monitoring device of each electric home appliance. When a plurality of monitoring devices are registered with respect to the electric home appliance to be an inquiry object, the server 200 acquires IDs of the plurality of monitoring devices. In this case, it is assumed that the electric home appliance 101 (air conditioner) has been adopted as the electric home appliance that is the inquiry object. In addition, it is assumed that IDs of the monitoring device 103 (power meter) and the monitoring device 104 (thermometer) have been acquired as monitoring devices of the electric home appliance 101 (air conditioner).

Moreover, as the electric home appliance 101 to be an inquiry object, an electric home appliance which is installed inside the house 100 and which is considered to be a management object by the server 200 is adopted. In this example, since the electric home appliance 101 is managed by the server 200, the electric home appliance 101 is adopted as the electric home appliance that is the inquiry object. Moreover, the server 200 may not transmit an inquiry to an electric home appliance that is constantly in an on-state (for example, a refrigerator) even when the electric home appliance is a management object.

(S103)

The inquiry processing unit 208 of the server 200 periodically transmits, to the electric home appliance 101, an inquiry that causes the electric home appliance 101 to notify an electric home appliance log, and periodically transmits, to the monitoring devices 103 and 104, an inquiry that causes the monitoring devices 103 and 104 to notify a monitoring log.

(S104)

The monitoring device 103 (power meter) receives the inquiry from the server 200, collects a monitoring log, and transmits the monitoring log to the server 200. For example, the monitoring device 103 (power meter) collects power values of a power supply system of the electric home appliance 101 (air conditioner) to be a monitoring object and transmits the collected power values as a monitoring log to the server 200.

(S105)

The monitoring device 104 (thermometer) also receives the inquiry from the server 200, collects a monitoring log, and transmits the monitoring log to the server 200. The monitoring device 104 (thermometer) collects temperatures in the room in which the electric home appliance 101 (air conditioner) to be a monitoring object is installed and transmits the collected temperatures as a monitoring log to the server 200.

(S106)

The electric home appliance 101 collects its own electric home appliance log and transmits the electric home appliance log to the server 200.

(S107)

The log determining unit 216 of the server 200 uses an operational state indicated by an electric home appliance log transmitted from an electric home appliance and an operational state indicated by a monitoring log transmitted from a monitoring device and refers to the operation state determination table T7 to determine whether or not there is an electric home appliance for which an electric home appliance log and a monitoring log are inconsistent. In this case, the presence or absence of consistency between the electric home appliance log transmitted from the electric home appliance 101 and the monitoring logs transmitted from the monitoring devices 103 and 104 is determined. The electric home appliance log and the monitoring logs being inconsistent means that a failure of the electric home appliance 101 or a failure of a network unit of the electric home appliance 101 has occurred and that an occurrence of a malfunction of the electric home appliance 101 is suspected. Moreover, in S107, when it is determined that there is an electric home appliance for which the electric home appliance log and the monitoring log are inconsistent, process is advanced to S108, and when it is determined that there is no electric home appliance for which the electric home appliance log and the monitoring log are inconsistent, the process is ended.

(S108)

The prescribed range determining unit 206 of the server 200 uses positional information of the house 100 and the positional information of the mobile device 300 that has been received in S101 to determine whether or not the mobile device 300 is present within a prescribed range from the house 100. The prescribed range refers to a range in which the user who has gone out and is moving away from the house 100 can easily return to the house 100 in order to confirm the operational state of the electric home appliance 101 inside the house 100. Examples of this determination will be described in detail in 1.6.4 to 1.6.6.

Moreover, when it is determined in S108 that the mobile device 300 is present within the prescribed range from the house 100, the process is advanced to S109, and when it is determined in S108 that the mobile device 300 is present outside of the prescribed range from the house 100, the process is ended.

(S109)

When it is determined in S107 that there is an electric home appliance for which the electric home appliance log and the monitoring log are inconsistent and, at the same time, when it is determined in S108 that the mobile device 300 is present within the prescribed range, the notification determining unit 204 of the server 200 determines it necessary to notify malfunction information and the mobile notifying unit 214 transmits the malfunction information to the mobile device 300. In this case, for example, a notification screen G19 such as that shown in FIG. 19 is displayed on the mobile device 300. The notification screen G19 may be output to the display unit 304 as a popup by a service application of the mobile device 300. The service application may be realized by a local application that is installed in the mobile device 300 or by a web application. Alternatively, the notification screen G19 may be displayed by sending the user a simple message informing that a notification from the server 200 has been issued and having the user perform a prescribed operation.

As described above, the example shown in FIG. 19 shows the notification screen G19 that is displayed when an electric home appliance log indicating an off-state is transmitted from the air conditioner but a monitoring log indicating that the air conditioner is in an on-state is transmitted from a corresponding monitoring device. Therefore, a message reading "While the air conditioner notifies an off-state, an on-state of the air conditioner has been monitored by the power meter and the thermometer." is displayed on the notification screen G19.

In addition, since the monitoring logs of the power meter and the thermometer both indicate an on-state, it is likely that the air conditioner is in the on-state. The transmission of an electric home appliance log indicating an off-state from the air conditioner regardless of this fact suggests that it is highly likely that a failure of the network unit of the air conditioner has occurred although a failure of a main body unit of the air conditioner has not occurred. Therefore, the notification screen G19 displays a message reading "A failure may have occurred in the network unit of the air conditioner" which indicates a possibility of a failure of the network unit of the air conditioner.

Furthermore, since a range from the house to a bus stop is set as the prescribed range, the notification screen G19 displays a message reading "This notice has been sent by monitoring the state of the house before you board the bus" which describes that an operational state of the electric home appliance has been monitored and notified to the mobile device 300 prior to the user boarding the bus. However, this is simply an example and this description may be omitted from the notification screen G19.

The user having confirmed the notification screen G19, who should have gone out after setting the air conditioner to the off-state, is unable to confirm whether the air conditioner is set to the off-state because a failure of the network unit of the air conditioner has occurred. However, the notification screen G19 is displayed on the mobile device 300 while the user is within the prescribed range. Therefore, the user can return to the house 100 instead of boarding the bus to confirm the operational state of the air conditioner.

An operation example involving the electric home appliance 101 and the monitoring devices 103 and 104 corresponding to the electric home appliance 101 has been shown in the description given above. However, this is simply an example. In the present disclosure, the processing shown in FIG. 6 is also executed on electric home appliances other than the electric home appliance 101 which are installed in the house 100 and which are registered in the server 200 as management objects in parallel to the electric home appliance 101 and a presence or absence of consistency between an electric home appliance log and a monitoring log is determined. Subsequently, when there is an electric home appliance for which an electric home appliance log and a monitoring log are inconsistent, malfunction information with respect to the electric home appliance is notified to the mobile device 300.

1.6.3 Operation State Determination Table

FIG. 7 is a diagram showing an example of a data configuration of the operation state determination table T7. In case (1), since all of the "monitoring log (1)", the "monitoring log (2)", and the "electric home appliance log" indicate an on-state, there is no inconsistency and the electric home appliance can be determined to be in an on-state. Therefore, "no inconsistency on" is registered as the "determination in S107". On the other hand, in cases (2) to (6) and (8), since the three pieces of information represented by the "monitoring log (1)", the "monitoring log (2)", and the "electric home appliance log" are inconsistent, there is a possibility that a malfunction of the electric home appliance has occurred. Therefore, "inconsistent" is registered as the "determination in S107". In addition, in case (7), since all of the "monitoring log (1)", the "monitoring log (2)", and the "electric home appliance log" indicate an off-state, there is no inconsistency and the electric home appliance can be determined to be in an off-state. Therefore, "no inconsistency off" is registered as the "determination in S107".

Moreover, the example in FIG. 7 shows the operation state determination table T7 in a case where a maximum of two monitoring devices are associated with one electric home appliance. However, this is simply an example, and when a maximum of n-number (where n≥3) of monitoring devices are associated with one electric home appliance, the operation state determination table T7 may hold n-pieces of information represented by monitoring logs (1) to (n). In addition, when one monitoring device is associated with one electric home appliance, the log determining unit 216 may determine a presence or absence of consistency between an electric home appliance log and a monitoring log by referring to, for example, information registered in the "monitoring log (1)" and information registered in the "electric home appliance log".

1.6.4 First Implementation of Prescribed Range (Concentric Circle)

Figure 8:
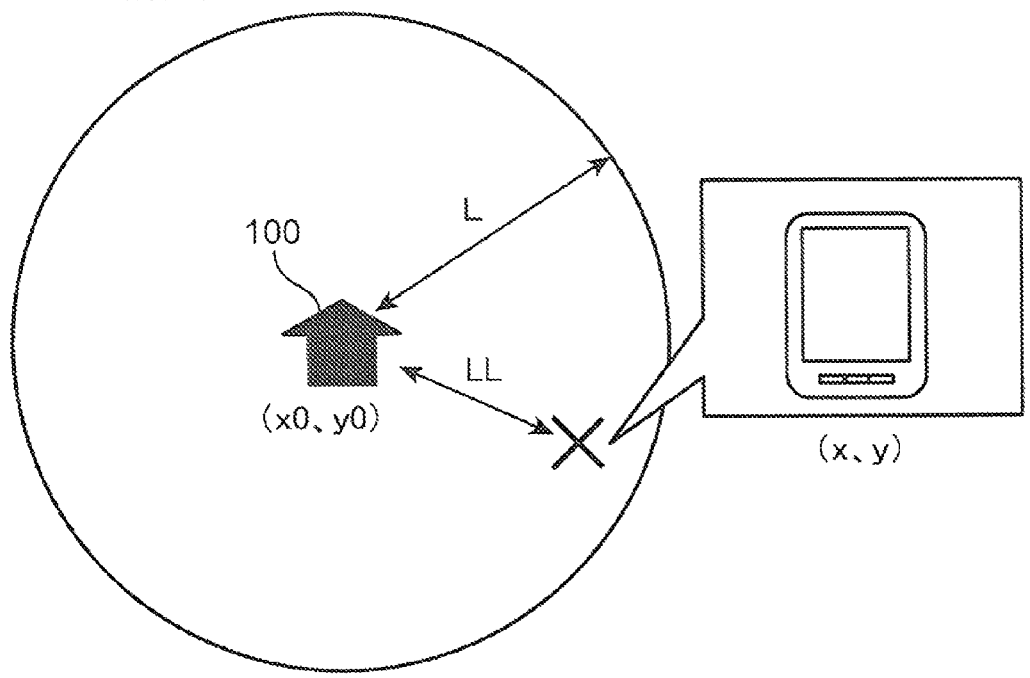
FIG. 8 is an explanatory diagram showing a range in a first example of a prescribed range determining unit 206 of the information notification system 11 according to the first embodiment of the present disclosure.

FIG. 8 is an explanatory diagram of a first implementation of the prescribed range. In the first implementation, a circle with a radius of a prescribed distance L that is centered on the house 100 is adopted as the prescribed range and a determination is made on whether or not the mobile device 300 is present inside the circle. In other words, malfunction information is notified to the user when the mobile device 300 is within the prescribed range from a position (x0, y0) of the house 100.

In FIG. 8, the position of the house 100 is shown as (x0, y0). x0 and y0 respectively denote latitude and longitude of the position of the house 100. In addition, the position of the mobile device 300 is shown as (x, y). Furthermore, FIG. 8 shows an example in which the position (x, y) of the mobile device 300 is within the prescribed range. Moreover, as the position (x0, y0) of the house 100, for example, latitude and longitude of a center of the house 100 are adopted.

Figure 9:
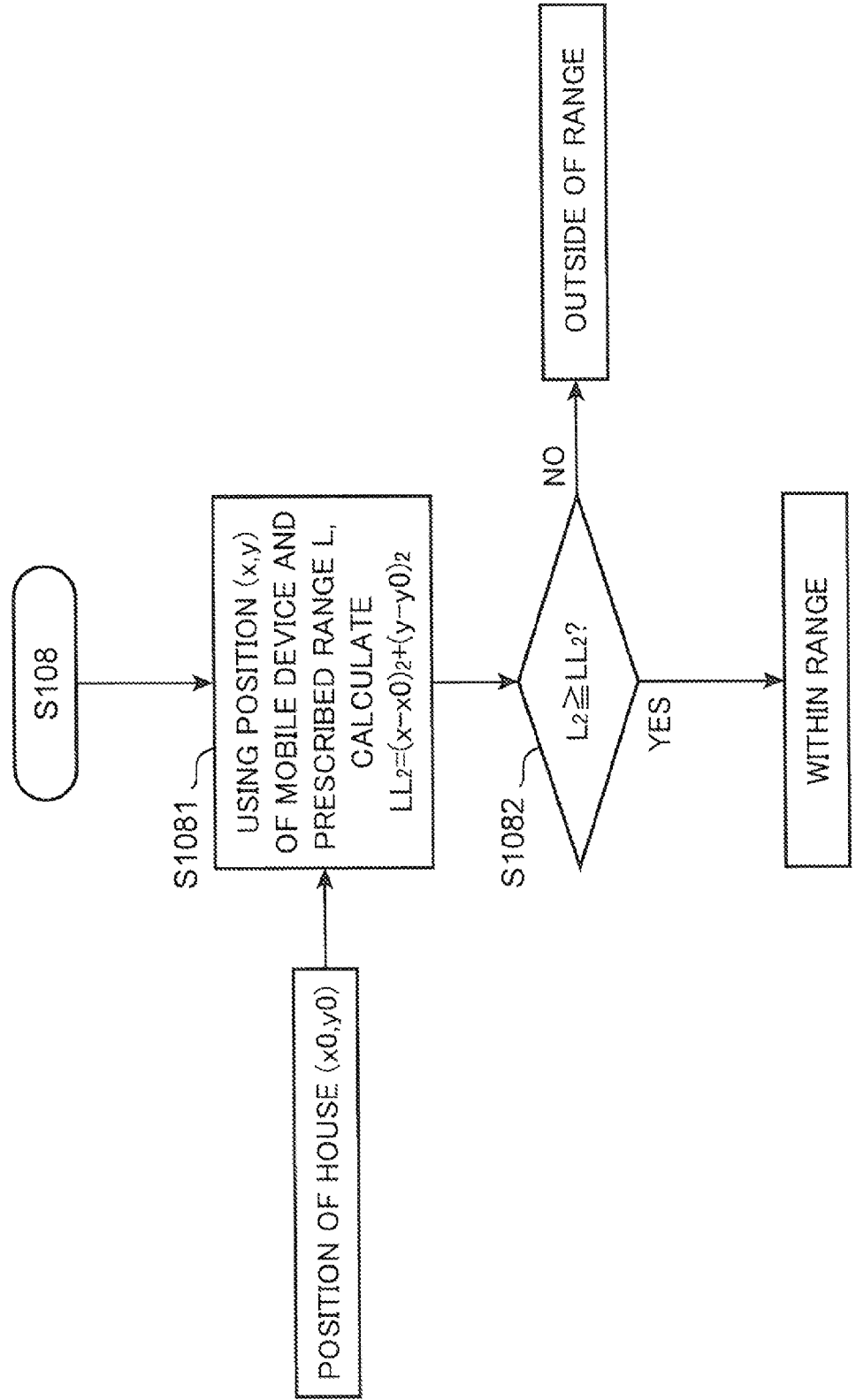
FIG. 9 is a flow chart showing an operation in the first example of the prescribed range determining unit 206 of the information notification system 11 according to the first embodiment of the present disclosure.

FIG. 9 is a flow chart which shows processing according to the first implementation and which shows details of the position discrimination process (S108) of the mobile device 300 shown in the sequence diagram in FIG. 6. In this case, a determination is made on whether or not the mobile device 300 is present inside a circle which has a radius of a prescribed distance and which is centered on the house 100.

(S1081)

Using the position (x0, y0) of the house 100 and the position (x, y) of the mobile device 300, $$LL^2 = (x-x0)^2 + (y-y0)^2$$

is calculated, where "LL" denotes a distance between the position of the mobile device 300 and the position of the house 100 and "^2" denotes a square.

(S1082)

When $L^2 \geq LL^2$ is satisfied (yes in S1082), it is determined that the mobile device 300 is present within the prescribed range (a distance range expressed as the inside of a circle which has a radius of a distance L and which is centered on the house 100). Meanwhile, when the condition described above is not satisfied (no in S1082), it is determined that the mobile device 300 is present outside of the prescribed range.

1.6.5 Second Implementation of Prescribed Range (after Leaving the House)

Figure 10:
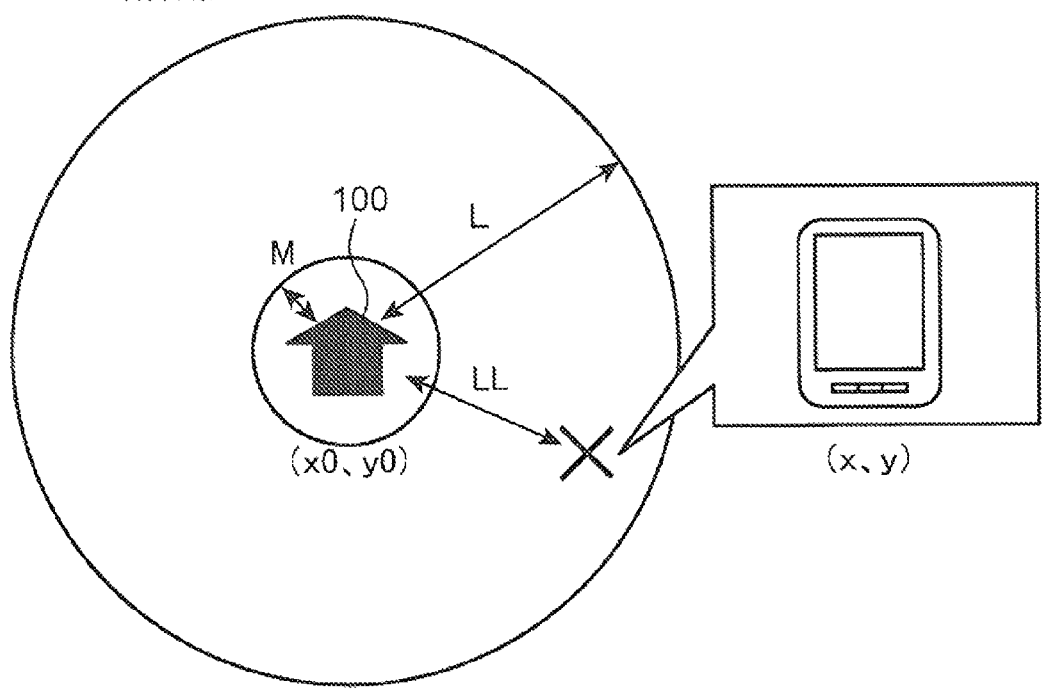
FIG. 10 is an explanatory diagram showing a range in a second example of the prescribed range determining unit 206 of the information notification system 11 according to the first embodiment of the present disclosure.

FIG. 10 is an explanatory diagram of a second implementation of the prescribed range. In the second implementation, it is determined that the mobile device 300 is present within the prescribed range when the position (x, y) of the mobile device 300 is within a range that is expressed as the inside of the circle described in 1.6.4 and, at the same time, the mobile device 300 is separated from the house 100 by a distance M (where M<L). In other words, when the mobile device 300 is separated from the house 100 by the distance M, the user is determined to have gone out. Subsequently, when there is an electric home appliance for which an electric home appliance log and a monitoring log are inconsistent, malfunction information of the electric home appliance is notified to the mobile device 300.

Figure 11:
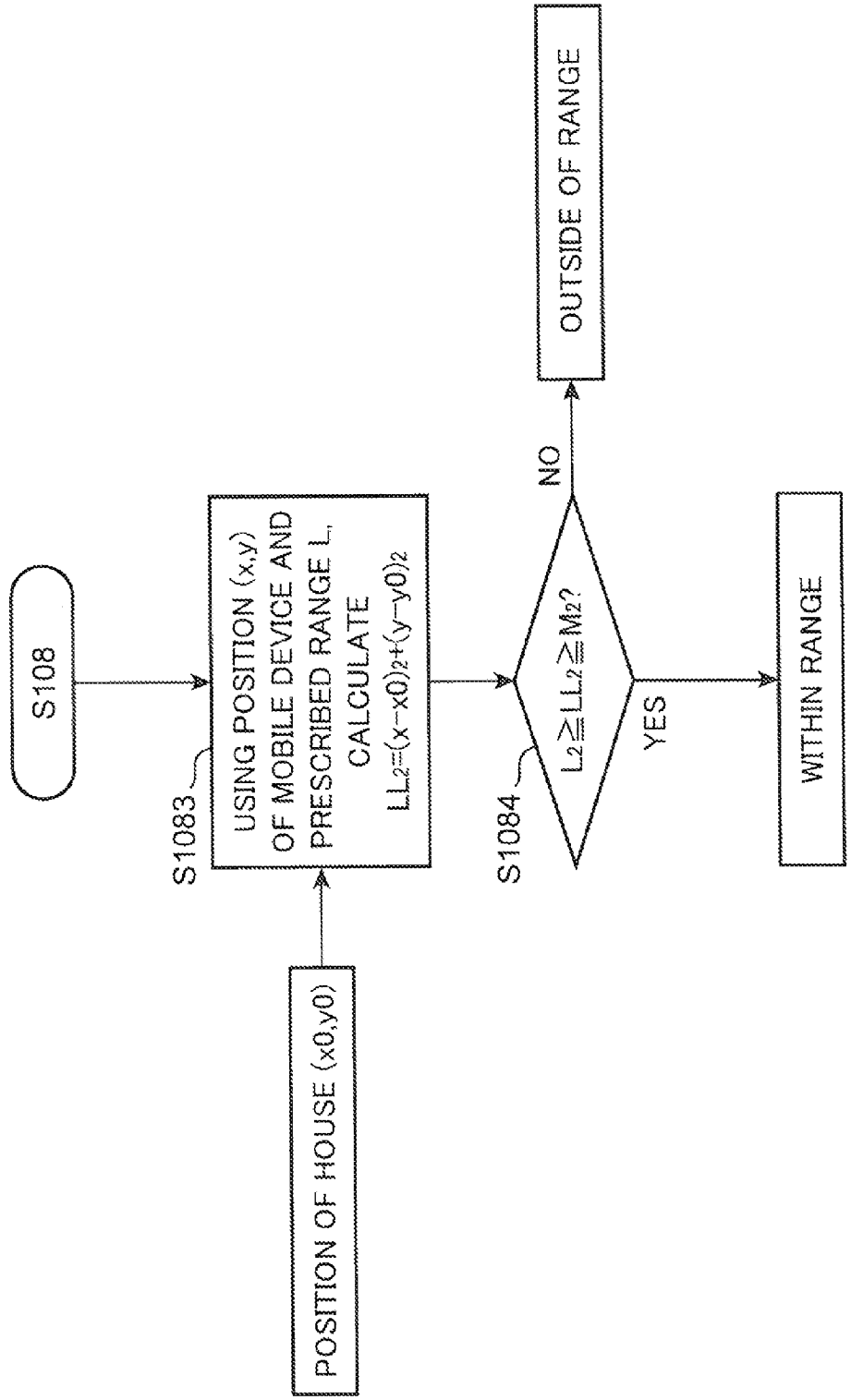
FIG. 11 is a flow chart showing an operation in the second example of the prescribed range determining unit 206 of the information notification system 11 according to the first embodiment of the present disclosure.

FIG. 11 is a flow chart which shows processing according to the second implementation and which shows details of the position discrimination process (S108) of the mobile device 300 shown in the sequence diagram in FIG. 6. In this case, a determination is made on whether or not the mobile device 300 is present between two concentric circles which have radii of different prescribed distances and which are centered on the house 100.

(S1083)

S1083 is the same as S1081 shown in FIG. 9.

(S1084)

When $L^2 \geq LL^2 \geq M^2$ is satisfied (yes in S1084), it is determined that the mobile device 300 is present within the prescribed range (a range expressed as a space between two concentric circles of a distance M and a distance L, respectively, and which are centered on the house 100). Meanwhile, when the condition described above is not satisfied (no in S1084), it is determined that the mobile device 300 is present outside of the prescribed range.

In this case, as a range expressed by the inside of a circle with a smaller radius among the two concentric circles, for example, if the house 100 is a house with a lot, an area that approximates a size of the building of the house 100 of the user on a map may be adopted or an area that approximates a site area of the lot owned by the user may be adopted. However, the range expressed by the inside of the circle with a smaller radius is not limited to these examples. For example, if the house 100 is an apartment house, an area that approximates a dwelling unit of the user may be adopted as the range expressed by the inside of the circle with a smaller radius.

1.6.6 Third Implementation of Prescribed Range (Utilization of Map)

A case where map information is used will be described as a third implementation related to the determination of the prescribed range. In the first and second implementations, the position of the mobile device 300 at the time of notification of malfunction information is acquired as (x, y). On the other hand, in the third implementation, the mobile device 300 is traveling, a position of the mobile device 300 at the time of notification of malfunction information is predicted based on positional information that is periodically notified from the mobile device 300, and a determination is made on whether or not the predicted position is within the prescribed range (within a range of a distance L from the house 100).

Figure 13:
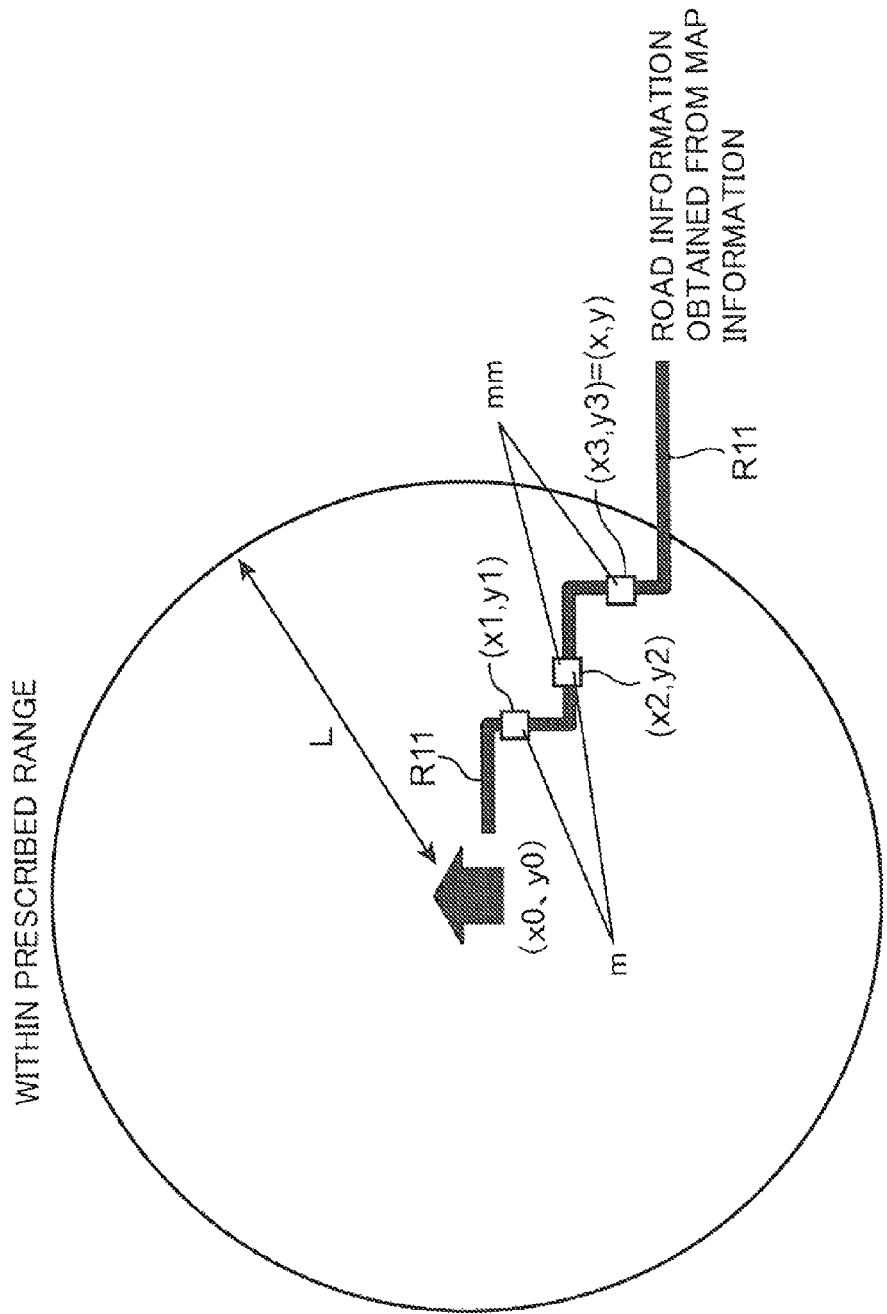
FIG. 13 is an explanatory diagram showing a range in the third example of the prescribed range determining unit 206 of the information notification system 11 according to the first embodiment of the present disclosure.

FIG. 13 is an explanatory diagram of a third implementation of the prescribed range. FIG. 13 schematically shows road information R11 which originates from the house 100 and which is obtained from map information. A position of the mobile device 300 at a given time t1 is denoted as (x1, y1) and a position of the mobile device 300 at another time t2 is denoted as (x2, y2).

In this case, the map information includes a directed graph constituted by nodes that correspond to prescribed points on roads such as intersections and curves and links that correspond to roads connecting the respective nodes. In addition, in the map information, information on actual latitude and longitude as well as a location name is associated with each location. A unique identifier is respectively assigned to each node and each link.

Figure 14:
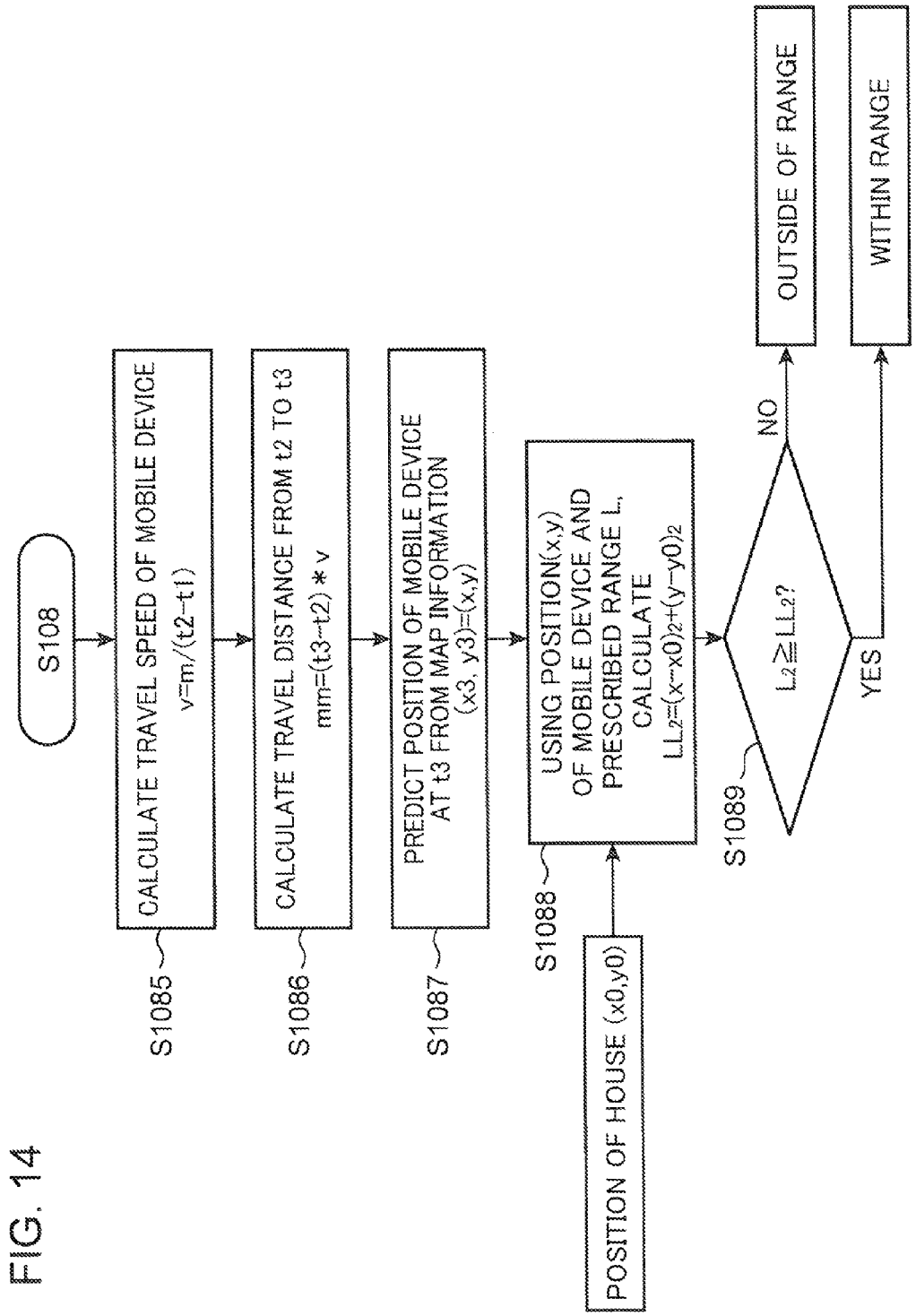
FIG. 14 is a flow chart showing an operation in the third example of the prescribed range determining unit 206 of the information notification system 11 according to the first embodiment of the present disclosure.

FIG. 14 is a flow chart showing details of the position discrimination process (S108) of the mobile device shown in the sequence diagram in FIG. 6. In this case, a position (x, y) of the mobile device 300 at a time t3 of notification of malfunction information to the mobile device 300 is predicted and a determination is made on whether or not the predicted position is within the prescribed range (within a range of a distance L from the house 100). First, prior to starting the flow chart shown in FIG. 14, a travel distance m of the mobile device 300 between a time t1 and a time t2 is calculated using map information. The travel distance m may be calculated by, for example, searching a shortest route between the position at the time t1 and the position at the time t2 from the map information.

Moreover, it is assumed that the flow chart shown in FIG. 14 is performed at, for example, the time t3. In addition, the time t2 is, for example, a notification time of latest positional information from the mobile device 300 to the server 200 as of the time point of the time t3 and the time t1 is, for example, a notification time of positional information immediately preceding the latest positional information. However, this is simply an example and notification times of two arbitrary pieces of positional information among pieces of positional information notified within a certain period of time preceding the time t3 may be adopted as the times t1 and t2. In addition, the pieces of positional information at the times t1 and t2 are respectively plotted on the map information, a travel route of the mobile device 300 from the time t1 to the time t2 is extracted, and a distance of the extracted travel route is calculated as the travel distance m.

(S1085)

$v=m/(t2-t1)$ is calculated.

In this case, v denotes a travel speed of the mobile device 300 between the time t1 and the time t2. For example, when the user carrying the mobile device 300 is traveling on a bicycle, the travel speed v has a faster value as compared to a case where the user is on foot, and when the user carrying the mobile device 300 is traveling on foot, the travel speed v has a slower value as compared to a case where the user is on a bicycle.

(S1086)

Based on the time t3 at which the server 200 issues a notification to the mobile device 300 and the travel speed v calculated in S1085, a travel distance mm between the time t2 and the time t3 is calculated. In this case, the travel distance mm is expressed by the following equation.

$$mm=(t3-t2) \times v$$

In this case, the travel distance mm is calculated on the assumption that the travel speed v between the time t2 and the time t3 is equal to the travel speed v between the time t1 and the time t2. In addition, when a mode is adopted in which the server 200 periodically notifies an operational state of the electric home appliance 101 to the mobile device 300, a timing of the notification is adopted as the time t3. Furthermore, when a mode is adopted in which the notification is issued upon a lapse of a certain period of time after the user leaves the house 100, a timing at which the certain period of time has lapsed after the user left the house 100 is adopted as the time t3. In this case, as the certain period of time, for example, an arbitrary period of time within a period of time in which the user is estimated to be within a prescribed range after leaving the house 100 may be adopted or a period of time that is slightly shorter than a time at which the user is estimated to exit the prescribed range may be adopted.

(S1087)

Based on the map information, a position (x3, y3) that is reached after traveling the travel distance mm from a position (x2, y2) at the time t2 is calculated as a predicted position (x, y) of the mobile device 300 at the time t3.

(S1088)

Using the predicted position (x, y) and the position (x0, y0) of the house 100, $LL^2=(x-x0)^2+(y-y0)^2$ is calculated.

(S1089)

When the condition expressed as $L^2 \geq LL^2$ is satisfied (yes in S1089), the predicted position (x, y) is determined to be within the prescribed range, and if there is an electric home appliance that is not running at a value set upon leaving the house, the server 200 notifies malfunction information to the mobile device 300. On the other hand, when the condition described above is not satisfied (no in S1089), the predicted position (x, y) is determined to be outside of a range expressed as the inside of a circle with a radius of the distance L from the house 100 and malfunction information is not notified to the mobile device 300 even if there is an electric home appliance that is not running at a value set upon leaving the house.

In the third implementation, when the time t3 is a same timing as a notification timing of the positional information of the mobile device 300, since positional information at the time t3 is obtained, the server 200 need not calculate the predicted position (x, y). Therefore, the third implementation may be applied when the notification timing of the positional information of the mobile device 300 differs from the time t3.

Figure 18:
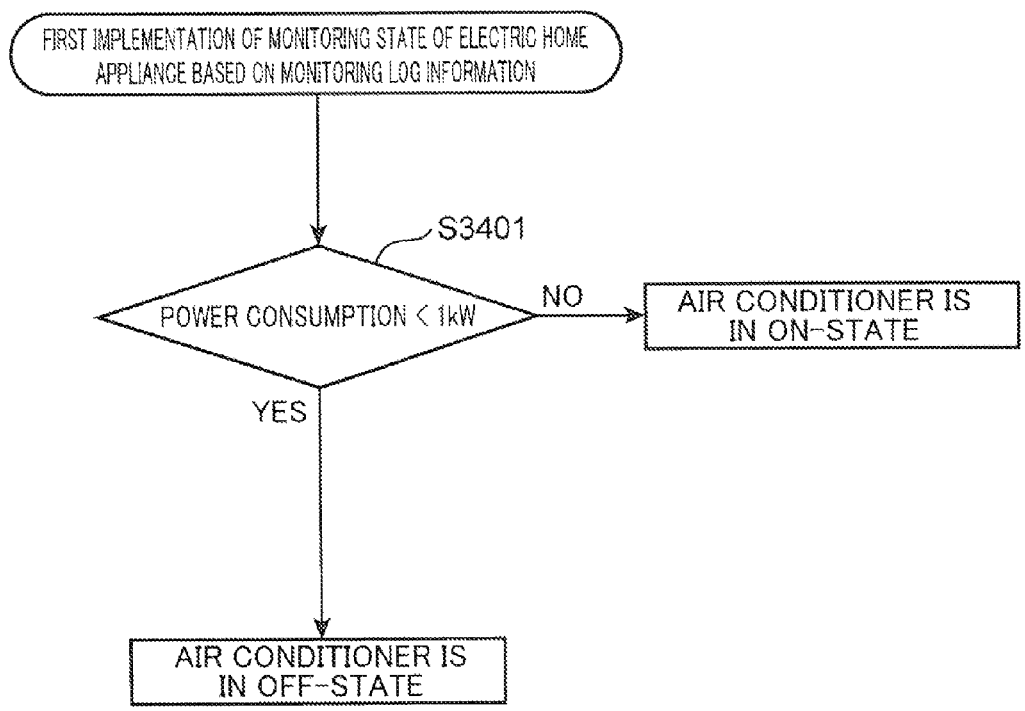
FIG. 18 is a flow chart showing an operation in a first implementation of the log determining unit 216 of the information notification system 11 according to the first embodiment of the present disclosure.

1.6.7 First Implementation of Monitoring on-State of Electric Home Appliance Based on Monitoring Log Information FIG. 18 represents a flow chart which shows processing of a first implementation of monitoring whether an electric home appliance is in an on-state or an off-state based on a monitoring log and which shows details of the process of S107 shown in FIG. 6. In FIG. 18, as a first implementation of determining an on-state, a case is shown in which whether an air conditioner is in an on-state or an off-state is determined based on an absolute value of a power consumption that is measured by the monitoring device 103 (power meter). Specifically, it is recorded in the correspondence table H17 shown in FIG. 17 that power consumption as measured by the power meter is 1 kW or more when the air conditioner is in an on-state. Therefore, the log determining unit 216 confirms whether or not a power consumption indicated in a monitoring log of the power meter is below 1 kW (S3401). When the power consumption is below 1 kW (yes in S3401), the log determining unit 216 determines that the air conditioner is in an off-state. On the other hand, when the power consumption is equal to or higher than 1 kW (no in S3401), the log determining unit 216 determines that the air conditioner is in the on-state.

In addition, in a similar manner, based on contents registered in the "value when on" for a thermometer in the correspondence table H17 shown in FIG. 17, in summer (June to August), the log determining unit 216 determines that the air conditioner is in the on-state if the temperature indicated by a monitoring log of the thermometer is below 25 degrees and determines that the air conditioner is in the off-state if the temperature is 25 degrees or higher. Furthermore, in winter (December to February), the log determining unit 216 determines that the air conditioner is in the on-state if the temperature indicated by a monitoring log of the thermometer is 15 degrees or higher and determines that the air conditioner is in the off-state if the temperature is below 15 degrees.

In a similar manner, based on contents registered in the "value when on" for a sound sensor in the correspondence table H17 shown in FIG. 17, the log determining unit 216 determines that an automatic cleaner is in an off-state if an operating noise indicated by a monitoring log of the sound sensor is below 60 dB and determines that the automatic cleaner is in an on-state if the operating noise is 60 dB or higher.

1.7 Effect of First Embodiment

In the first embodiment, when there is an electric home appliance for which an electric home appliance log and a monitoring log are inconsistent before the mobile device 300 travels outside of a prescribed range, malfunction information of the electric home appliance is notified to the mobile device 300. In this case, the presence of an electric home appliance for which an electric home appliance log and a monitoring log are inconsistent suggests that there is a possibility of a failure of the electric home appliance or a failure of a network unit of the electric home appliance. In this case, the user must return to the house 100 to confirm an operational state of the electric home appliance or directly input an operation for switching an electric home appliance, which the user had forgotten to set to an off-state, to the off state.

In this case, the prescribed range refers to, for example, a range from the house 100 to a nearest bus stop. If the user has not yet boarded the bus, the user can return to the house 100 to switch an electric home appliance that is suspected not to be in an off-state to the off-state and leave the house 100 without any anxiety. Cases where an electric home appliance is not in an off-state include a case where the user has forgotten to turn off the electric home appliance and a case where an electric home appliance, which can be remotely set to an off-state, cannot be turned off unless the user returns to the house 100 due to a failure of the network unit of the electric home appliance.

Alternatively, the prescribed range may be a range to a train station. If the user is still on a bus traveling toward a nearest train station, the user can change to a bus that doubles back to return to the house 100 and set the electric home appliance to an off-state. However, if the user has already boarded a train and the train happens to be, for example, an express train, it would require a significant amount of time for the user to return to the house 100.

In such cases, by receiving a notification before exiting the prescribed range, returning to the house 100, and reliably setting an electric home appliance to an off-state, the user can prevent the electric home appliance from performing unnecessary operations.

2. Second Embodiment

Remote Operation

Hereinafter, an information notification system 11 according to a second embodiment of the present disclosure will be described with reference to the drawings. The second embodiment differs from the first embodiment in that, when a remote operation is performed from the outside using the mobile device 300 with respect to an electric home appliance inside the house 100, a result of the remote operation is confirmed based on an electric home appliance log of the electric home appliance and a monitoring log of a corresponding monitoring device. In doing so, a result of the remote operation as determined based on the electric home appliance log from the electric home appliance, the monitoring log from the monitoring device, and remote operation contents (for example, operate an air conditioner to an off-state) is notified to the mobile device 300. For example, let us assume that a remote operation for switching an electric home appliance to an off-state is performed and that the monitoring log of a monitoring device indicates an on-state even though an electric home appliance log of the electric home appliance indicates an off-state. In this case, it is possible that a failure has occurred in the electric home appliance or in a network unit of the electric home appliance. In consideration thereof, in the present embodiment, a result of a remote operation as determined based on operational states indicated by an electric home appliance log and a monitoring log is notified to the mobile device 300 while the mobile device 300 is within a prescribed range. A user notified of a result of a remote operation to the effect that operational states indicated by an electric home appliance log and a monitoring log differ from each other while the user is within a prescribed range returns to the house 100 and directly sets an electric home appliance to an off-state. Accordingly, the user can go out once again without any anxiety.

Hereinafter, only differences from the first embodiment will be described and descriptions of same portions will be omitted.

2.1 Operation Processing Unit 1141

Figure 20:
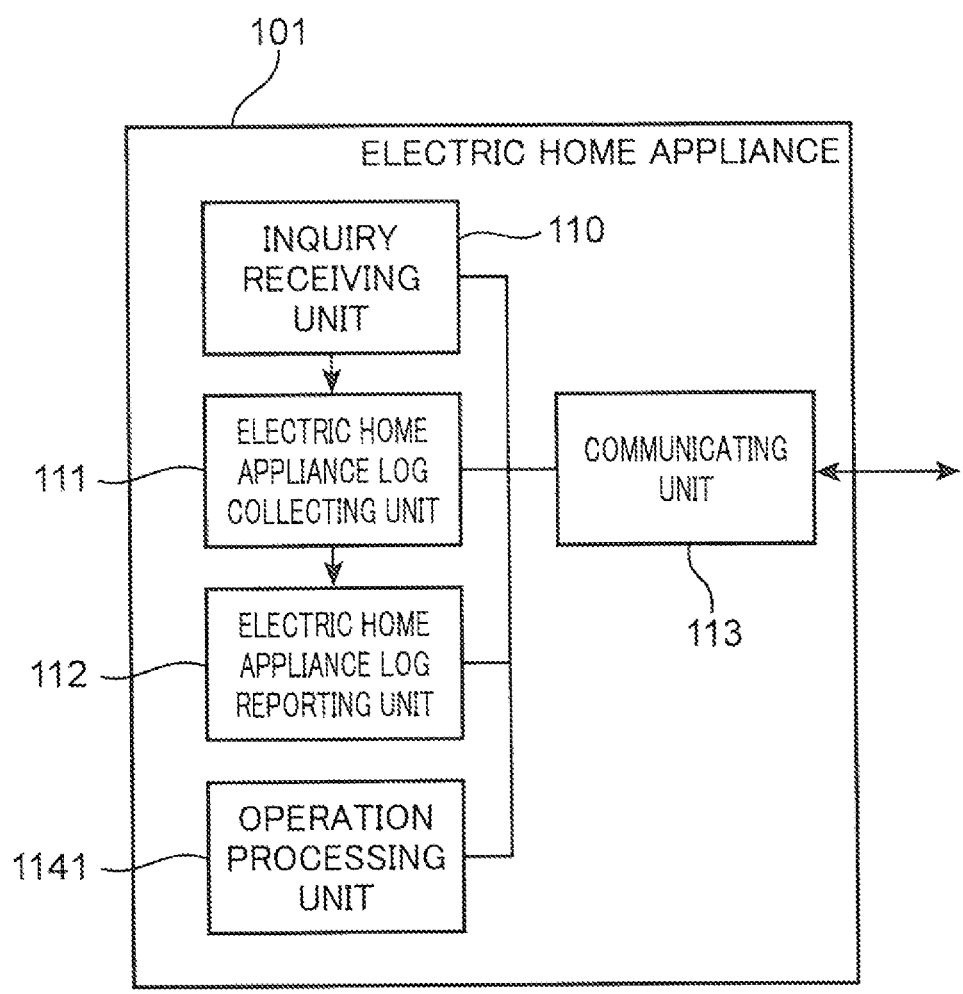
FIG. 20 is a block diagram of the electric home appliance 101 of the information notification system 11 according to a second embodiment of the present disclosure.

FIG. 20 is a block diagram showing a configuration of an electrical home appliance according to the second embodiment. Since the configuration, with the exception of the operation processing unit 1141, is the same as that of the first embodiment, a description thereof will be omitted.

The operation processing unit 1141 processes an operation of the electric home appliance 101 in accordance with an instruction from the server 200. For example, assuming that the operation processing unit 1141 receives an instruction to set an air conditioner to an off-state from the server 200 via the communicating unit 113 as an instruction for a remote operation by the user, the operation processing unit 1141 executes a process to switch the air conditioner to the off-state.

2.2 Operation Transmitting Unit 2121

Figure 21:
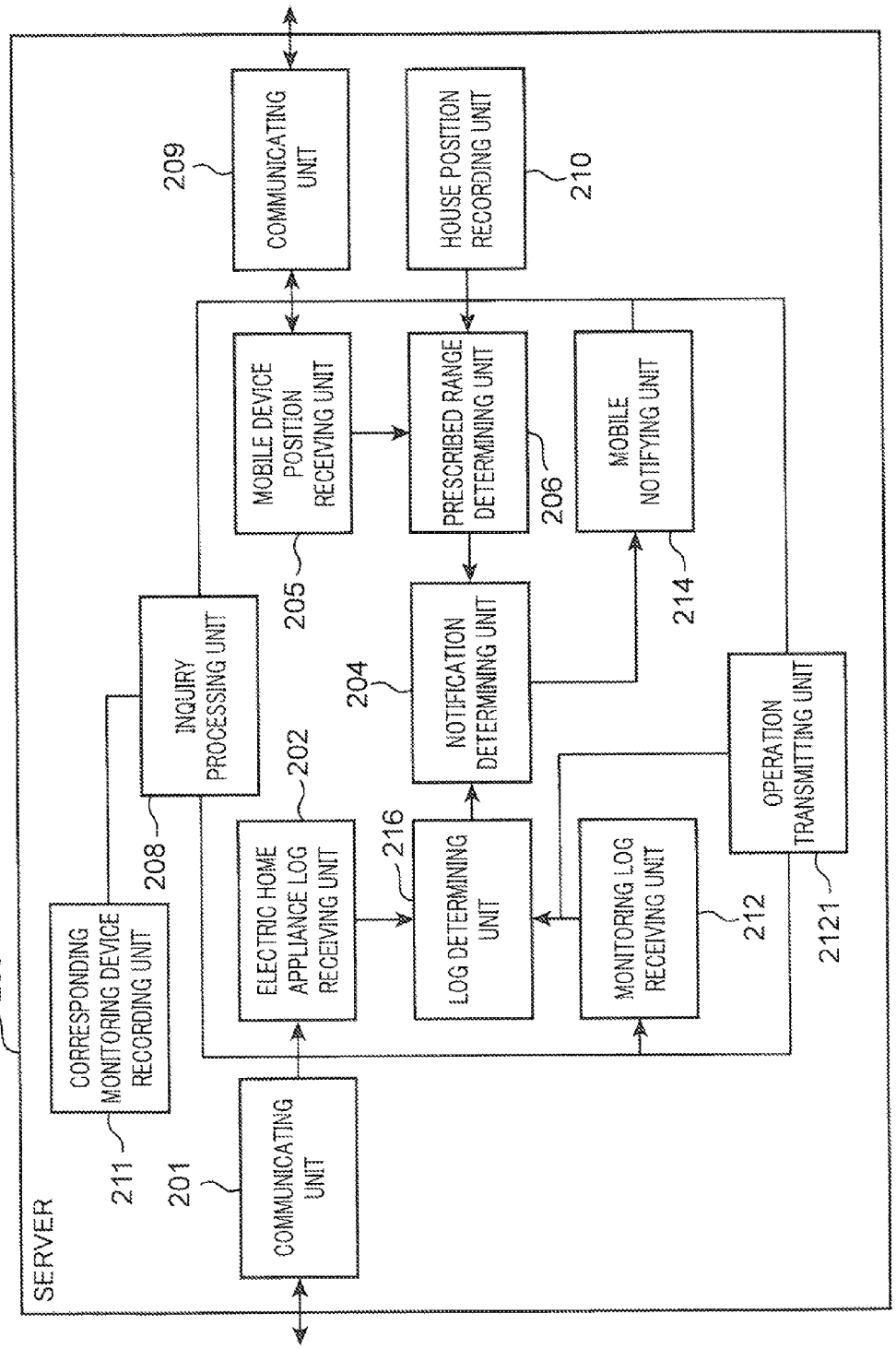
FIG. 21 is a block diagram of the server 200 of the information notification system 11 according to the second embodiment of the present disclosure.

FIG. 21 is a block diagram showing a configuration of the server 200 according to the second embodiment. Since the configuration with the exception of the operation transmitting unit 2121 is the same as that of the first embodiment, a description thereof will be omitted.

The operation transmitting unit 2121 notifies an instruction for a remote operation transmitted from the mobile device 300 to an electric home appliance. At this point, the operation transmitting unit 2121 confirms the instruction for a remote operation transmitted from the mobile device 300 and notifies an instruction for a remote operation to an electric home appliance to be an object of the remote operation. In addition, the operation transmitting unit 2121 notifies the log determining unit 216 of the instruction for a remote operation which the operation transmitting unit 2121 had notified to the electric home appliance. Accordingly, the instruction for a remote operation and operational states indicated by an electric home appliance log and a monitoring log are compared by the log determining unit 216.

2.3 Remote Operation Inputting Unit 3051

Figure 22:
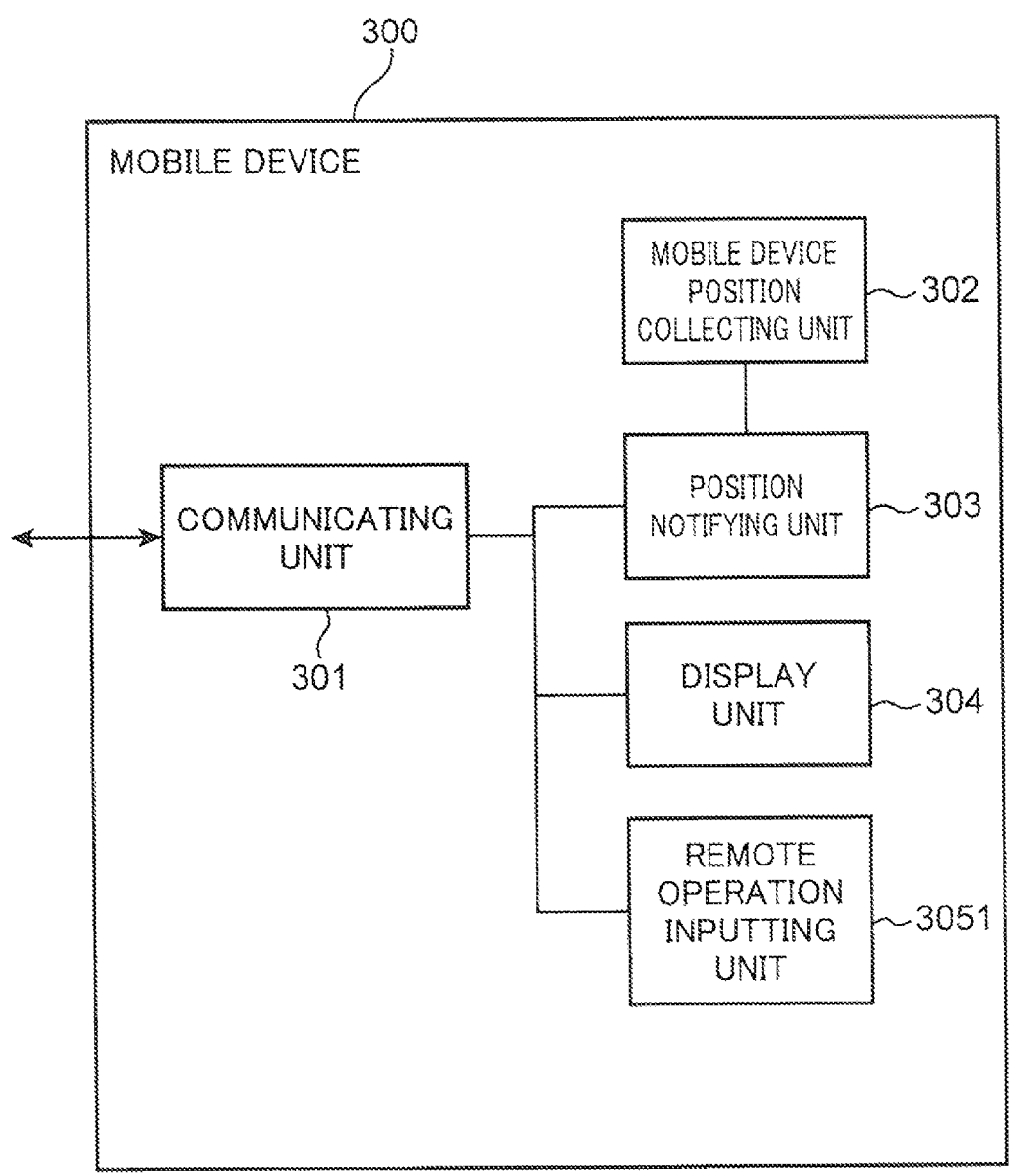
FIG. 22 is a block diagram of the mobile device 300 of the information notification system 11 according to the second embodiment of the present disclosure.

FIG. 22 is a block diagram showing a configuration of the mobile device 300 according to the second embodiment. Since the configuration, with the exception of the remote operation inputting unit 3051, is the same as that of the first embodiment, a description thereof will be omitted.

The remote operation inputting unit 3051 accepts an instruction from the user to remotely operate one electric home appliance inside the house 100 from the mobile device 300. For example, assuming that an instruction for setting an operational state of an air conditioner to an on-state or an off-state has been input by the user, the remote operation inputting unit 3051 receives the instruction.

2.4 Operations of Second Embodiment

FIG. 23 is a sequence diagram showing an example of operations of the second embodiment. Elements in FIG. 23 that are the same as those in FIG. 6 will be denoted by the same reference characters and a description thereof will be omitted.

(S101)

The mobile device 300 periodically notifies its own positional information to the server 200.

(S110)

The remote operation inputting unit 3051 of the mobile device 300 receives an instruction for a remote operation with respect to an electric home appliance inside the house 100 from the user and transmits the instruction to the server 200 (S110). In this case, for example, it is assumed that an instruction for a remote operation to set an air conditioner (electric home appliance 101) to an off-state has been input by the user.

FIG. 25 is a diagram showing an example of an operation screen G25 that is displayed on the mobile device 300 when the user remotely operates the electric home appliance 101 inside the house 100. The operation screen G25 is an operation screen for remotely operating the electric home appliance 101 that is an air conditioner. Therefore, a text reading "Do you wish to remotely turn off the air conditioner?" is displayed on the operation screen G25. In addition, a button B251 with a description of "yes" for switching the air conditioner to an off-state and a button B252 with a description of "no" for switching the air conditioner to an on-state are arranged on the operation screen G25.

Let us assume that the user has selected the button B251 by tapping or clicking the button B251. As a result, in S110, the remote operation inputting unit 3051 of the mobile device 300 transmits an instruction for a remote operation to switch the air conditioner to the off-state to the server 200. The instruction for a remote operation includes the ID of the electric home appliance 101 that is an air conditioner and a set value for switching the air conditioner to the off-state such as "air conditioner: off".

(S111)

Upon receiving the instruction for a remote operation, the operation transmitting unit 2121 of the server 200 transmits the instruction for a remote operation to the electric home appliance 101. In this case, since an instruction for a remote operation to switch the air conditioner to the off-state has been input, an instruction for a remote operation to switch the air conditioner to the off-state is transmitted to the electric home appliance 101.

(S112)

The operation processing unit 1141 of the electric home appliance 101 receives the instruction for a remote operation and switches the electric home appliance 101 to an off state. At this point, since a case is assumed where a failure of the air conditioner or a network unit of the air conditioner has occurred, it is assumed that the air conditioner is not switched to the off-state as per the instruction for a remote operation.

(S102)

The log determining unit 216 of the server 200 obtains a monitoring device corresponding to the electric home appliance 101 by referring to the correspondence table H17. In this case, since the monitoring device 103 (power meter) and the monitoring device 104 (thermometer) are registered in the correspondence table H17 as monitoring devices of the electric home appliance 101 (air conditioner), the monitoring device 103 (power meter) and the monitoring device 104 (thermometer) are obtained as corresponding monitoring devices.

(S103)

The inquiry processing unit 208 of the server 200 transmits an inquiry. In this case, inquiries are respectively transmitted to the electric home appliance 101 and the monitoring devices 103 and 104.

(S104)

The monitoring device 103 (power meter) receives the inquiry from the server 200, collects a monitoring log, and transmits the monitoring log to the server 200 in a similar manner to the first embodiment.

(S105)

The monitoring device 104 (thermometer) receives the inquiry from the server 200, collects a monitoring log, and transmits the monitoring log to the server 200 in a similar manner to the first embodiment.

(S106)

The electric home appliance 101 (air conditioner) collects its own electric home appliance log and transmits the electric home appliance log to the server 200 in a similar manner to the first embodiment.

(S107)

The log determining unit 216 of the server 200 uses an operational state indicated by an electric home appliance log transmitted from an electric home appliance, an operational state indicated by a monitoring log transmitted from a monitoring device, and remote operation contents indicated by the instruction for a remote operation, refers to an operation state determination table T24 (FIG. 24), and determines whether or not there is an inconsistency among the operational state indicated by the electric home appliance, the operational state indicated by the monitoring log, and the remote operation contents. Hereinafter, an inconsistency among an operational state indicated by an electric home appliance log, an operational state indicated by a monitoring log, and remote operation contents will be simply described as an inconsistency among an electric home appliance log, a monitoring log, and remote operation contents. In this case, the presence or absence of consistency among the electric home appliance log transmitted from the electric home appliance 101, the monitoring logs transmitted from the monitoring devices 103 and 104, and the remote operation contents with respect to the electric home appliance 101 is determined.

FIG. 24 is a diagram showing an example of a data configuration of the operation state determination table T24. For the operation state determination table T24, an item of "remote operation contents" is further added to the operation state determination table T7.

"Remote operation contents" indicate contents of a remote operation performed by the user using the mobile device 300 with respect to an electric home appliance. In this case, "off" representing an off-state and "on" representing an on-state are provided as remote operation contents.

Determination results in S107 that correspond to cases (1) to (16) which represent combination patterns of respective on-states and off-states of the "monitoring log (1)", the "monitoring log (2), the "electric home appliance log", and the "remote operation contents" are registered in "determination in S107". In this case, S107 refers to a processing step shown in FIG. 23 to be described later.

In case (1), since all of the monitoring log (1), the monitoring log (2), the electric home appliance log, and the remote operation contents consistently indicate "on", the remote operation has been successful. Therefore, "remote operation successful" is registered as the "determination in S107". In case (15), since all of the monitoring log (1), the monitoring log (2), the electric home appliance log, and the remote operation contents consistently indicate "off", the remote operation has been successful. Therefore, "remote operation successful" is registered as the "determination in S107".

In case (7), while the remote operation contents indicate "on", since all of the monitoring log (1), the monitoring log (2), and the electric home appliance log consistently indicate "off", the remote operation has failed. Therefore, "remote operation failed" is registered as the "determination in S107". In case (9), while the remote operation contents indicate "off", since all of the monitoring log (1), the monitoring log (2), and the electric home appliance log consistently indicate "on", the remote operation has failed. Therefore, "remote operation failed" is registered as the "determination in S107".

In cases (2) to (6) and (8), while the remote operation contents indicate "on", the monitoring log (1), the monitoring log (2), and the electric home appliance log indicate "on" and "off" in a mixed manner and are inconsistent. Therefore, there is a possibility that a failure has occurred in the electric home appliance or in a network unit of the electric home appliance. Therefore, "possibility of failure" is registered as the "determination in S107".

In cases (10) to (14) and (16), while the remote operation contents indicate "off", the monitoring log (1), the monitoring log (2), and the electric home appliance log indicate "on" and "off" in a mixed manner and are inconsistent. Therefore, there is a possibility that a failure has occurred in the electric home appliance or in a network unit of the electric home appliance. Therefore, "possibility of failure" is registered as the "determination in S107".

As shown, if all of the monitoring log (1), the monitoring log (2), the electric home appliance log, and the remote operation contents are consistent, the log determining unit 216 determines that the remote operation is successful. In addition, if all of the monitoring log (1), the monitoring log (2), and the electric home appliance log are consistent but differ from the remote operation contents, the log determining unit 216 determines that the remote operation has failed. Furthermore, if the monitoring log (1), the monitoring log (2), and the electric home appliance log are inconsistent, the log determining unit 216 determines that there is a possibility of failure of the electric home appliance. Moreover, a failed remote operation suggests that it is highly likely that a failure of the electric home appliance or a network unit of the electric home appliance has occurred. Therefore, when a remote operation fails, the log determining unit 216 similarly determines that there is a possibility of failure of the electric home appliance.

(S108)

The prescribed range determining unit 206 of the server 200 uses positional information of the house 100 and the positional information of the mobile device 300 that has been received in S101 to determine whether or not the mobile device 300 is present within a prescribed range from the house 100. The prescribed range refers to a range in which the user who has gone out and is moving away from the house 100 can easily return to the house 100 in order to confirm the failure of the air conditioner inside the house 100.

Moreover, when it is determined in S108 that the mobile device 300 is present within the prescribed range from the house 100, the process is advanced to S109, and when it is determined in S108 that the mobile device 300 is present outside of the prescribed range from the house 100, the process is ended.

(S109)

When it is determined in S108 that the mobile device 300 is present within the prescribed range, the notification determining unit 204 of the server 200 determines that the result of a remote operation with respect to the electric home appliance 101 is to be notified to the mobile device 300 that is present within the prescribed range, and the mobile notifying unit 214 transmits the result of the remote operation to the mobile device 300.

In this case, for example, a notification screen G26 such as that shown in FIG. 26 is displayed on the display unit 304 of the mobile device 300. The notification screen G26 is a notification screen which applies to a case of a failed remote operation and which is displayed on the mobile device 300 when an electric home appliance log indicating "on" is notified from the air conditioner and monitoring logs indicating "on" are respectively notified from the monitoring devices 103 and 104 despite remote operation contents indicating "off". In other words, the notification screen G26 is a notification screen in case (9) in the operation state determination table T24 shown in FIG. 24. Therefore, a message reading "The air conditioner could not be remotely turned off due to a failure in communication or in the air conditioner. The power meter and the thermometer also confirm that the air conditioner has not been turned off." is displayed on the notification screen G26.

In addition, a button B261 displaying "yes" and a button B262 displaying "no" are arranged below the message. When attempting to switch the air conditioner to an off-state once again, the user selects the button B261. On the other hand, when forgoing the remote operation of the air conditioner, the user selects the button B262.

When the button B261 is selected, an instruction for a remote operation to switch the air conditioner to an off-state is once again transmitted from the mobile device 300 to the air conditioner via the server 200. When the air conditioner does not change to an off-state despite the instruction for a remote operation, the notification screen G26 is displayed once again. On the other hand, when the instruction for a remote operation causes the air conditioner to change to an off-state, a notification screen G27 shown in FIG. 27 is displayed on the mobile device 300.

Figure 27:
FIG. 27 is a diagram showing an example of a notification screen G27 of the information notification system 11 according to the second embodiment of the present disclosure.

FIG. 27 is a diagram showing the notification screen G27 that is displayed on the mobile device 300 when a remote operation is successful. Specifically, the notification screen G27 is a notification screen that is displayed on the mobile device 300 when the remote operation contents indicate "off", an electric home appliance log indicating "off" is notified from the air conditioner, and monitoring logs indicating "off" are notified from the monitoring devices 103 and 104 (case (15) in FIG. 24).

The notification screen G27 displays a message reading "It is confirmed that the air conditioner has changed to an off-state." which clearly shows that the remote operation of the air conditioner has succeeded. Accordingly, the user can recognize that the air conditioner has been successfully remotely operated.

Figure 28:
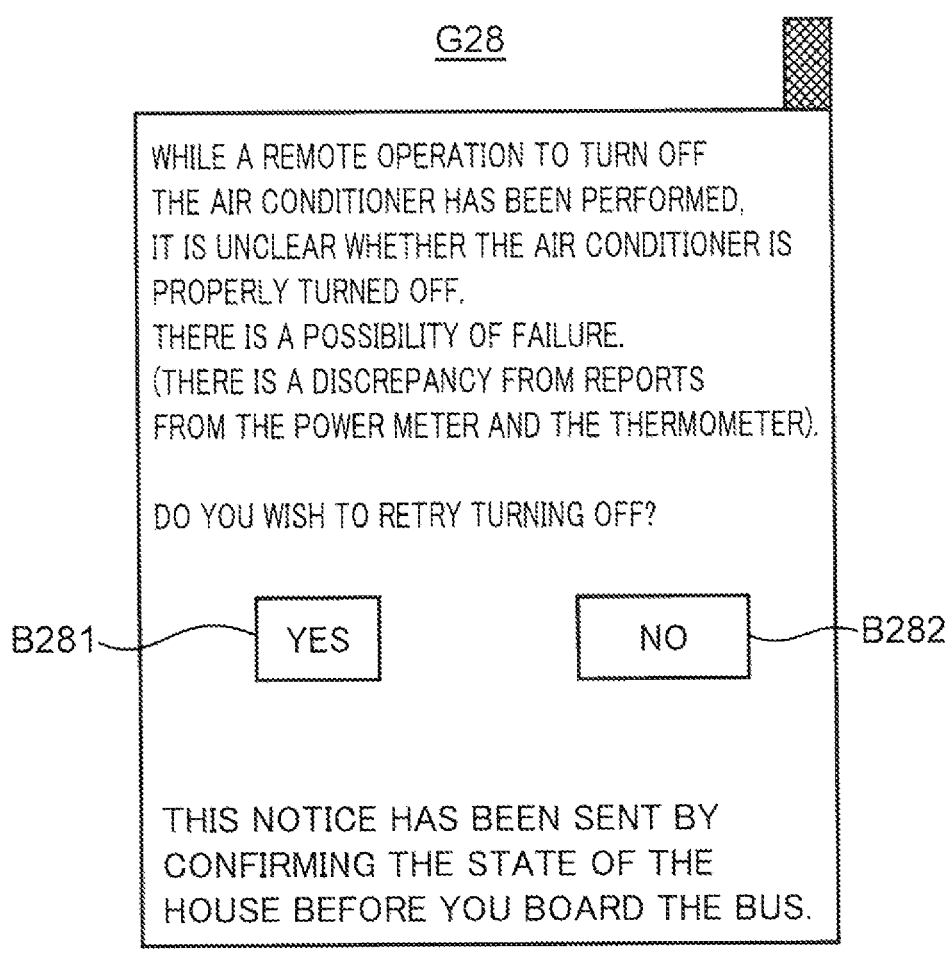
FIG. 28 is a diagram showing an example of a notification screen G28 of the information notification system 11 according to the second embodiment of the present disclosure.

FIG. 28 is a diagram showing a notification screen G28 that is displayed on the mobile device 300 when it is determined that there is a possibility of a failure in an air conditioner due to the remote operation contents indicating "off" while on/off states indicated by the electric home appliance log and the monitoring logs are inconsistent (cases (10) to (14) and (16) in FIG. 24).

When the notification screen G28 is displayed, since a contradiction is created between an operational state indicated by the electric home appliance log and an operational state indicated by the monitoring logs, there is a possibility that a failure has occurred in the air conditioner or in the network unit of the air conditioner. Therefore, a message reading "While a remote operation to turn off the air conditioner has been performed, it is unclear whether the air conditioner is properly turned off. There is a possibility of failure (There is a discrepancy from reports from the power meter and the thermometer)." is displayed on the notification screen G28. In addition, a button B281 that allows the user to select a remote operation to once again switch the air conditioner to an off-state and a button B282 that allows the user to choose not to perform a remote operation of the air conditioner are arranged on the notification screen G28 in a similar manner to the notification screen G26.

Moreover, while a message reading "This notice has been sent by confirming the state of the house before you board the bus" is displayed on the notification screens G26 to G28 in a similar manner to the notification screen G19, this message may be omitted. The user having confirmed the notification screen G28, who should have gone out after setting the air conditioner to the off-state, is unable to confirm whether the air conditioner is in the off-state because there is a possibility of a failure of the network unit of the air conditioner. Therefore, the user can return to the house 100 instead of boarding the bus to confirm the operational state of the air conditioner.

Figure 29:
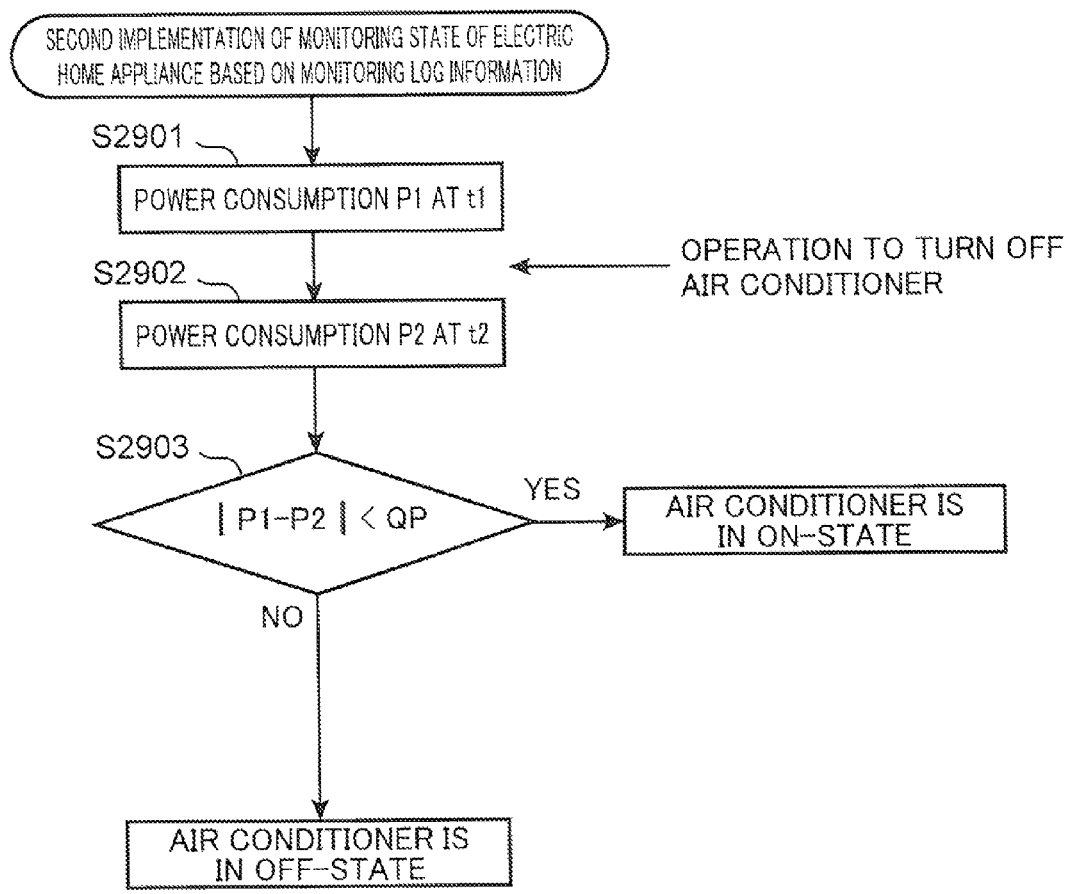
FIG. 29 is a flow chart showing an operation in a second implementation of the log determining unit 216 of the information notification system 11 according to the second embodiment of the present disclosure.

2.5 Second Implementation of Confirming on-State of Electric Home Appliance Based on Monitoring Log FIG. 29 represents a flow chart which shows processing of a second implementation of monitoring whether an electric home appliance is in an on-state or an off-state based on a monitoring log and which shows details of the process of S107 shown in FIG. 23.

In FIG. 29, as a second implementation of determining an on-state, a case is shown in which whether an air conditioner is in an on-state or an off-state is determined based on a change in a power consumption that is measured by the monitoring device 103 (power meter). First, the monitoring log receiving unit 212 acquires a power consumption P1 at a time t1 from the power meter (S2901).

Next, the monitoring log receiving unit 212 acquires a power consumption P2 at a time t2 from the power meter (S2902).

Subsequently, it is assumed that the air conditioner is controlled to an off-state between the time t1 and the time t2. If the air conditioner is changed to an off-state due to this control, power consumption of the air conditioner should drop and a difference between the power consumption P1 and the power consumption P2 should equal a prescribed power consumption. Therefore, the log determining unit 216 calculates an absolute value of the difference between the power consumption P1 and the power consumption P2 (=|P1−P2|), and if the absolute value of the difference is equal to or greater than a threshold QP (no in S2903), the log determining unit 216 determines that the air conditioner has changed to an off-state. On the other hand, if |P1−P2| is less than the threshold QP (yes in S2903) and the power consumption has not noticeably changed, the log determining unit 216 determines that the air conditioner is kept in an on-state despite being controlled to an off-state.

In addition, the log determining unit 216 may determine an on-state or an off-state of the air conditioner based on a change in temperature measured by the thermometer. For example, let us assume that T1 denotes the temperature at a time t1 and T2 denotes the temperature at a time t2. Subsequently, it is assumed that the air conditioner is controlled to an off-state between the time t1 and the time t2. If the air conditioner is changed to an off-state due to this control and the air conditioner is performing a cooler operation, the temperature as measured by the thermometer should rise and a difference between the temperature T1 and the temperature T2 should equal a prescribed temperature. Therefore, the log determining unit 216 determines that the air conditioner has changed to an off-state if an absolute value of the difference between the temperature T1 and the temperature T2 (=|T1−T2|) is equal to or higher than a threshold QT. On the other hand, if |T1−T2| is lower than the threshold QT and the temperature has not noticeably changed, the log determining unit 216 determines that, for some reason, the air conditioner is kept in an on-state despite being switched to an off-state.

Furthermore, the log determining unit 216 may determine an on-state or an off-state of an automatic cleaner based on a change in an operating noise as measured by a sound sensor. For example, let us assume that M1 denotes an operating noise at a time t1 and M2 denotes an operating noise at a time t2. Subsequently, it is assumed that the automatic cleaner is controlled to an off-state between the time t1 and the time t2. If the automatic cleaner is changed to an off-state due to this control, the operating noise as measured by the sound sensor should drop and a difference between the operating noise M1 and the operating noise M2 should equal a prescribed level. Therefore, the log determining unit 216 determines that the automatic cleaner has changed to an off-state if an absolute value of the difference between the operating noise M1 and the operating noise M2 (=|M1−M2|) is equal to or higher than a threshold QM. On the other hand, if |M1−M2| is lower than the threshold QM and the operating noise has not noticeably changed, the log determining unit 216 determines that, for some reason, the air conditioner is kept in an on-state despite being switched to an off-state. For example, when a switching noise that is made by the automatic cleaner when switching from an on-state to an off-state is not picked up by the sound sensor, it is determined that |M1−M2| is lower than the threshold QM and the automatic cleaner is kept in an on-state. In addition, when the operating noise of the automatic cleaner becomes quieter as compared to an on-state, it is determined that the automatic cleaner has changed to an off-state.

2.6 Effect of Second Embodiment

In the second embodiment, a result of a remote operation which indicates whether or not an electric home appliance has operated normally as per an instruction for the remote operation is notified to the mobile device 300. Accordingly, for example, when an air conditioner could not be set to an off-state by a remote operation or when it is unclear whether or not the air conditioner had been switched to an off-state due to some kind of failure, a result of the remote operation which indicates such contents is notified to the mobile device 300 before the mobile device 300 travels outside of a prescribed range. As a result, the user notified of a result of the remote operation while still within the prescribed range can return to the house 100 to directly set the air conditioner to an off-state and can go out without any anxiety.

Moreover, while the second implementation shown in FIG. 29 has been adopted in the second embodiment as an implementation of determining whether an electric home appliance is in an on-state or an off-state based on a monitoring log, this implementation is not restrictive and the first implementation shown in FIG. 18 may be adopted instead. In addition, the second implementation may be adopted in the first embodiment as an implementation of determining whether an electric home appliance is in an on-state or an off-state based on a monitoring log.

3. Third Embodiment (Display Time Required to Return Home)

Hereinafter, an information notification system 11 according to a third embodiment will be described with reference to the drawings. A difference from the first embodiment is that a time required to return to the house 100 is also notified when notifying malfunction information. FIG. 33 is a diagram showing an example of a notification screen G33 according to the third embodiment. The notification screen G33 displays information to the effect that returning to the house 100 should take 5 minutes together with information indicating a failure of a network unit of an air conditioner.

In the example of the notification screen G33, since an air conditioner has notified an electric home appliance log indicating an off-state but a power meter and a thermometer have notified monitoring logs indicating an on-state, a message reading "While a notification of an off-state has been received from the air conditioner, the power meter and the thermometer have confirmed that the air conditioner is in an on-state" is displayed.

The following description will focus on such differences and portions that are the same as in the first embodiment will not be described.

3.1 Configuration of Information Management System

Since an overall configuration of the information notification system 11, a configuration of an electric home appliance, and a configuration of the mobile device 300 are the same as those in the first embodiment, descriptions thereof will be omitted.

Figure 30:
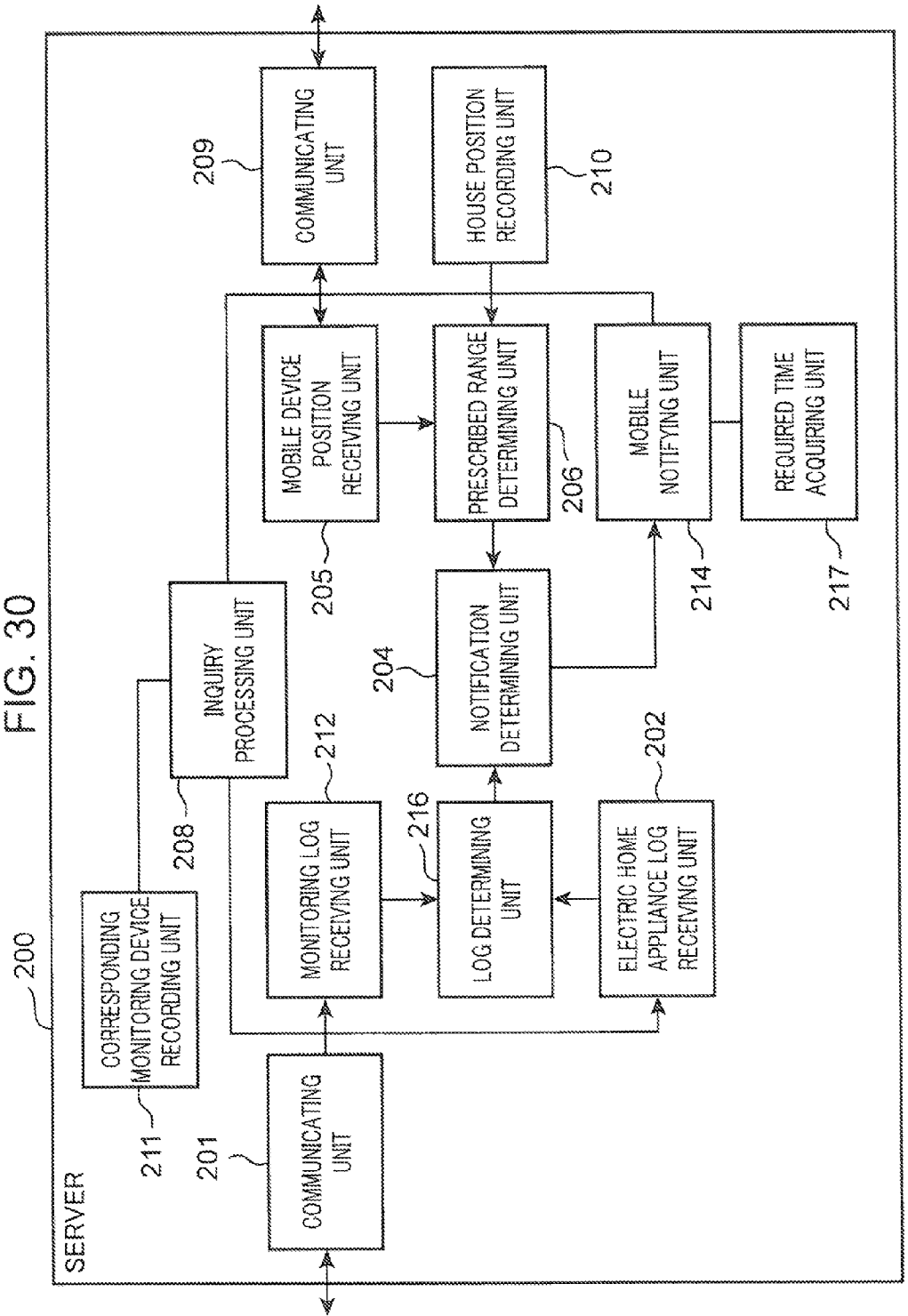
FIG. 30 is a block diagram of the server 200 of the information notification system 11 according to a third embodiment of the present disclosure.

FIG. 30 is a block diagram showing a configuration of the server 200 according to the third embodiment. A required time acquiring unit 217 has been provided in addition to the configuration of the server 200 according to the first embodiment.

3.2 Required Time Acquiring Unit 217

The required time acquiring unit 217 predicts the time required by a user carrying the mobile device 300 to return to the house 100 by performing a required time acquisition process. In addition, the server 200 notifies the predicted time together with notifying malfunction information to the mobile device 300. The required time acquisition process will be specifically described in 3.3 and 3.4.

3.3 First Implementation of Required Time Acquisition Process

In a first implementation of the required time acquisition process, the time that transpired from the user carrying the mobile device 300 leaving the house 100 until receiving the notification is assumed, without modification, to be the time that is predicted to be required to return from a current position to the house 100 (hereinafter, referred to as a predicted required time). Therefore, measurement of time is started at the time point when it is determined that the user has left the house 100 and is continued until inconsistency information is notified. In addition, the measured time is notified as a predicted required time to the mobile device 300 together with the inconsistency information.

Figure 31:
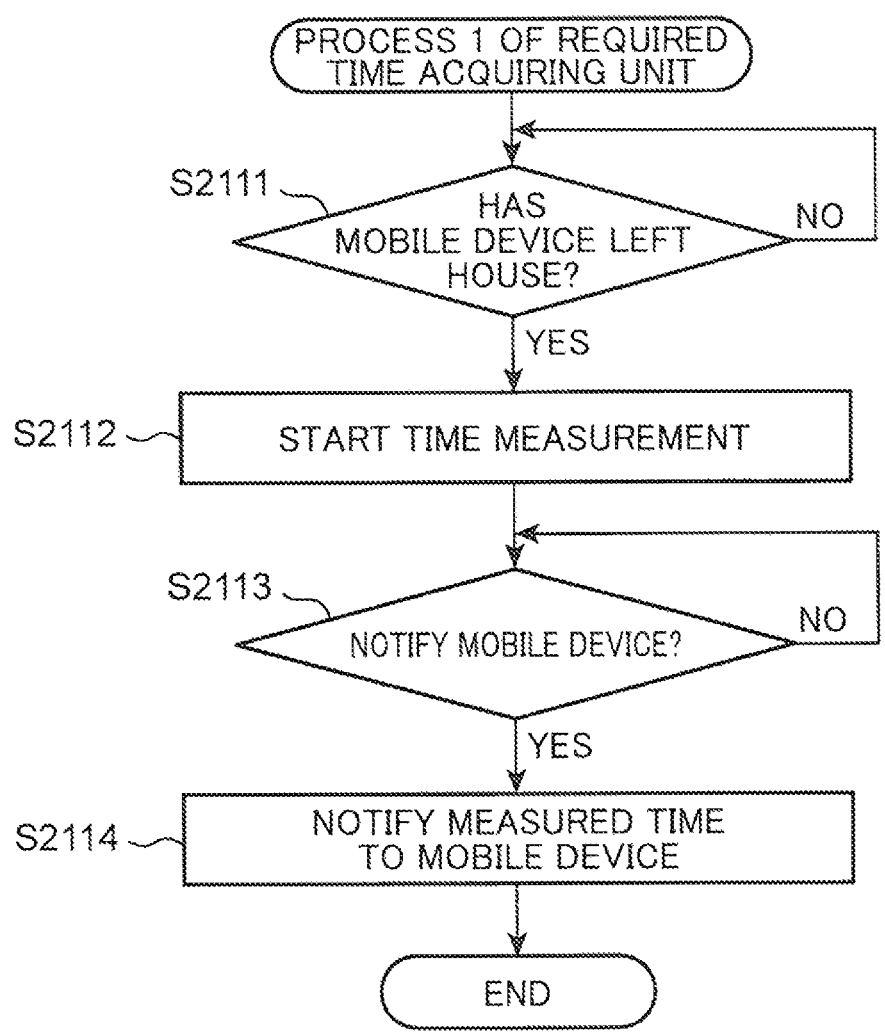
FIG. 31 is a flow chart showing a first operation example of a required time acquiring unit 217 of the information notification system 11 according to the third embodiment of the present disclosure.

FIG. 31 is a flow chart showing the first implementation of the required time acquisition process which is mainly carried out by the required time acquiring unit 217.

(S2111)

The required time acquiring unit 217 confirms whether or not the mobile device 300 has left the house 100. In this case, the required time acquiring unit 217 may determine that the mobile device 300 has left the house 100 when, for example, positional information of the mobile device 300 changes from the inside to the outside of the circle with a radius that equals the distance M as shown in FIG. 10. When it is determined in S2111 that the mobile device 300 has left the house 100 (yes in S2111), the process advances to S2112, and when it is determined in S2111 that the mobile device 300 has not left the house 100 (no in S2111), the process returns to S2111.

(S2112)

The required time acquiring unit 217 starts measurement of a predicted required time upon the mobile device 300 leaving the house 100.

(S2113)

The notification determining unit 204 determines whether or not malfunction information needs to be notified to the mobile device 300 in accordance with a determination result of the log determining unit 216 which indicates whether or not an electric home appliance log and a monitoring log are consistent and on a determination result of the prescribed range determining unit 206 which indicates that the mobile device 300 is within a prescribed range. This process is the same as S107 and S108 in FIG. 6. Specifically, when there is an electric home appliance for which an electric home appliance log and a monitoring log are inconsistent and, at the same time, when the mobile device 300 is within the prescribed range, a determination of yes is made in S2113. On the other hand, when there is no electric home appliance for which an electric home appliance log and a monitoring log are inconsistent or when the mobile device 300 is not within the prescribed range, a determination of no is made in S2113.

When it is determined in S2113 that malfunction information needs to be notified (yes in S2113), the process is advanced to S2114. On the other hand, when it is determined that the malfunction information need not be notified (no in S2113), the process is returned to S2113.

(S2114)

When a determination of yes is made in S2113, the required time acquiring unit 217 confirms the time for which measurement had been started in S2112 and determines the time to be the predicted required time. Subsequently, the mobile notifying unit 214 notifies the predicted required time together with inconsistency information to the mobile device 300.

3.4 Second Implementation of Required Time Acquisition Process

With the first implementation of the required time acquisition process, in a case where the user makes a detour after leaving the house 100 and before arriving at the current location, a case where the user stops to talk with someone while standing along the way, or the like, a discrepancy is conceivably created between the time that transpired from leaving the house 100 until arriving at the current location and the time that is required to return from the current location to the house 100. In the second implementation of the required time acquisition process, a predicted required time is calculated based on a distance and speed between leaving the house 100 and the current location. Accordingly, the predicted required time to return to the house 100 is calculated more accurately.

The required time acquiring unit 217 of the server 200 periodically receives positional information of the mobile device 300 from the mobile device 300 and calculates a travel speed of the mobile device 300. Accordingly, the required time acquiring unit 217 can discriminate whether the mobile device 300 is traveling on a bicycle or on foot. Meanwhile, the required time acquiring unit 217 acquires a distance traveled by the mobile device 300 from map information.

Figure 32:
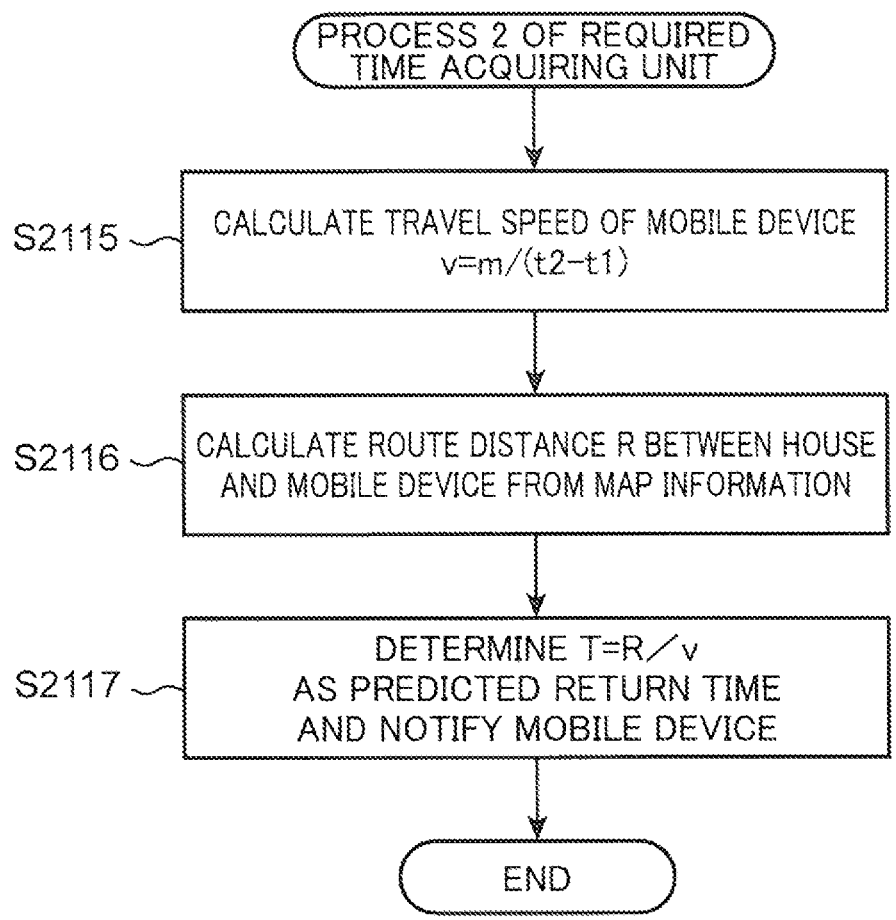
FIG. 32 is a flow chart showing a second operation example of the required time acquiring unit 217 of the information notification system 11 according to the third embodiment of the present disclosure.
Figure 34:
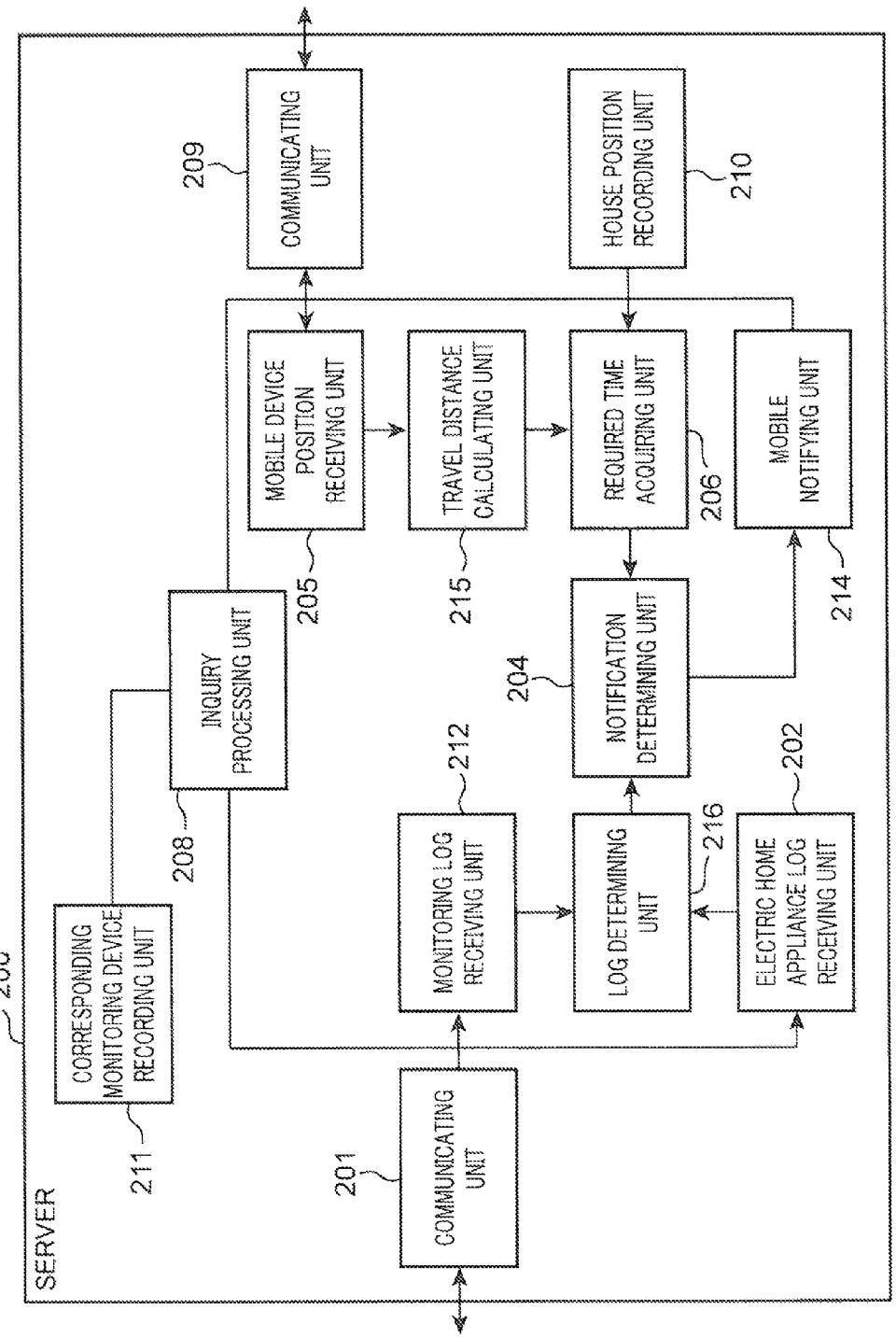
FIG. 34 is a block diagram of the server 200 of the information notification system 11 according to a fourth embodiment of the present disclosure.

FIG. 32 is a flow chart showing the second implementation of the required time acquisition process which is mainly carried out by the required time acquiring unit 217.

(S2115)

The required time acquiring unit 217 calculates a travel distance m based on a difference between a time t1 and a time t2 and on map information. Subsequently, the required time acquiring unit 217 calculates a travel speed of the mobile device 300 according to v=m/(t2−t1). At this point, when a timing of calculation of the predicted required time is assumed to be the time t2, for example, a notification time of latest positional information is adopted as the time t2 and a notification time of positional information immediately preceding the latest positional information is adopted as the time t1. The calculation of the travel distance m is the same as in S1085 shown in FIG. 14.

(S2116)

The required time acquiring unit 217 calculates a route distance R between the house 100 and the current mobile device 300 based on map information. In this case, the route distance R is a shortest route or an optimal route that is calculated by a route searching process generally used by car navigation systems and the like. A shortest route refers to a route with minimum travel distance. In addition, an optical route refers to a route with a shortest travel time which takes presence/absence of traffic lights, presence/absence of sidewalks, and the like into consideration. Specifically, the current location and a position of the house 100 are plotted onto the map information and a shortest route and an optimal route are searched using a route searching algorithm such as Dijkstra's method or the A-star algorithm.

(S2117)

The required time acquiring unit 217 calculates T=R/v as the predicted required time that is predicted to be required to return to the house 100 from the current location. Subsequently, the mobile notifying unit 214 notifies the predicted required time calculated by the required time acquiring unit 217 to the mobile device 300 together with malfunction information.

3.5 Effect of Third Embodiment

In the third embodiment, in addition to the effect of the first embodiment, a predicted required time that is required to return to the house 100 from the current location in order to confirm a state of an electric home appliance in which a malfunction may have possibly occurred is displayed on the mobile device 300 together with malfunction information. Accordingly, the user can be informed of how much time is to be lost by returning to the house 100 from the current location and once again going out after confirming an operational state of an electric home appliance. As a result, the user can select an action to be taken by considering the user's own schedule as well as risks and disadvantages of staying out without confirming the operational state of an electric home appliance in which a malfunction may have possibly occurred. In other words, for example, the user can choose to return to the house 100 in order to switch an electric home appliance that is possibly in an on-state to an off-state or to proceed to a destination or the like instead of returning to the house 100. In addition, since how much delay is to be created in the user's own schedule can be predicted when choosing to return to the house 100, the third embodiment is useful to the user.

4. Fourth Embodiment (Notification Based on Actually Traveled Distance)

In the first embodiment, malfunction information is notified to the mobile device 300 owned by the user while the user is within a circle having a prescribed radius from the house 100. In other words, the first embodiment assumes that, when the user is present in a circle having a prescribed radius, the user is within a range in which the user can readily return to the house 100 in order to confirm an operational state of an electric home appliance upon receiving a notification.

On the other hand, in the fourth embodiment, whether or not the user is within a prescribed range is determined based on an actual travel distance when the user leaves the house 100 instead of on a circle having a prescribed radius. For example, there may be cases where the user travels toward the east from the house 100, and since the streets are extremely complicated, the travel distance of the user exceeds a linear distance from the house 100 even though the linear distance is short. On the other hand, there may be cases where the user travels toward the west, and since the road is straight, the linear distance from the house 100 and the travel distance are approximately the same. In such cases, even if the user is present within a circle with a prescribed radius, a determination that the user can readily return to the house 100 cannot be simply made. In such cases, a determination of whether or not the user can readily return to the house 100 is appropriately made based on an actual travel distance.

Figure 36:
FIG. 36 is a diagram showing an example of a notification screen G36 of an information notification system according to the fourth embodiment of the present disclosure.

FIG. 36 is a diagram showing an example of a notification screen G36 for notifying malfunction information to the user according to the fourth embodiment. FIG. 36 shows the notification screen G36 for notifying malfunction information to the user when a travel distance of the user from the house 100 is 500 m or less. Therefore, a text reading "This notice has been sent by confirming the state of the house before your travel distance from home reaches 500 m." is displayed on the notification screen G36.

In addition, since there is a possibility that a failure has occurred in the network unit of the air conditioner, the notification screen G36 displays a message reading "A failure may have occurred in the network unit of the air conditioner. While the air conditioner notifies an off-state, an on-state of the air conditioner has been confirmed by the power meter and the thermometer." in a similar manner to the notification screen G19.

4.1 Configuration of Information Management System

In the fourth embodiment, since an overall configuration of the information notification system 11 and configurations of the electric home appliance 101 and the mobile device 300 are the same as those in the first embodiment, descriptions thereof will be omitted.

FIG. 33 is a block diagram showing a configuration of the server 200 according to the fourth embodiment. A travel distance calculating unit 215 has been provided in addition to the configuration of the server 200 according to the first embodiment.

4.1.1 Travel Distance Calculating Unit 215

The travel distance calculating unit 215 tracks a change in positional information of the mobile device 300 on map information from a time point when the mobile device 300 leaves the house 100 and calculates a travel distance thereof.

4.2 Operations of Information Management System

Operations of the information notification system 11 are the same as those according to the first embodiment shown in FIG. 6. However, there is a difference in the operation in S108 for determining whether the mobile device 300 is within a prescribed range. The determination of a prescribed range which is the difference between embodiments will now be described.

Figure 35:
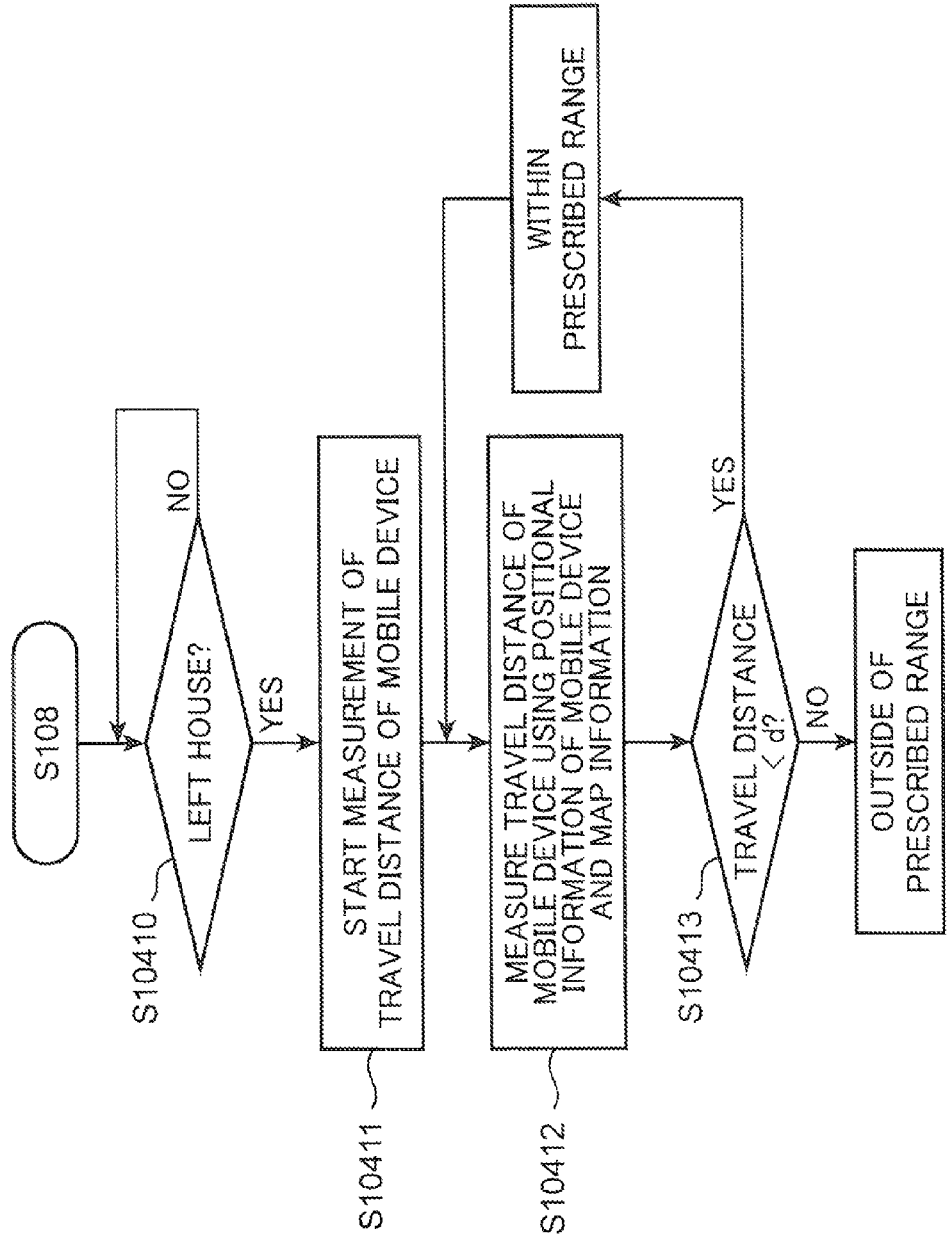
FIG. 35 is a flow chart showing an operation of the prescribed range determining unit 206 of the information notification system 11 according to the fourth embodiment of the present disclosure.

FIG. 35 is a flow chart showing details of the process in S108 shown in FIG. 6 according to the fourth embodiment.

(S10410)

The travel distance calculating unit 215 determines whether or not the mobile device 300 has left the house 100 based on positional information of the mobile device 300.

(S10411)

The travel distance calculating unit 215 starts measurement of a travel distance of the mobile device 300 from the house 100.

(S10412)

The travel distance calculating unit 215 tracks a travel route of the mobile device 300 using periodically notified positional information of the mobile device 300 and map information, and calculates a travel distance. For example, the travel distance calculating unit 215 tracks the travel route of the mobile device 300 by plotting positions indicated by positional information notified from the mobile device 300 on the map information and connecting the plotted positions along roads. In addition, the travel distance calculating unit 215 calculates a length of the tracked travel route and measures an actual distance corresponding to the calculated length as the travel distance of the mobile device 300.

(S10413)

When the travel distance as measured by the travel distance calculating unit 215 is less than a prescribed distance (in this case, denoted by d) (yes in S10413), the prescribed range determining unit 206 determines that the mobile device 300 is present within a prescribed range and returns the process to S10412. On the other hand, when the travel distance is equal to or more than the prescribed distance d (no in S10413), the mobile device 300 is determined to be outside of the prescribed range.

4.3 Effect of Fourth Embodiment

In the first embodiment, whether or not a user is within a prescribed range (a range in which malfunction information is notified) is determined based on how far the position of the mobile device 300 is from the house 100 in terms of linear distance. By comparison, in the fourth embodiment, an actual travel distance of the mobile device 300 is calculated using map information, and whether or not the mobile device 300 is within a prescribed range is determined based on the travel distance. Accordingly, even in cases where, for example, traveling to the east involves streets that are extremely complicated and results in a longer travel distance despite a linear distance from the house 100 being short while traveling to the west results in a travel distance from the house 100 that is more linear, a range in which the user can return to the house 100 can be accurately determined.

5. Other Modifications

While the present disclosure has been described based on the respective embodiments presented above, it is obvious that the present disclosure is not limited to the respective embodiments. The present disclosure also includes the following cases.

(1) In the first embodiment, a notification is received while the mobile device 300 is present in a prescribed range. In addition, the prescribed range according to the first embodiment is a range in which the mobile device 300 is at a distance L or between a distance M and the distance L from the house 100. However, the present disclosure is not limited thereto. For example, a notification of malfunction information to the mobile device 300 may be issued only when the mobile device 300 is present in the house 100. In this case, when a user is in the house 100, malfunction information is notified to the user through the mobile device 300 when there is an electric home appliance for which an electric home appliance log and a monitoring log are inconsistent. On the other hand, once the user goes out of the house 100, even if there is an electric home appliance for which an electric home appliance log and a monitoring log are inconsistent, the inconsistency is not informed to the user. Therefore, even if contents of the mobile device 300 are viewed by another person at an outside location, the other person can be prevented from gaining information regarding an electric home appliance inside the house 100.

(2) In the first to fourth embodiments, a LAN, the Internet, and a 4G communication network are respectively adopted as a network inside the house 100, a network between the house 100 and the server 200, and a network between the server 200 and the mobile device 300. However, the present disclosure is not limited thereto. The networks may differ from each other or may be the same. For example, electric home appliances may be directly connected to the server 200 via a 4G communication network without being connected via a router. In addition, any of a wired communication network and a wireless communication network may be adopted as these networks.

(3) In the first to fourth embodiments, the mobile device 300 periodically notifies positional information to the server 200. However, the present disclosure is not limited thereto. Positional information may be notified in response to an inquiry from the server 200 or notification of positional information to the server 200 may be triggered by an event such as the mobile device 300 passing through a given location.

(4) In the first to fourth embodiments, the server 200 may make only one inquiry to an electric home appliance or a monitoring device and determine an operational state of the electric home appliance based on a response to the inquiry, or may make a plurality of inquiries and determine an operational state of the electric home appliance based on a plurality of responses. Moreover, when determining an operational state of a given electric home appliance based on a plurality of responses, a different determination result may be obtained with respect to each response. In this case, the server 200 may define a rule in advance and determine the operational state of the electric home appliance according to the rule. As the rule, for example, a rule for adopting a determination result with respect to a latest response or a rule for adopting a most numerous determination result among determination results obtained within a certain period in the past may be adopted.

(5) In the first to fourth embodiments, single devices such as a power meter, a thermometer, and a sound sensor are adopted as monitoring devices. However, the present disclosure is not limited thereto. If a functional module capable of monitoring another electric home appliance is built into a given electric home appliance, the electric home appliance having the functional module may be adopted as a monitoring device. For example, an operational state of an air conditioner may be confirmed using a camera function of an automatic cleaner that is equipped with a camera function. In this case, the camera function may be configured to capture images of a power indicator of the air conditioner, whereby the server 200 acquires captured images as a monitoring log. In addition, the server 200 may perform image recognition on the images to determine whether or not the power indicator is lighted, and determine that the air conditioner is in an on-state if the power indicator is lighted and determine that the air conditioner is in an off-state if the power indicator is not lighted.

(6) In the first embodiment, all electric home appliances inside the house 100 are considered to be objects when determining whether or not there is an electric home appliance for which an electric home appliance log and a monitoring log are inconsistent and notifying the inconsistency to the mobile device 300. The present disclosure is not limited thereto and a specific electric home appliance may be specified by the user and an operational state of the specified electric home appliance may be notified to the user.

Figure 37:
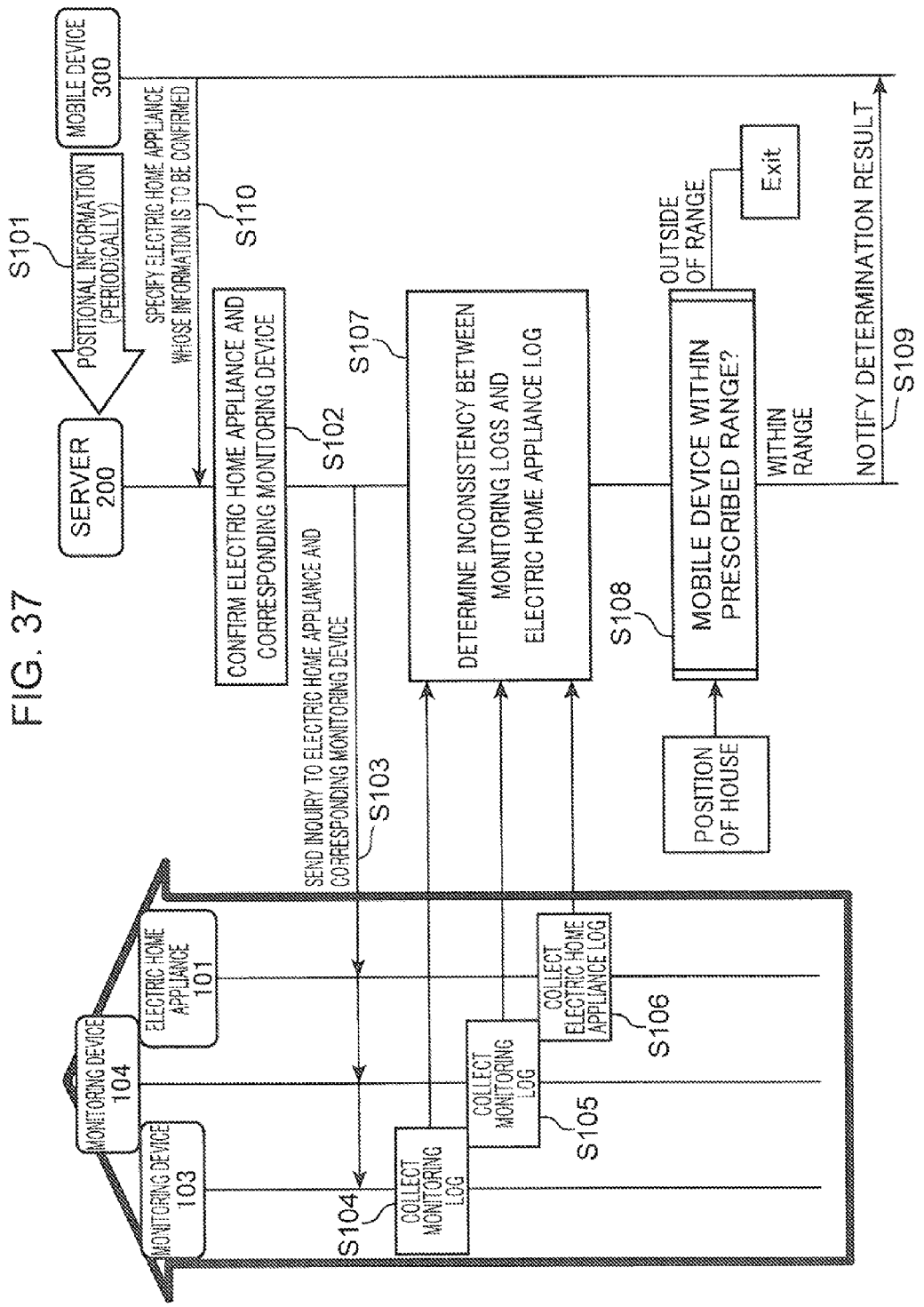
FIG. 37 is a sequence diagram showing operations when specifying an electric home appliance as an application of the information notification system 11 according to the first embodiment of the present disclosure.

FIG. 37 is a sequence diagram showing operations of the information notification system 11 according to a modification of the first embodiment.

S101 is the same as S101 in FIG. 6.

Figure 38:
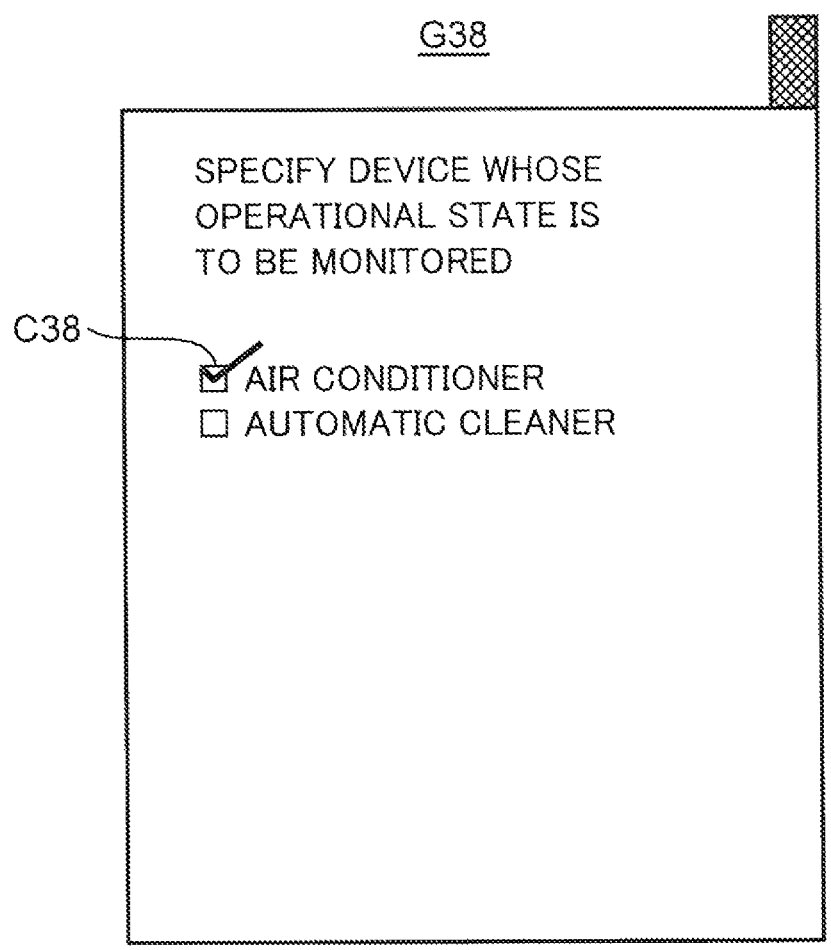
FIG. 38 is a diagram showing a display example of a mobile device when specifying a electric home appliance as an application of the information notification system 11 according to the first embodiment of the present disclosure.

In S110, the mobile device 300 receives an instruction by the user to specify an electric home appliance whose operational state is to be confirmed and transmits information indicating the specified electric home appliance to the server 200. FIG. 38 is a diagram showing an example of a specification screen G38 that is displayed on the mobile device 300 when the user specifies an electric home appliance whose operational state is to be confirmed. As the specification screen G38, a specification screen is shown which enables an air conditioner and an automatic cleaner to be specified. The user specifies an electric home appliance by entering a check mark to a check box C38 corresponding to a desired electric home appliance. In this case, a check mark is entered to a check box C38 corresponding to an air conditioner to specify the air conditioner. Moreover, the air conditioner and the automatic cleaner are displayed as specification objects on the specification screen G38 because these electric home appliances are installed in the house 100 of a corresponding user and, at the same time, these electric home appliances are registered as management objects in the server 200. Therefore, if other electric home appliances installed in the house 100 of the user are registered as management objects in the server 200, such other electric home appliances are to be displayed as specification objects on the specification screen G38.

In S102, the inquiry processing unit 208 of the server 200 refers to the correspondence table H17 and confirms a monitoring device that corresponds to the electric home appliance specified in S110. In this case, since the air conditioner is specified in S110, a power meter and a thermometer are specified as monitoring devices from the correspondence table H17.

In S103, the inquiry processing unit 208 of the server 200 transmits inquiries to the electric home appliance 101 (air conditioner), the monitoring device 103 (power meter), and the monitoring device 104 (thermometer).

In S104 to S106, the electric home appliance 101 (air conditioner) transmits an electric home appliance log to the server 200, and the monitoring device 103 (power meter) and the monitoring device 104 (thermometer) transmit monitoring logs to the server 200.

In S107, the log determining unit 216 of the server 200 determines whether or not the electric home appliance log and the monitoring logs of the air conditioner are inconsistent using the operation state determination table T7 shown in FIG. 7. Details of the determination are the same as the first embodiment.

In S108, the prescribed range determining unit 206 of the server 200 determines whether or not the mobile device 300 is present within a prescribed range. Details of this process are the same as the first embodiment.

In S109, when it is determined that the mobile device 300 is present within the prescribed range (within range in S108), the notification determining unit 204 of the server 200 determines that the determination result of S107 needs to be notified and transmits the determination result to the mobile device 300. On the other hand, when it is determined that the mobile device 300 is present outside of the prescribed range (outside of range in S108), the notification determining unit 204 of the server 200 determines that the determination result of S107 need not be notified and ends the process.

Subsequently, the mobile device 300 displays a notification screen for notifying the determination result to the user. In this case, for example, the mobile device 300 may display the notification screen G19 shown in FIG. 19. Specifically, when the determination result of S107 is a determination result indicating that the electric home appliance log and the monitoring logs are inconsistent, the notification screen G19 shown in FIG. 19 is displayed. On the other hand, when the determination result of S107 is a determination result indicating that the electric home appliance log and the monitoring logs are consistent, a notification screen including a description of information to the effect that the specified electric home appliance 101 (air conditioner) is running normally is displayed.

While the user specifies one electric home appliance in S110 shown in FIG. 37, the user may specify a plurality of electric home appliances instead. In this case, the determination result of S107 is calculated and transmitted to the mobile device 300 with respect to each of the plurality of electric home appliances. For example, let us assume that, in S107, a determination result is obtained which indicates that the electric home appliance log and the monitoring logs of the air conditioner are consistent but the electric home appliance log and the monitoring logs of the automatic cleaner are inconsistent. In this case, a notification screen including a description of information to the effect that operation is normal but the electric home appliance log and the monitoring logs of the automatic cleaner are inconsistent is displayed on the mobile device 300.

In addition, while electric home appliances specified by the user using the mobile device 300 are adopted as electric home appliances that are confirmation objects in the present example, electric home appliances registered in advance in the server 200 as confirmation objects may be adopted. In this case, the server 200 may store information indicating electric home appliances which have been registered in advance by the user and which are confirmation objects in a memory, execute the process shown in FIG. 37 either periodically or when instructed by the user, and notify determination results with respect to the electric home appliances that are confirmation objects to the mobile device 300.

Furthermore, in the present modification, a predicted required time that is required to return to the house 100 as described in the third embodiment may also be notified when notifying the determination results.

(7) In the first to fourth embodiments, while GPS is utilized to acquire positional information of the mobile device 300, a satellite positioning system other than GPS or other positioning systems may be used instead.

Moreover, the techniques described in the aspects above may be realized by, for example, the following types of cloud services. However, the types of cloud services that realize the techniques described in the aspects above are not limited to the following types.

(Service Type 1: Proprietary Data Center Type Cloud Service)

Figure 40:
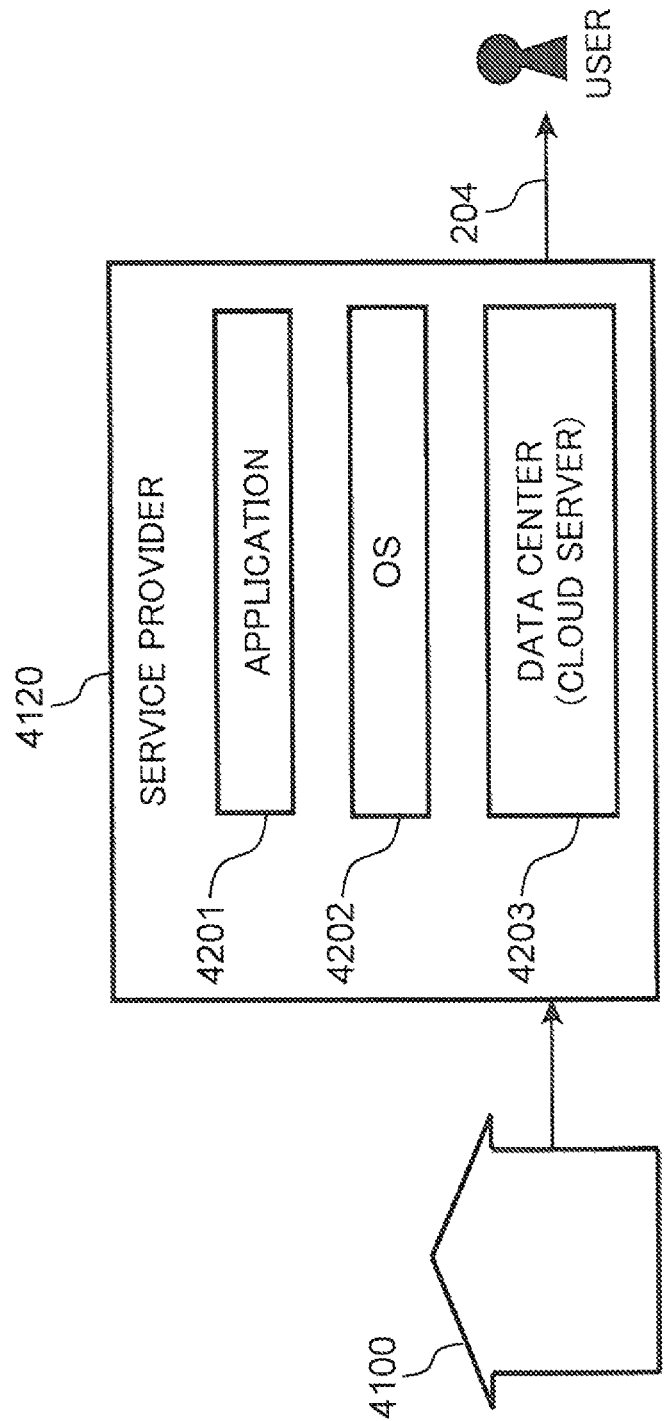
FIG. 40 is a diagram showing an overview of a service that is provided by an information management system of service type 1 (proprietary data center type cloud service).

FIG. 40 is a diagram showing an overview of a service that is provided by an information management system of service type 1 (proprietary data center type cloud service). In the present type, the service provider 4120 acquires information from the group 4100 and provides service to a user. In the present type, the service provider 4120 is equipped with functions of a data center operating company. In other words, the service provider 4120 owns a cloud server 4111 that manages big data. Therefore, a data center operating company does not exist.

In the present type, the service provider 4120 operates and manages the data center (cloud server) 4203. In addition, the service provider 4120 manages an operating system (OS) 202 and an application 4201. The service provider 4120 provides service using the OS 4202 and the application 4201 managed by the service provider 4120 (arrow 204).

(Service Type 2: Cloud Service Using IaaS)

Figure 41:
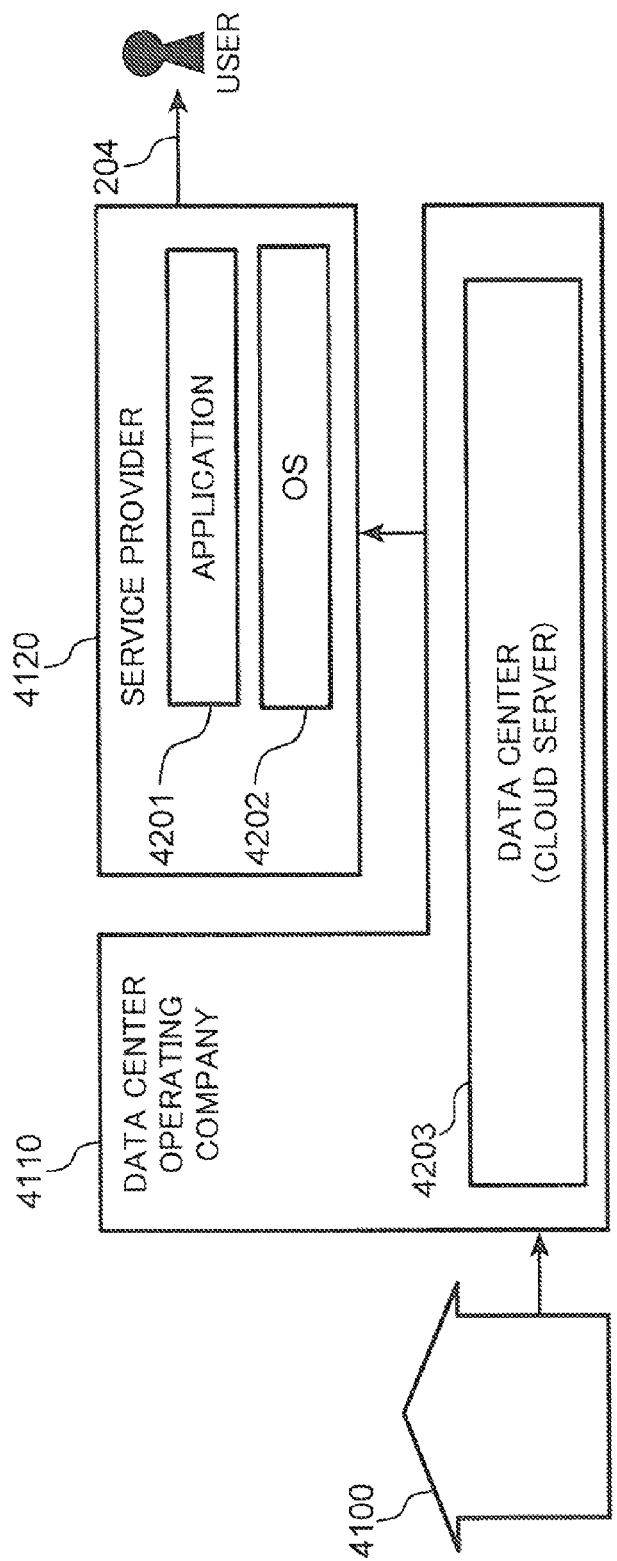
FIG. 41 is a diagram showing an overview of a service that is provided by an information management system of service type 2 (cloud service using IaaS).

FIG. 41 is a diagram showing an overview of a service that is provided by an information management system of service type 2 (cloud service using IaaS). In this case, IaaS stands for Infrastructure as a Service and refers to a cloud service provision model where an infrastructure for building and running a computer system itself is provided as an Internet-based service.

In the present type, the data center operating company 4110 operates and manages the data center (cloud server) 4203. In addition, the service provider 4120 manages an OS 4202 and an application 4201. The service provider 4120 provides service using the OS 4202 and the application 4201 managed by the service provider 4120 (arrow 204).

(Service Type 3: Cloud Service Using PaaS)

Figure 42:
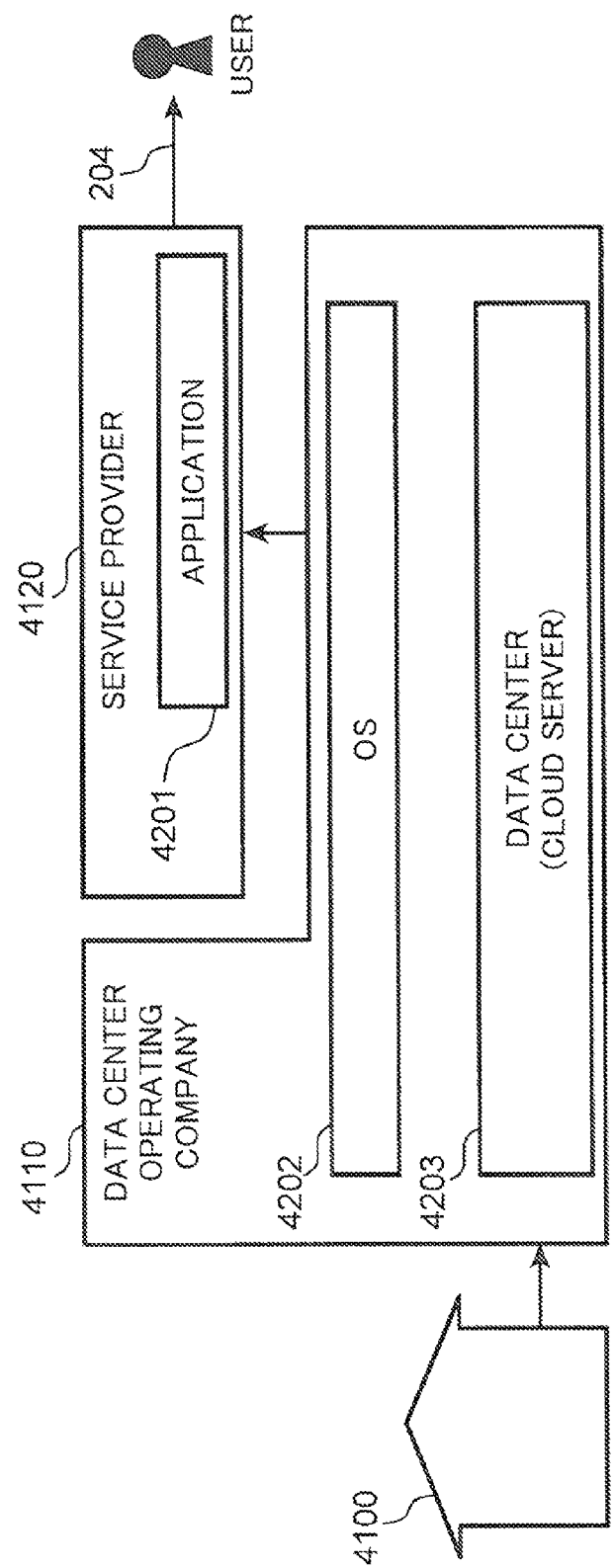
FIG. 42 is a diagram showing an overview of a service that is provided by an information management system of service type 3 (cloud service using PaaS).

FIG. 42 is a diagram showing an overview of a service that is provided by an information management system of service type 3 (cloud service using PaaS). In this case, PaaS stands for Platform as a Service and refers to a cloud service provision model where a platform that constitutes a foundation for building and running software is provided as an Internet-based service.

In the present type, the data center operating company 4110 manages the OS 4202 and operates and manages the data center (cloud server) 4203. In addition, the service provider 4120 manages the application 4201. The service provider 4120 provides service using the OS 4202 managed by the data center operating company 4110 and the application 4201 managed by the service provider 4120 (arrow 204).

(Service Type 4: Cloud Service Using SaaS)

Figure 43:
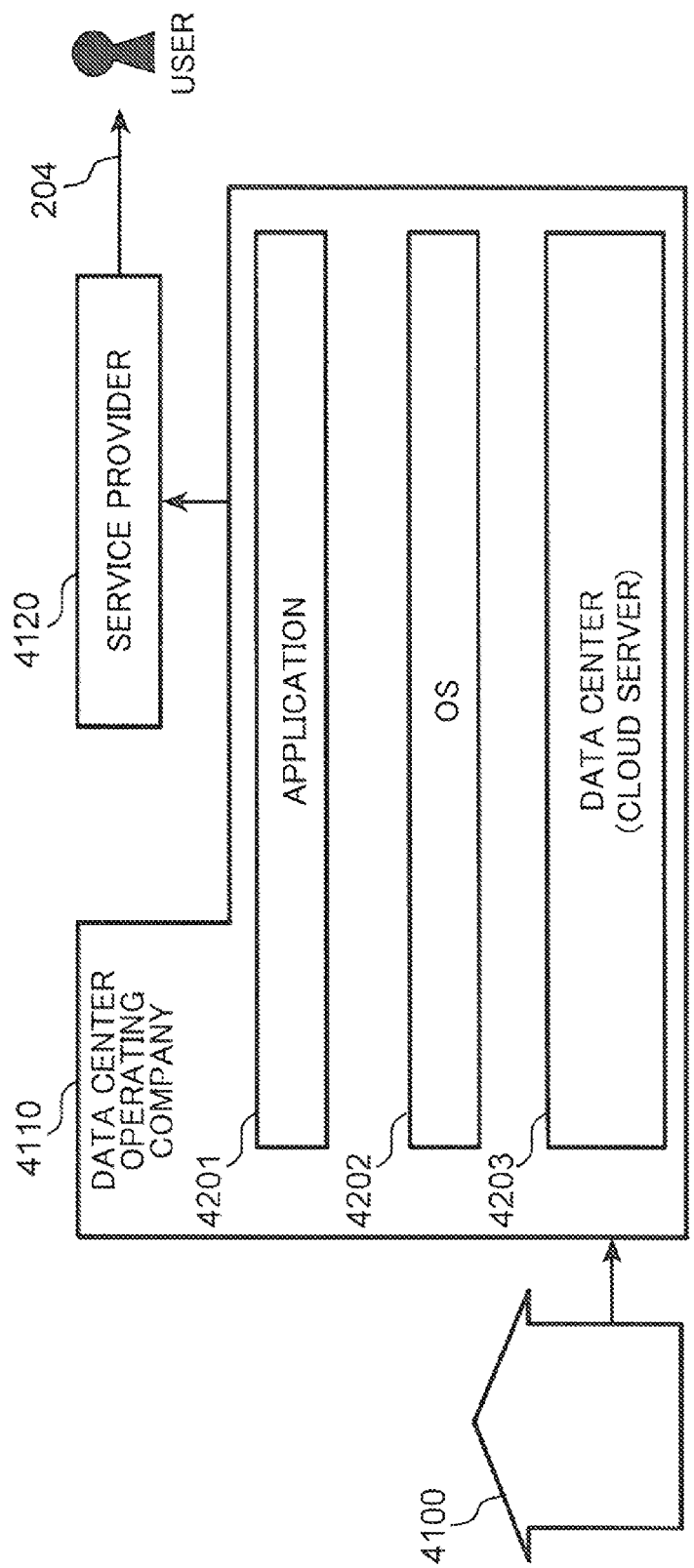
FIG. 43 is a diagram showing an overview of a service that is provided by an information management system of service type 4 (cloud service using SaaS).

FIG. 43 is a diagram showing an overview of a service that is provided by an information management system of service type 4 (cloud service using SaaS). In this case, SaaS stands for Software as a Service. The cloud service using SaaS is a cloud service provision model equipped with, for example, a function that enables a user such as a company or an individual that does not own a data center (cloud server) to user an application provided by a platform provider that owns a data center (cloud server) via a network such as the Internet.

In the present type, the data center operating company 4110 manages the application 4201, manages the OS 4202, and operates and manages the data center (cloud server) 4203. In addition, the service provider 4120 provides service using the OS 4202 and the application 4201 managed by the data center operating company 4110 (arrow 204).

As described above, the service provider 4120 provides service in all types of cloud services. In addition, for example, an OS, an application, a database for big data, and the like may be developed in-house or may be outsourced by the service provider or the data center operating company.

INDUSTRIAL APPLICABILITY

The information notification method according to the present disclosure is useful as an information notification method in an information management system that manages states of one or more electric home appliances inside a house.

The invention claimed is:

1. An information notification method in an information management system which manages information indicating a state of one or more electric home appliances in a house, the information notification method comprising:
    receiving log information including an operational state of one electric home appliance among the one or more electric home appliances, from the one electric home appliance via a first network;
    receiving information indicating an operational state of the one electric home appliance from another electric home appliance via the first network, the another electric home appliance being capable of monitoring the operational state of the one electric home appliance;
    receiving positional information of a display terminal of a user of the one electric home appliance from the display terminal; and
    when it is determined that a position of the display terminal is within a range of a prescribed distance from the house as a result of a comparison between positional information of the house and the positional information of the display terminal and when it is determined that the log information received from the one electric home appliance and the information indicating the operational state of the one electric home appliance that is received from the another electric home appliance are not consistent with each other,
    providing the display terminal with information on a possibility of a malfunction of the one electric home appliance together with information indicating a predicted length of time required by the user of the display terminal to return to the house from the position of the display terminal via a second network while the position of the display terminal is still within the range of the prescribed distance from the house.

2. The information notification method according to claim 1, wherein
the first network and the second network are the same network.

3. The information notification method according to claim 1, wherein
the first network and the second network are different networks.

4. The information notification method according to claim 1, wherein
local map information that includes a position indicated by the positional information of the display terminal is acquired using a database that manages map information,
the positional information of the display terminal is periodically received and is managed together with reception times,
a travel speed of the display terminal is calculated based on a change in the positional information of the display terminal over time, and
whether or not the position of the display terminal is within the range of the prescribed distance from the house is determined using the calculated travel speed of the display terminal and the local map information.

5. The information notification method according to claim 1, wherein
correspondence information indicating the other one or more electric home appliances that corresponds to the one electric home appliance is managed, and
the other one or more electric home appliances associated with the one electric home appliance is selected based on the correspondence information.

6. The information notification method according to claim 1, wherein
when the position of the display terminal is out of a range of the house and is still within the range of the prescribed distance, the information on a possibility of a malfunction of the one electric home appliance is provided to the display terminal via the second network.

7. The information notification method according to claim 1, wherein
when the position of the display terminal within a range of the house and is still within the range of the prescribed distance, the information on a possibility of a malfunction of the one electric home appliance is provided to the display terminal via the second network.

8. The information notification method according to claim 1, wherein
local map information that includes a position indicated by the positional information of the display terminal is acquired using a database that manages map information,
a change in the positional information of the display terminal that is received from the display terminal is tracked on the local map information,
a route to the house on the local map information and a travel speed of the display terminal are determined based on the tracked change in the positional information of the display terminal,
a predicted length of time required by the user of the display terminal to return to the house is calculated using the determined route and travel speed when providing the information on a possibility of a malfunction of the one electric home appliance to the display terminal, and
the information indicating the predicted length of time required by the user of the display terminal to return to the house is provided based on the calculated time together with the information on a possibility of a malfunction of the one electric home appliance.

9. The information notification method according to claim 1, wherein
an elapsed time from when the display terminal leaves a region corresponding to the house is measured, the measured time is acquired when providing the information on a possibility of a malfunction of the one electric home appliance to the display terminal, and
the information indicating the predicted length of time required by the user of the display terminal to return to the house is provided based on the acquired time together with the information on a possibility of a malfunction of the one electric home appliance.

10. The information notification method according to claim 1, wherein
the positional information of the display terminal is periodically received from the display terminal.

11. The information notification method according to claim 1, wherein
the another electric home appliance is a power meter which is connected to the information management system via the first network and which detects power consumption in the house, and
the information indicating the operational state of the one electric home appliance that is received from the another electric home appliance is information indicating the power consumption received from the power meter via the first network.

12. The information notification method according to claim 1, wherein
the another electric home appliance includes a sound pickup apparatus which is connected to the information management system via the first network and which collects an operating noise of the one electric home appliance, and
the information indicating the operational state of the one electric home appliance that is received from the another electric home appliance is information indicating the operating noise of the one electric home appliance that is received from the another electric home appliance via the first network.

13. The information notification method according to claim 1, wherein
the another electric home appliance includes an electronic thermometer which is connected to the information management system via the first network and which measures temperature inside the house, and
the information indicating the operational state of the one electric home appliance that is received from the another electric home appliance is information indicating the temperature inside the house that is received from the another electric home appliance via the first network.

14. An information notification method in an information management system which manages information indicating a state of one or more electric home appliances in a house, the information notification method comprising:
receiving log information including an operational state of one electric home appliance among the one or more electric home appliances, from the one electric home appliance via a first network;
receiving information indicating an operational state of the one electric home appliance from another electric home appliance via the first network, the another electric home appliance being capable of monitoring the operational state of the one electric home appliance;

receiving positional information of a display terminal of a user of the one electric home appliance from the display terminal;

acquiring local map information that includes a position indicated by the positional information of the display terminal, using a database that manages map information;

tracking a change in the positional information of the display terminal that is received from the display terminal, on the local map information;

calculating a travel distance that is traveled by the display terminal from the house on the local map information based on the tracked change in the positional information of the display terminal; and when it is determined that the log information received from the one electric home appliance and the information indicating the operational state of the one electric home appliance that is received from the another electric home appliance are not consistent with each other, providing the display terminal with information on a possibility of a malfunction of the one electric home appliance together with information indicating a predicted length of time required by the user of the display terminal to return to the house from the position of the display terminal via a second network until the travel distance of the display terminal from the house exceeds a prescribed distance.

15. An information notification method in an information management system which manages information indicating a state of one or more electric home appliances in a house, the information notification method comprising:

managing information specifying one electric home appliance among the one or more electric home appliances;

receiving log information including an operational state of the one electric home appliance from the one electric home appliance via a first network;

receiving information indicating the operational state of the one electric home appliance from another electric home appliance via the first network, the another electric home appliance being capable of monitoring the operational state of the one electric home appliance;

determining whether or not the log information received from the one electric home appliance and the information indicating the operational state of the one electric home appliance that is received from the another electric home appliance are consistent with each other;

receiving positional information of a display terminal of a user of the one electric home appliance from the display terminal; and when it is determined that a position of the display terminal is within a range of a prescribed distance from the house as a result of a comparison between positional information of the house and the positional information of the display terminal, providing information indicating a result of the comparison between the log information received from the one electric home appliance and the information indicating the operational state of the one electric home appliance that is received from the another electric home appliance, together with information indicating a predicted length of time required by the user of the display terminal to return to the house from the position of the display terminal, to the display terminal via a second network while the position of the display terminal is still within the range of the prescribed distance from the house.

16. The information notification method according to claim 15, wherein correspondence information indicating the other one or more electric home appliances that corresponds to the one electric home appliance is managed, and the other one or more electric home appliances associated with the one electric home appliance is selected based on the correspondence information.

17. The information notification method according to claim 15, wherein local map information that includes a position indicated by the positional information of the display terminal is acquired using a database that manages map information, a change in the positional information of the display terminal that is received from the display terminal is tracked on the local map information, a route to the house on the local map information and a travel speed of the display terminal are determined based on the tracked change in the positional information of the display terminal, a predicted length of time required by the user of the display terminal to return to the house is calculated using the determined route and travel speed when providing information indicating the comparison result to the display terminal, and the information indicating the predicted length of time required by the user of the display terminal to return to the house is provided based on the calculated time together with the information indicating the comparison result.

18. The information notification method according to claim 15, wherein an elapsed time from when the display terminal leaves a region corresponding to the house is measured, the measured time is acquired when providing the information indicating the result of the comparison to the display terminal, and the information indicating the predicted length of time required by the user of the display terminal to return to the house is provided based on the acquired time together with the information indicating the result of the comparison.

19. The information notification method according to claim 15, wherein the another electric home appliance is a power meter which is connected to the information management system via the first network and which detects power consumption in the house, and the information indicating the operational state of the one electric home appliance that is received from the another electric home appliance is information indicating the power consumption received from the power meter via the first network.

20. An information notification method in an information management system which manages information indicating a state of one or more electric home appliances in a house, the information notification method comprising:

receiving an operation instruction for operating one electric home appliance among the one or more electric home appliances;

receiving log information including an operational state of the one electric home appliance from the one electric home appliance via a first network;

receiving information indicating the operational state of the one electric home appliance from another electric home appliance via the first network, the another electric home appliance being capable of monitoring the operational state of the one electric home appliance;

collating the operation instruction for operating the one electric home appliance, the log information received from the one electric home appliance, and the information indicating the operational state of the one electric home appliance that is received from the another electric home appliance;

receiving positional information of a display terminal of a user of the one electric home appliance from the display terminal; and when it is determined that a position of the display terminal is within a range of a prescribed distance from the house as a result of a comparison between positional information of the house and the positional information of the display terminal, providing the display terminal with information indicating whether or not the operation instruction to the one electric home appliance is successful based on a result of the collation together with information indicating a predicted length of time required by the user of the display terminal to return to the house from the position of the display terminal, while the position of the display terminal is still within the range of the prescribed distance from the house.

21. The information notification method according to claim 20, wherein the information indicating whether or not the operation instruction to the one electric home appliance is successful includes information indicating a possibility of a failure of the one electric home appliance.

* * * * *